US012697795B2

(12) United States Patent
Osada

(10) Patent No.: US 12,697,795 B2
(45) Date of Patent: Aug. 4, 2026

(54) BOX FORMING APPARATUS

(71) Applicant: CANON FINETECH NISCA INC., Saitama (JP)

(72) Inventor: Hisashi Osada, Yamanashi (JP)

(73) Assignee: Canon Finetech Nisca Inc., Saitama (JP)

( * ) Notice: Subject to any disclaimer, the term of this patent is extended or adjusted under 35 U.S.C. 154(b) by 0 days.

(21) Appl. No.: 18/540,729

(22) Filed: Dec. 14, 2023

(65) Prior Publication Data

US 2024/0116260 A1 Apr. 11, 2024

Related U.S. Application Data

(63) Continuation of application No. PCT/JP2022/026056, filed on Jun. 29, 2022.

(30) Foreign Application Priority Data

Jun. 30, 2021 (JP) ................................ 2021-109424
Jun. 22, 2022 (JP) ................................ 2022-100039

(51) Int. Cl.
*B31B 50/26* (2017.01)
*B31B 50/00* (2017.01)
*B31B 50/04* (2017.01)

(52) U.S. Cl.
CPC .......... *B31B 50/262* (2017.08); *B31B 50/006* (2017.08); *B31B 50/042* (2017.08)

(58) Field of Classification Search
CPC ... B31B 50/042; B31B 50/786; B31B 50/262; B31B 50/52; B31B 50/782;
(Continued)

(56) References Cited

U.S. PATENT DOCUMENTS 3,748,972 A * 7/1973 Barton .................. B31B 50/782
493/126
4,089,150 A 5/1978 Heisler
(Continued)

FOREIGN PATENT DOCUMENTS

DE 102017204213 A 9/2018
FR 2646398 A1 * 11/1990 ........... B65B 43/265
(Continued)

OTHER PUBLICATIONS

Translation of FR 2646398 A1 (Year: 1990).*
(Continued)

*Primary Examiner* — Thomas M Wittenschlaeger
(74) *Attorney, Agent, or Firm* — Venable LLP

(57) ABSTRACT

An opening arm has a thickness smaller than a clearance between a pair of flaps that are formed adjacent to each other in one plate-like portion of a pair of plate-like portions of a cardboard sheet folded like a plate. The pair of plate-like portions face each other. A moving portion moves the opening arm. In a state where the opening arm is inserted in the clearance G1 between the pair of flaps, the opening arm faces a flap that is formed in another plate-like portion of the pair of plate-like portions and that is located at a position that faces the clearance. The moving portion moves the opening arm such that the opening arm pushes the flap formed in the other plate-like portion, and that the other plate-like portion is separated from the one plate-like portion.

8 Claims, 44 Drawing Sheets

(58) Field of Classification Search
CPC ..... B31B 50/787; B31B 50/784; B31B 50/76; B31B 50/006; B31B 50/005; B31B 50/722; B31B 50/0044; B31B 2110/35; B31B 2120/302; B31B 2100/002; B65B 43/34
See application file for complete search history.

(56) References Cited

U.S. PATENT DOCUMENTS

| | | | |
|---|---|---|---|
| 4,365,559 | A | 12/1982 | Gruaz |
| 4,633,655 | A | 1/1987 | Nigrelli, Sr. |

FOREIGN PATENT DOCUMENTS

| | | | |
|---|---|---|---|
| FR | 2776266 | A1 | 9/1999 |
| JP | S49-6357 | U | 1/1974 |
| JP | S49-96838 | U | 8/1974 |
| JP | S51-24392 | A | 2/1976 |
| JP | S51-25067 | U1 | 2/1976 |
| JP | S53-63328 | U1 | 5/1978 |
| JP | S53-145798 | A | 12/1978 |
| JP | 2004-035101 | A | 2/2004 |
| JP | 2005-007619 | | 1/2005 |

OTHER PUBLICATIONS

International Preliminary Report on Patentability dated Dec. 14, 2023 in counterpart Application No. PCT/JP2022/026056 with translation.
Written Opinion of the International Searching Authority dated Aug. 16, 2022 in counterpart Application No. PCT/JP2022/026056 with translation.
International Search Report dated Aug. 16, 2022 in counterpart Application No. PCT/JP2022/026056 with translation.
Office Action dated Aug. 5, 2025, in Japanese Patent Application No. 2022-100039.
Office Action dated Sep. 29, 2025, in Chinese Patent Application No. 202280045096.6.

* cited by examiner

BOX FORMING APPARATUS

CROSS-REFERENCE TO RELATED APPLICATIONS

This application is a Continuation of International Patent Application No. PCT/JP2022/026056, filed Jun. 29, 2022, which claims the benefit of Japanese Patent Application No. 2021-109424, filed Jun. 30, 2021, and Japanese Patent Application No. 2022-100039, filed Jun. 22, 2022, which are hereby incorporated by reference herein in their entirety.

BACKGROUND OF THE INVENTION

Field of the Invention

The present invention relates to a box forming apparatus that opens a cardboard sheet folded like a plate, into a cardboard box.

Background Art

A box forming apparatus that opens a cardboard sheet folded like a plate, into a cardboard box is known. For example, in a proposed configuration, a cardboard sheet is opened by sucking a pair of plate-like portions of the cardboard sheet that face each other, and by moving one of the plate-like portions (see Patent Literature 1, for example).

CITATION LIST

Patent Literature

Patent Literature 1 Japanese Patent Application Publication No. 2005-7619

As described in Patent Literature 1, in the configuration in which a cardboard sheet is opened by sucking the plate-like portions of the cardboard sheet, since a sucking apparatus, such as a vacuum pump, is necessary for producing the sucking force, the box forming apparatus is upsized.

The present invention aims to provide a configuration that allows the downsizing of the box forming apparatus.

SUMMARY OF THE INVENTION

A box forming apparatus of the present invention includes an opening arm and a moving portion. The thickness of the opening arm is smaller than a clearance between a pair of flaps that are formed adjacent to each other in one plate-like portion of a pair of plate-like portions of a cardboard sheet folded like a plate. The pair of plate-like portions face each other. The moving portion is configured to move the opening arm. In a state where the opening arm is inserted in the clearance between the pair of flaps, the opening arm faces a flap that is formed in another plate-like portion of the pair of plate-like portions and that is located at a position that faces the clearance. The moving portion is configured to move the opening arm such that the opening arm pushes the flap formed in the other plate-like portion, and that the other plate-like portion is separated from the one plate-like portion.

Further features of the present invention will become apparent from the following description of exemplary embodiments (with reference to the attached drawings).

DESCRIPTION OF THE EMBODIMENTS

An embodiment will be described with reference to FIGS. 1 to 44. First, with reference to FIGS. 1 to 4, an overall configuration of a box forming apparatus 100 of the present embodiment will be described.

[Overall Configuration of Box Forming Apparatus]

Figure 1:
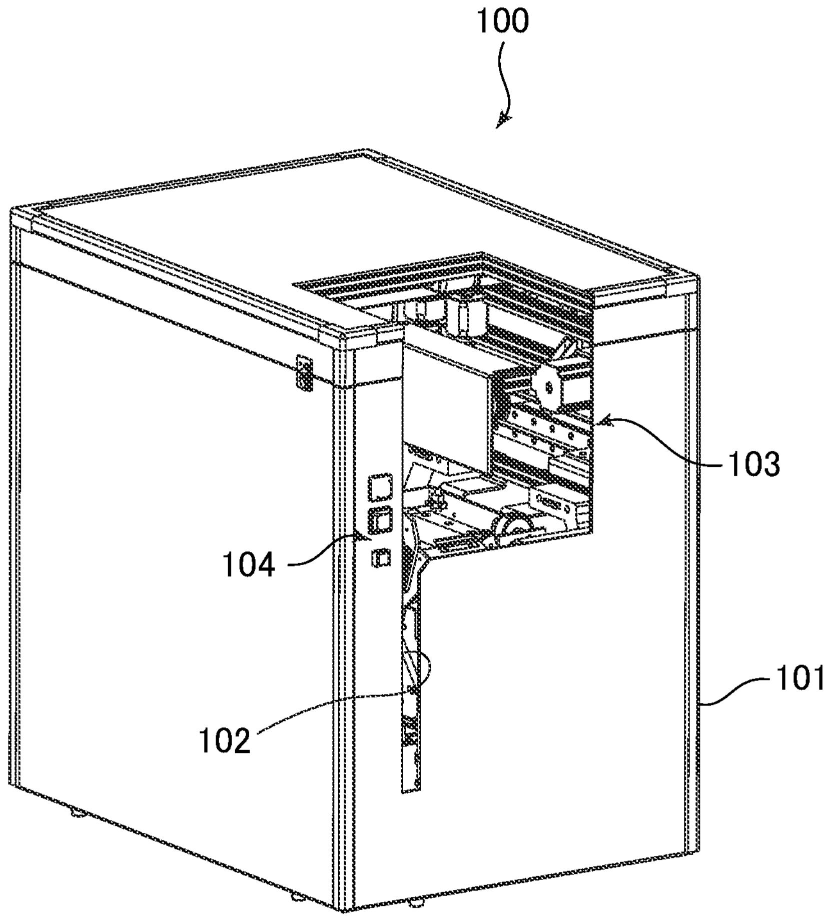
FIG. 1 is a perspective view of a box forming apparatus of an embodiment.
Figure 2:
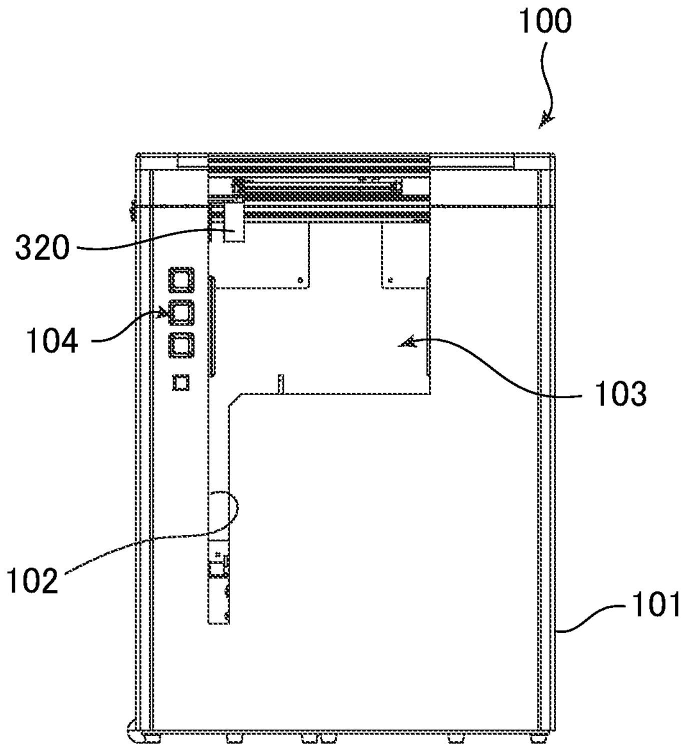
FIG. 2 is a front view of the box forming apparatus of the embodiment.
Figure 3:
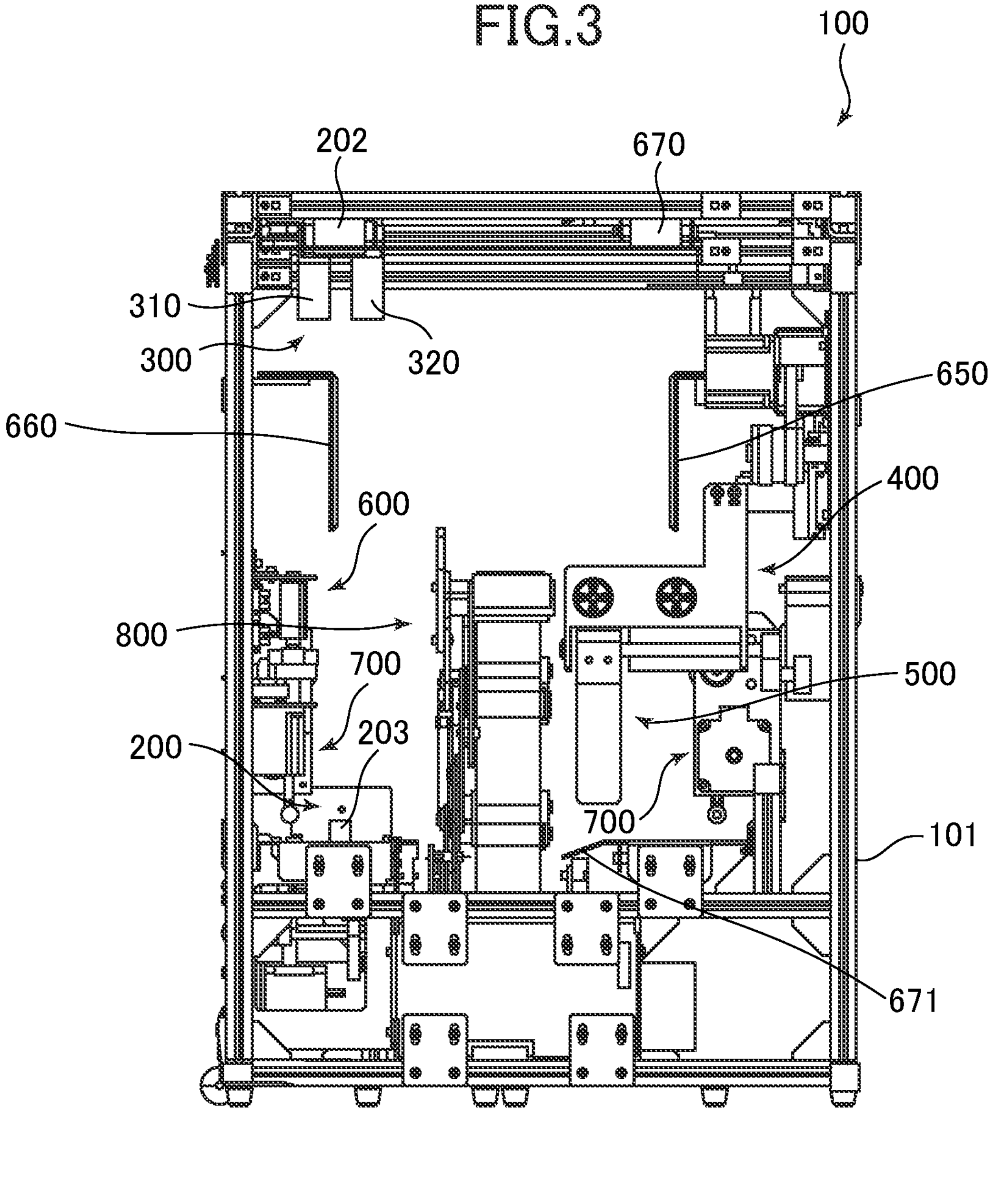
FIG. 3 is a cross-sectional view in which the box forming apparatus of the embodiment is viewed from the front side.

As illustrated in FIGS. 1 to 3, the box forming apparatus 100 of the present embodiment includes a housing 101, a conveyance mechanism 200, an opening mechanism 300, a first pressing mechanism 400, a first flap-bending mechanism 500, a regulation mechanism 600 (see FIG. 15, for example), a second flap-bending mechanism 700 (see FIG. 18, for example), and a tape unit 800. In the box forming apparatus 100 of the present embodiment, if a cardboard sheet folded like a plate is inserted into the box forming apparatus 100, the following operations are performed in the housing 101. That is, the cardboard sheet is opened so as to have a tube shape, then flaps of the tube-shaped cardboard on one side are bent, and then a tape is stuck on the flaps. In this manner, a box-shaped cardboard, which is tube-shaped and flaps of which are opened on the other side, is automatically assembled.

Hereinafter, the overall configuration will be described. Note that in the following description, the right front side with respect to FIG. 1 and the front side with respect to FIG. 2 are defined as the front side of the apparatus. In addition, unless otherwise specified, the front-back direction and the right-left direction are directions determined when the apparatus is viewed from the front side.

As illustrated in FIGS. 1 and 2, the housing 101 includes an insertion hole 102 through which a cardboard sheet is inserted, and an outlet 103 through which an assembled cardboard is taken out. The insertion hole 102 and the outlet 103 are formed in a front face of the housing 101. Note that the front side is a side on which an operator operates the box forming apparatus. That is, in the box forming apparatus 100 of the present embodiment, the insertion hole 102 and the outlet 103 are formed in the front face of the apparatus so that the insertion of the cardboard sheet and the taking out of the assembled cardboard can be performed in the same direction. On the front face of the housing 101, an operation portion 104 is disposed. The operation portion 104 includes a start button and a stop button of the apparatus. The operation portion 104 may include a display portion, such as a lamp or a display, that displays the status of the apparatus.

The insertion hole 102 is a slit that is formed on the left side with respect to a center portion of the apparatus in the right-left direction when the housing 101 is viewed from the front side. The slit is formed along the up-down direction, so as to extend from a substantially central portion to a lower portion in the up-down direction. Thus, an operator inserts a cardboard sheet into the box forming apparatus 100 through the insertion hole 102 in a state where the cardboard sheet stands. Note that although the description will be made for the case where the insertion hole 102 is formed on the left side with respect to the center portion, the insertion hole 102 may be formed on the right side with respect to the center portion.

The outlet 103 is formed above the insertion hole 102, so as to be continuous with the insertion hole 102. The opening area of the outlet 103 is larger than the opening area of the insertion hole 102. Specifically, the outlet 103 has an opening area that allows an operator to take out an assembled cardboard. In addition, the outlet 103 is opened in an area that extends from the front face to the top face of the housing 101, for easily taking out an assembled cardboard. Note that the left edge portion of the outlet 103 is aligned with the left edge portion of the insertion hole 102 in the up-down direction.

FIG. 3 is a cross-sectional view in which the internal configuration of the box forming apparatus 100 is viewed from the front face side. In the housing 101, mechanisms including the conveyance mechanism 200, the opening mechanism 300, the first pressing mechanism 400, and the first flap-bending mechanism 500, and units are disposed. The conveyance mechanism 200 is disposed at a position that overlaps with the insertion hole 102 in an insertion direction of the cardboard sheet (i.e., the direction that extends from the front side toward the back side). In particular, as described below, a conveyance roller 201 is disposed in a lower portion of the apparatus, and a driven roller 202 is disposed in an upper portion of the apparatus. The conveyance roller 201 conveys a cardboard sheet inserted from the insertion hole 102, and the driven roller 202 is used to nip and convey the cardboard sheet between the conveyance roller 201 and the driven roller 202.

The opening mechanism 300 is disposed in an upper portion of the apparatus and below the driven roller 202, for opening the cardboard sheet. The opening mechanism 300 includes a first opening arm 310 and a second opening arm 320. The first opening arm 310 and the second opening arm 320 are disposed so that when the first opening arm 310 and the second opening arm 320 are located at a home position, the first opening arm 310 and the second opening arm 320 nip the cardboard sheet inserted from the insertion hole 102 in a thickness direction. As described in detail below, the first opening arm 310 and the second opening arm 320 are disposed so as to face upper flaps of the cardboard sheet.

The tape unit 800 is disposed in a substantially central portion of the housing 101 in the right-left direction. As described in detail below, the tape unit 800 moves in the front-back direction (i.e., the direction parallel with the insertion direction of the cardboard sheet), and sticks a tape on lower flaps of the cardboard. The tape unit 800 is positioned in a substantially central portion in the right-left direction. Thus, as described below, when the cardboard sheet is opened in the right-left direction, the tape unit 800 is retracted toward either the front side or the back side (the front side in the present embodiment) in the front-back direction, so as not to interfere with the cardboard sheet.

On the right side of the tape unit 800, the first pressing mechanism 400 and the first flap-bending mechanism 500 are disposed. As described in detail below, the first pressing mechanism 400 includes first pressing portions 410 (420) disposed on both sides in the front-back direction. The first pressing portions 410(420) move in the front-back direction, so as to approach each other. In addition, the first pressing portions 410(420) presses a front side face and a back side face of the cardboard sheet that has been opened by the opening mechanism 300, for forming the cardboard sheet like a tube.

As described in detail below, the first flap-bending mechanism 500 includes first bending arms 510(520) that are respectively disposed below and supported by the first pressing portions 410(420), which are disposed on both sides in the front-back direction. The first bending arms 510(520) can move together with the first pressing portions 410(420) in the front-back direction, and while the first pressing portions 410(420) press the front side face and the back side face of the cardboard sheet, the first bending arms 510(520) bend first flaps that are lower flaps of the cardboard sheet, which are continuous with the front side face and the back side face of the cardboard sheet.

A one-side regulation member 650 is disposed above the first pressing mechanism 400, for regulating the position of the right side face of the cardboard sheet that has been opened by the opening mechanism 300. In addition, an other-side regulation member 660 is disposed at a position that faces the one-side regulation member 650, for regulating the position of the left side face of the cardboard sheet. When the cardboard sheet is inserted from the insertion hole 102, the other-side regulation member 660 guides the left side face of the cardboard sheet.

Figure 4:
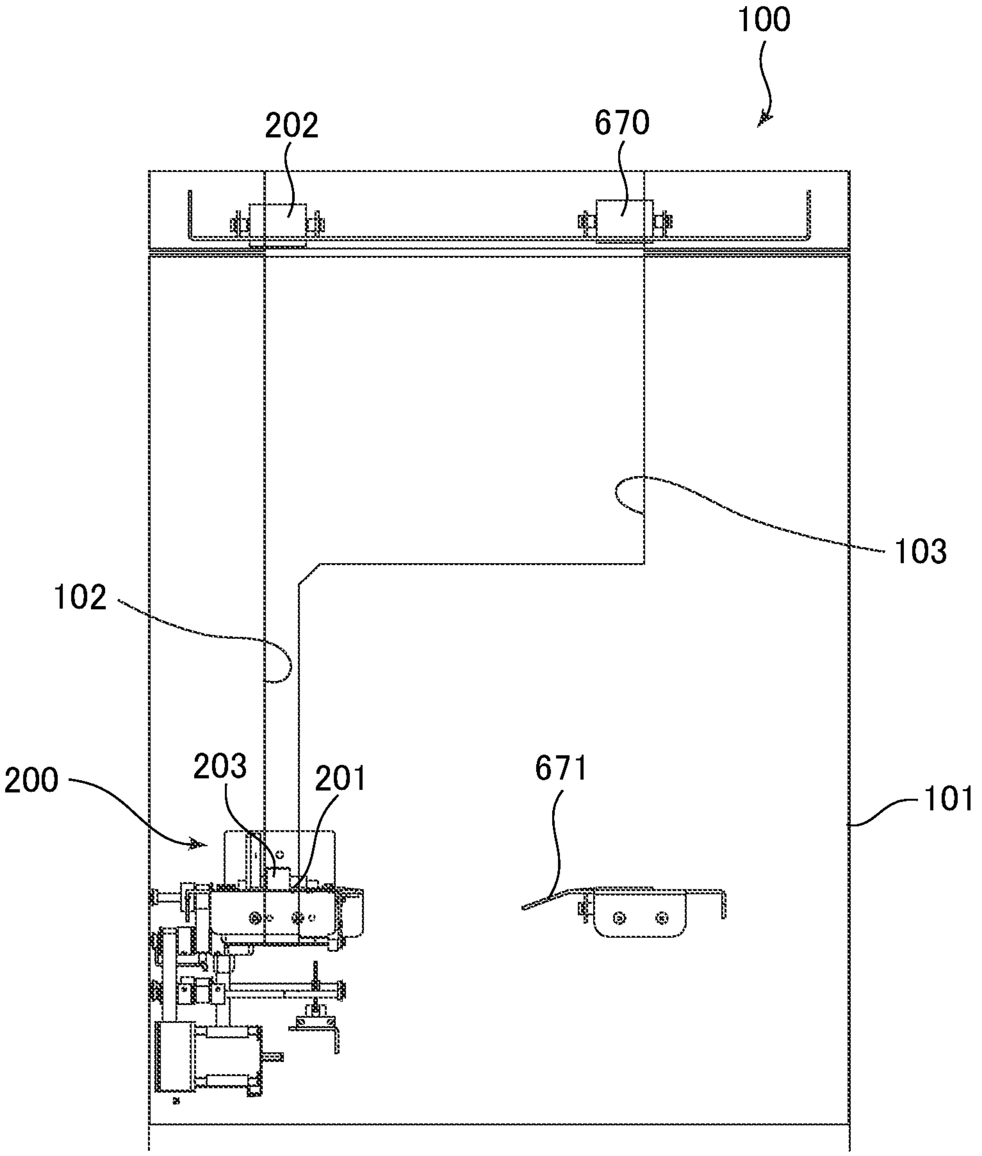
FIG. 4 is a cross-sectional view mainly illustrating a cardboard-sheet conveyance system of the box forming apparatus of the embodiment.

As illustrated in FIGS. 3 and 4, an upper-flap holding roller 670 is disposed above the one-side regulation member 650, for holding an upper flap of the cardboard sheet that has been opened. The upper-flap holding roller 670 is a driven roller that has a rotary shaft parallel with the right-left direction, and can guide the upper flap of the cardboard sheet that has been opened, in the front-back direction.

In addition, as illustrated in FIGS. 3 and 4, a scooping member 671 is disposed below the first pressing mechanism 400 and the first flap-bending mechanism 500. As described above, the tape unit 800 that moves in the front-back direction is disposed in a substantially central position in the housing 101 in the right-left direction. Thus, it is not possible to dispose a member that supports the lower edge portion of the cardboard sheet that is being opened, in an area in which the tape unit 800 moves. For this reason, the scooping member 671 is disposed on the right side of the tape unit 800 and below the first pressing mechanism 400 and the first flap-bending mechanism 500. The scooping member 671 supports the lower edge portion of the cardboard sheet by scooping the lower edge portion, when the lower edge portion of the cardboard sheet, which is being opened, moves past the tape unit 800 in the right-left direction. In this manner, the scooping member 671 prevents the cardboard sheet from inclining. The scooping member 671 is inclined downward more as the scooping member 671 extends leftward. Thus, even if the lower edge portion of the cardboard sheet that is being opened moves slightly in a downward direction, the scooping member 671 can guide the lower edge portion by lifting the lower edge portion.

In the housing 101, the regulation mechanism 600 (see FIGS. 3 and 15, for example) and the second flap-bending mechanism 700 (see FIGS. 3 and 18, for example) are disposed although they cannot be seen in FIGS. 1, 2, and 4 because they are concealed by other components. The regulation mechanism 600 is disposed on the left side in FIG. 3. As described below, the regulation mechanism 600 causes regulation arms 610 and 620 to regulate the position of the front side face and the back side face of the cardboard sheet. The regulation arms 610 and 620 are disposed in the front-back direction, and regulate the position of the front side face and the back side face of the cardboard sheet, together with the first pressing portions 410(420); and form the cardboard sheet like a tube. The second flap-bending mechanism 700 causes second bending arms 710 and 720 to bend second flaps of the cardboard sheet on the lower side. The second bending arms 710 and 720 are disposed on both sides in the right-left direction in FIG. 3. Hereinafter, a configuration of each component will be described in detail.

[Configuration for Inserting Cardboard Sheet]

A configuration for inserting a cardboard sheet will be described with reference to FIGS. 4 and 5. A cardboard sheet inserted from the insertion hole 102, as described above, is conveyed toward the back side (rear side) by the conveyance mechanism 200. The conveyance mechanism 200 includes the conveyance roller 201, the driven roller 202, a first detection sensor 203, a second detection sensor 204, a leading-edge stopper 205, a conveyance-roller driving mechanism 210, and a roller lifting-and-lowering mechanism 220.

The conveyance roller 201 is disposed in a substantially central portion in the front-back direction. The conveyance roller 201 abuts against the lower edge portion of the inserted cardboard sheet, and thereby conveys the cardboard sheet toward the back side. The conveyance roller 201 is driven and rotated by the conveyance-roller driving mechanism 210. In addition, the conveyance roller 201 can be moved in the up-down direction by the roller lifting-and-lowering mechanism 220. As described below, the conveyance roller 201 is positioned at a retracting position (a lower position) when the cardboard sheet is inserted. When the conveyance roller 201 is located at the retracting position, the cardboard sheet is not nipped by the conveyance roller 201 and the driven roller 202. If the cardboard sheet is inserted to some extent, the conveyance roller 201 moves to a conveyance position (an upper position). When the conveyance roller 201 is located at the conveyance position, the cardboard sheet is nipped by the conveyance roller 201 and the driven roller 202, and is conveyed toward the back side.

The reason that the conveyance roller 201 is positioned at the retracting position when the cardboard sheet is inserted is as follows. That is, if the conveyance roller 201 is located at the conveyance position when the cardboard sheet is inserted, the conveyance roller 201 may contact the cardboard sheet when an operator inserts the cardboard sheet manually. In this case, the conveyance roller 201 may become an obstacle when the cardboard sheet is inserted. That is, the operator may have an uncomfortable feeling, such as a feeling of abutment, when the operator inserts the cardboard sheet. For this reason, when the cardboard sheet is inserted manually, the conveyance roller 201 is positioned at the retracting position.

As described below, when the conveyance roller 201 is moved from the retracting position to the conveyance position, the conveyance roller 201 is rotated. This is because if the conveyance roller 201 is lifted while rotated, the cardboard sheet can be conveyed smoothly without giving any uncomfortable feeling to an operator. If the conveyance roller 201 is rotated after the cardboard sheet is nipped, the cardboard sheet inserted by an operator will stop temporarily, and then the conveyance of the cardboard sheet will be started. In this case, the operator may feel the cardboard sheet to be pulled suddenly, and thus may have an uncomfortable feeling.

The driven roller 202 is constituted by a plurality of (three in the present embodiment) rollers arranged in the front-back direction. The driven roller 202 abuts against the upper edge portion of the inserted cardboard sheet, and thereby guides the cardboard sheet backward while regulating the upper edge position of the cardboard sheet. Two of the three driven rollers 202 are disposed on the outer side in the front-back direction, and spaced from each other in the front-back direction. The two driven rollers 202 are disposed such that the conveyance roller 201 is disposed between the two driven rollers 202 in the front-back direction. It is preferable that the conveyance roller 201 be disposed between the two driven rollers 202, disposed on the outer side, for conveying the cardboard sheet, by using less members, while preventing the cardboard sheet from inclining.

Figure 5:
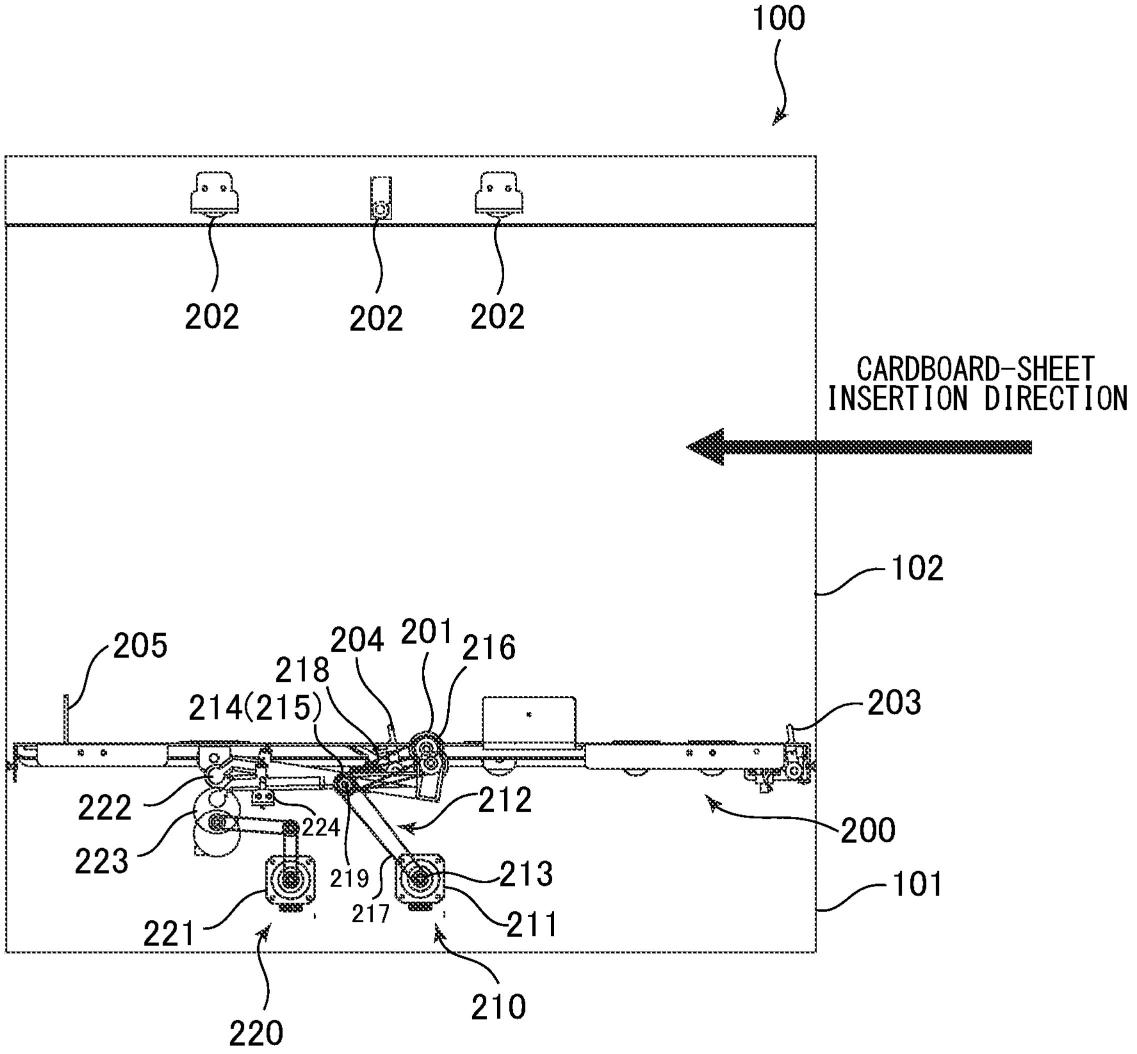
FIG. 5 is a cross-sectional view of the box forming apparatus of the embodiment, taken along an insertion direction of the cardboard sheet.
Figure 7:
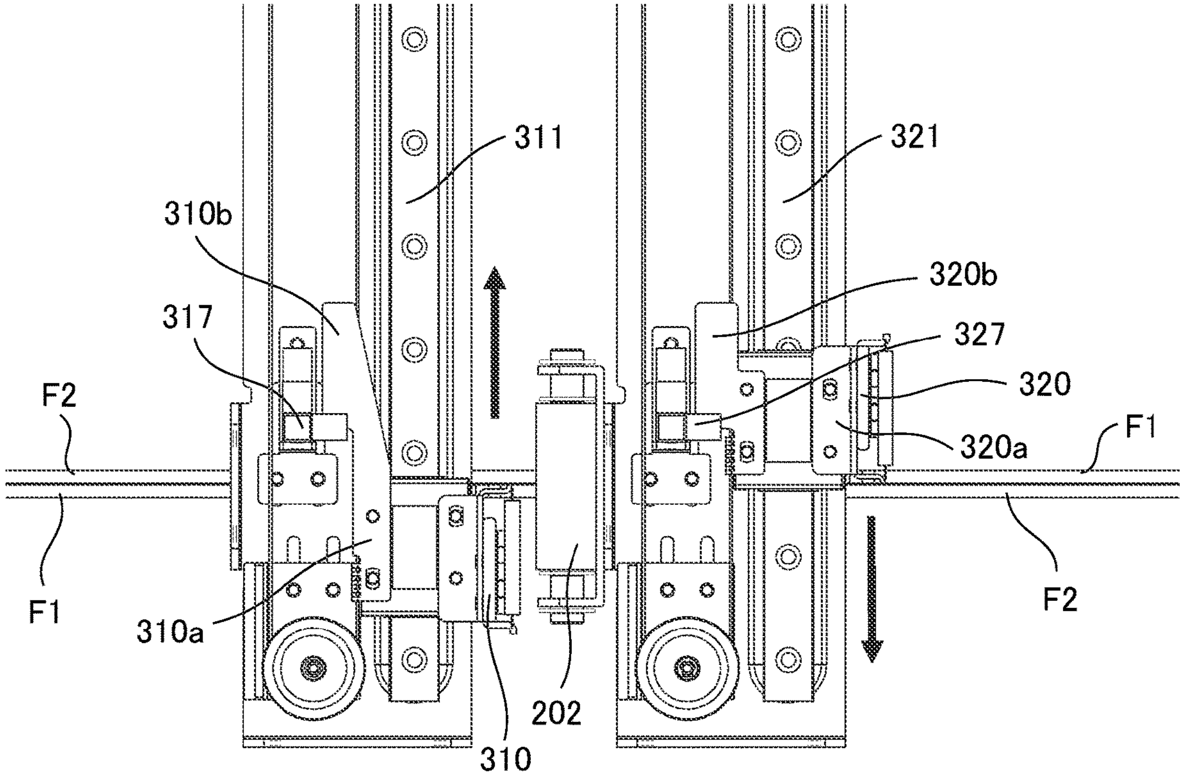
FIG. 7 is a plan view in which the configuration of the opening arms of the embodiment is extracted and illustrated.

Note that in the present embodiment, the cardboard that has been formed into a box in the box forming apparatus 100 is taken out in an upper right direction in FIG. 5. Thus, the driven roller 202 on the right side in FIG. 5 (i.e., on the front side) is disposed slightly on the conveyance roller 201 side. In addition, as illustrated in FIG. 7 described below, the central driven roller 202 of the three driven rollers 202, illustrated in FIG. 5, is disposed between the first opening arm 310 and the second opening arm 320 in the front-back direction. In this arrangement, since the driven roller 202 abuts against a portion (i.e., one plate-like portion S1 in the present embodiment) of the cardboard sheet that receives force in the opening operation for the cardboard sheet, the cardboard sheet can be more efficiently prevented from inclining in the opening operation.

As described below, when the conveyance roller 201 is positioned at the conveyance position, the cardboard sheet can be nipped by the driven roller 202 and the conveyance roller 201 in the up-down direction, which is orthogonal to the conveyance direction of the conveyance roller 201.

The first detection sensor 203 is disposed in the vicinity of the insertion hole 102 (i.e., an inlet), and detects the cardboard sheet inserted from the insertion hole 102. For example, the first detection sensor 203 includes a sensor flag and a sensor. The sensor flag is disposed so as to be able to swing, and can project into the conveyance path of the cardboard sheet and retract from the conveyance path. The sensor detects the swing position of the sensor flag. For example, the sensor is a photo-interrupter.

If the cardboard sheet is inserted from the insertion hole 102, the leading edge of the cardboard sheet abuts against the sensor flag and the sensor flag falls over. As a result, the logic in the sensor changes. With this operation, the insertion of the cardboard sheet is detected by the first detection sensor 203. In the present embodiment, after the insertion of the cardboard sheet is detected by the first detection sensor 203, the driving of the conveyance roller 201 is started.

Note that as described below, the first detection sensor 203 also detects the timing at which the driving of the conveyance roller 201 is stopped. That is, if the cardboard sheet is conveyed to a predetermined insertion position, the trailing edge of the cardboard sheet passes the first detection sensor 203, and the sensor flag rises. Then, the logic in the sensor changes, and it is detected that the trailing edge of the cardboard sheet has passed the first detection sensor 203. Then, depending on the timing at which the passage of the trailing edge of the cardboard sheet is detected by the first detection sensor 203, the driving of the conveyance roller 201 is stopped, and thereby the conveyance of the cardboard sheet is stopped.

The second detection sensor 204 is disposed in the vicinity of a position positioned downstream of the conveyance roller 201 in the conveyance direction of the conveyance roller 201. Like the first detection sensor 203, the second detection sensor 204 also includes a sensor flag and a sensor, for example. The sensor flag is disposed so as to be able to swing, and can project into the conveyance path of the cardboard sheet and retract from the conveyance path. The sensor detects the swing position of the sensor flag. If the leading edge of the cardboard sheet abuts against the sensor flag and the sensor flag falls over, the logic in the sensor changes. With this operation, it is detected that the cardboard sheet has passed the position of the second detection sensor 204. In the present embodiment, as described below, if the passage of the cardboard sheet is detected by the second detection sensor 204, the movement of the conveyance roller 201 (that is in the retracting position) toward an upper position is started. Then, the conveyance roller 201 abuts against the lower edge portion of the cardboard sheet, so that the cardboard sheet is nipped by the conveyance roller 201 and the driven roller 202 and the conveyance of the cardboard sheet is started by the conveyance roller 201.

The leading-edge stopper 205 is disposed downstream of the second detection sensor 204 in the conveyance direction. The leading edge of the cardboard sheet, conveyed by the conveyance roller 201, abuts against the leading-edge stopper 205, and the leading-edge stopper 205 prevents the cardboard sheet from being conveyed anymore. In a state where the cardboard sheet abuts against the leading-edge stopper 205, the cardboard sheet is located at the predetermined insertion position. The opening of the cardboard sheet is started, with the insertion position serving as a reference position.

The conveyance-roller driving mechanism 210 includes a roller driving motor 211 and a driving-force transmission mechanism 212. The driving force from the roller driving motor 211 is transmitted to the conveyance roller 201 via the driving-force transmission mechanism 212. The driving-force transmission mechanism 212 includes a first pulley 213, a second pulley 214, a third pulley 215, a fourth pulley 216, a first belt 217, and a second belt 218. The first pulley 213 is fixed to the driving shaft of the roller driving motor 211, and the first belt 217 is stretched between and wound around the first pulley 213 and the second pulley 214. The third pulley 215 is disposed coaxially with the second pulley 214, and rotates together with the second pulley 214. The second belt 218 is stretched between and wound around the third pulley 215 and the fourth pulley 216. The fourth pulley 216 is fixed to the rotary shaft of the conveyance roller 201.

The rotational force from the roller driving motor 211 is transmitted to the conveyance roller 201 via the first pulley 213, the first belt 217, the second pulley 214, the third pulley 215, the second belt 218, and the fourth pulley 216 in this order. As described below, the conveyance roller 201 can swing in the up-down direction, with the rotary shaft of the second pulley 214 and the third pulley 215 serving as a swing shaft 219. In the present embodiment, the driving force from the motors is transmitted to the conveyance roller 201 via two pulley transmission mechanisms, for swinging the conveyance roller 201 in the up-down direction. Note that if the movement of the conveyance roller 201 in the up-down direction and the transmission of the driving force from the motor can be both achieved, another mechanism, such as a gear mechanism, may be used.

The roller lifting-and-lowering mechanism 220 serves as a nip release portion. The roller lifting-and-lowering mechanism 220 allows the conveyance roller 201 and the driven roller 202 to nip the cardboard sheet and release the nipping of the cardboard sheet. The roller lifting-and-lowering mechanism 220 includes a lifting-and-lowering driving motor 221, a lifting-and-lowering arm 222, and a lifting-and-lowering cam 223. The rotational driving force from the lifting-and-lowering driving motor 221 is transmitted to the lifting-and-lowering cam 223 via a driving-force transmission mechanism, including pulleys. The lifting-and-lowering cam 223 is an eccentric cam, and the distance from the center of rotation to the outer circumferential surface (i.e., the cam surface) varies, depending on the rotation angle. The lifting-and-lowering arm 222 is supported so as to be able to swing around the above-described swing shaft 219. One end side of the lifting-and-lowering arm 222 supports the conveyance roller 201 such that the conveyance roller 201 can rotate, and the lifting-and-lowering cam 223 is disposed in contact with the lower surface of the other end side of the lifting-and-lowering arm 222.

If the lifting-and-lowering cam 223 is rotated by driving the lifting-and-lowering driving motor 221, the lifting-and-lowering arm 222 swings around the swing shaft 219, and moves the conveyance roller 201 in the up-down direction. In FIG. 5, the conveyance roller 201 located at the conveyance position and the conveyance roller 201 located at the retracting position are both illustrated, superposed on each other. If the lifting-and-lowering arm 222 is lifted by the lifting-and-lowering cam 223, the conveyance roller 201 is lowered to the retracting position. If the lifting-and-lowering cam 223 rotates at this position and the lifting-and-lowering arm 222 is lowered, the conveyance roller 201 is lifted to the conveyance position. The lifting and lowering of the conveyance roller 201 is detected by a conveyance-roller lifting-and-lowering sensor 224. For example, the conveyance-roller lifting-and-lowering sensor 224 detects the position of the lifting-and-lowering arm 222.

[Flow of Conveyance Operation for Cardboard Sheet]

Figure 40:
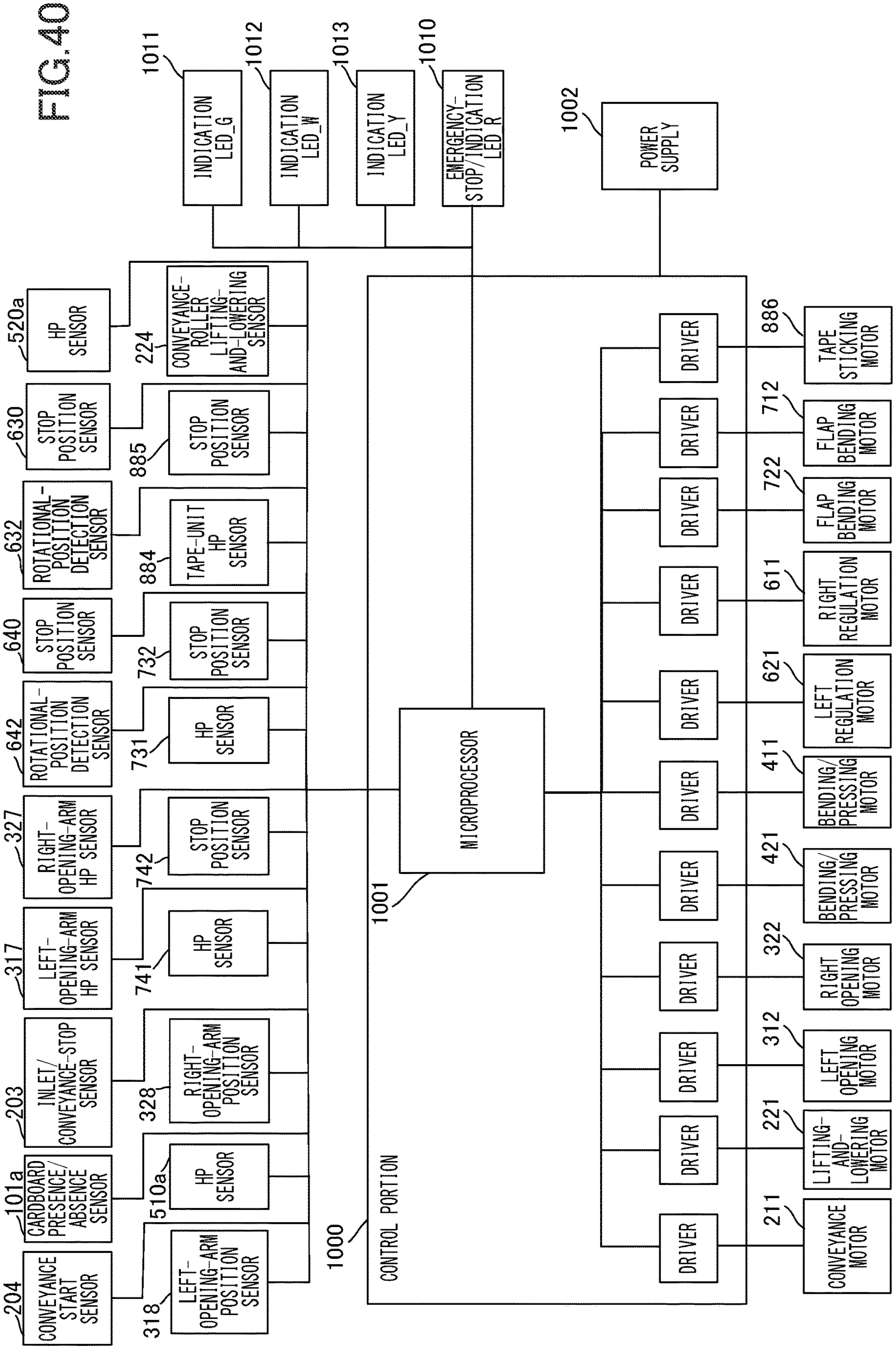
FIG. 40 is a control block diagram of the box forming apparatus of the embodiment.
Figure 41:
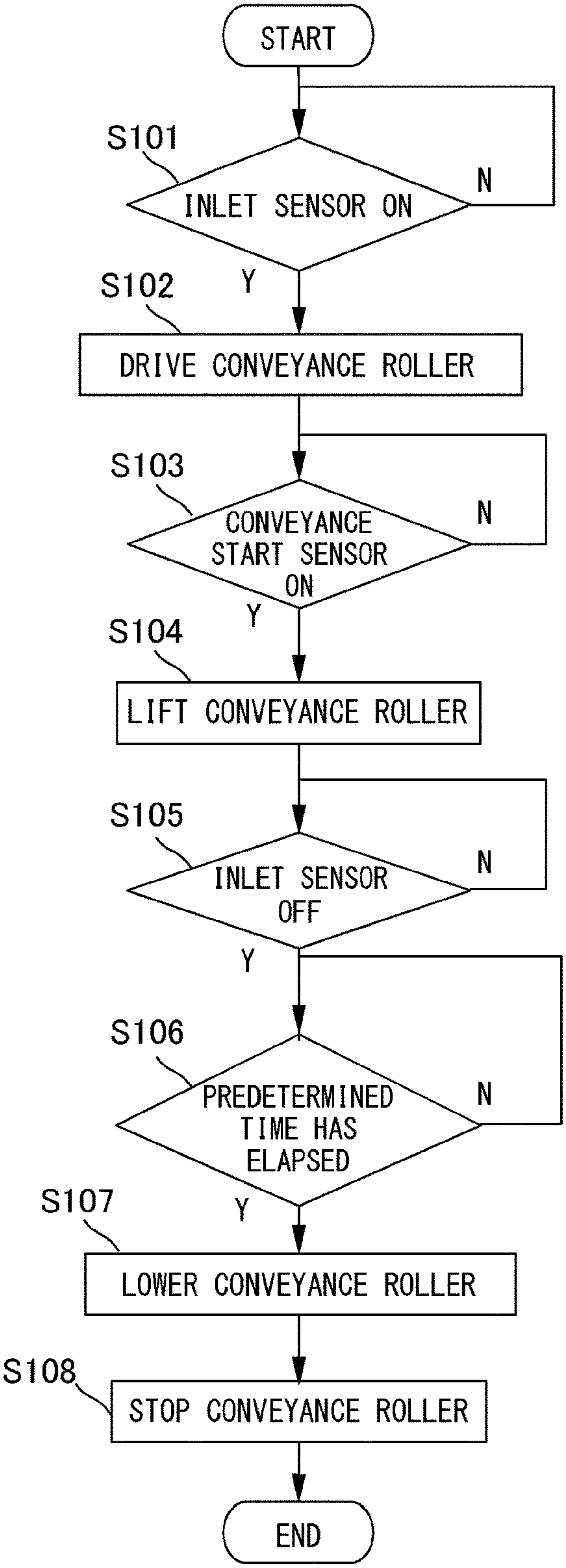
FIG. 41 is a flowchart of the embodiment illustrating the control performed in a period of time from when a cardboard sheet is inserted, until when the cardboard sheet is conveyed to an insertion position.

Next, operations for conveying the cardboard sheet to the insertion position by using the above-described conveyance configuration will be described with reference to FIG. 41. Note that the following operations are performed by a control portion 1000 illustrated in FIG. 40, which will be described below. First, an operator starts to manually insert a cardboard sheet from the insertion hole 102. If the first detection sensor (inlet sensor) 203 detects the cardboard sheet (i.e., turns ON) (S101), then the driving of the conveyance roller 201 is started (S102). As described above, when the cardboard sheet is inserted, the conveyance roller 201 is retracted from the conveyance path to a lower position (i.e., the conveyance roller 201 is located at the retracting position). In other words, after the so-called initial operation is performed for turning on the power supply of the apparatus and checking the operation of each component, the conveyance roller 201 is on standby at a position retracted downward from the conveyance path. The position is a default position of the conveyance roller 201.

If the leading edge of the cardboard sheet in the insertion direction passes the position of the conveyance roller 201 and is detected by the second detection sensor (conveyance start sensor) 204 (i.e., the second detection sensor 204 turns ON) (S103), the rotation of the lifting-and-lowering driving motor 221 is started and the conveyance roller 201 is lifted to the conveyance position (S104). That is, the lifting-and-lowering cam 223 is rotated by rotating the lifting-and-lowering driving motor 221, so that the lifting-and-lowering arm 222 that is in contact with the cam surface swings around the swing shaft 219. Then, the conveyance roller 201 is moved from the retracting position to the conveyance path (the conveyance position), and is caused to abut against the lower edge portion of the cardboard sheet.

After the conveyance roller 201 abuts against the cardboard sheet, the cardboard sheet is conveyed by the conveyance roller 201. When the cardboard sheet is conveyed by the conveyance roller 201, the operator feels an operational feeling in which the cardboard sheet is automatically conveyed after the operator inserts the cardboard sheet to some extent. Then, even after the trailing edge of the cardboard sheet passes the first detection sensor 203 and the logic in the sensor changes (i.e., the sensor turns OFF), the rotation of the conveyance roller 201 is continued for a predetermined period of time (S105).

Specifically, the rotation of the conveyance roller is continued for a period of time that corresponds to a distance larger than a predetermined distance that causes the leading edge of the cardboard sheet to abut against the leading-edge stopper 205. In this situation, the cardboard sheet is stopping and the conveyance roller 201 slips because the leading edge of the cardboard sheet is in contact with the leading-edge stopper 205. This operation is performed for stopping the cardboard sheet in a state where the cardboard sheet is reliably in contact with the leading-edge stopper 205. That is, the operation is performed for ensuring the stop position of the cardboard sheet.

After the predetermined time has elapsed since the first detection sensor 203 turned OFF (S106), the conveyance roller 201 is lowered to the retracting position by swinging the lifting-and-lowering arm 222, by driving the lifting-and-lowering driving motor 221 (S107). That is, after the cardboard sheet is conveyed to the insertion position by the conveyance roller 201, the cardboard sheet is released from the nip by the conveyance roller 201 and the driven roller 202. After another predetermined time has elapsed, the rotation of the conveyance roller 201 is stopped (S108). In this state, the cardboard sheet is positioned at the predetermined insertion position in the housing 101.

As described above, in the present embodiment, when the cardboard sheet is conveyed, the cardboard sheet is nipped by the conveyance roller 201 and the driven roller 202, so that the position of the cardboard sheet in the up-down direction is regulated. After the conveyance is completed, the position regulation of the cardboard sheet in the up-down direction is stopped (that is, the cardboard sheet is released from the nip) by retracting the conveyance roller 201. This operation is performed for smoothly opening the folded cardboard sheet in an opening operation, which will be described below.

[Configuration for Opening Cardboard Sheet]

Figure 6:
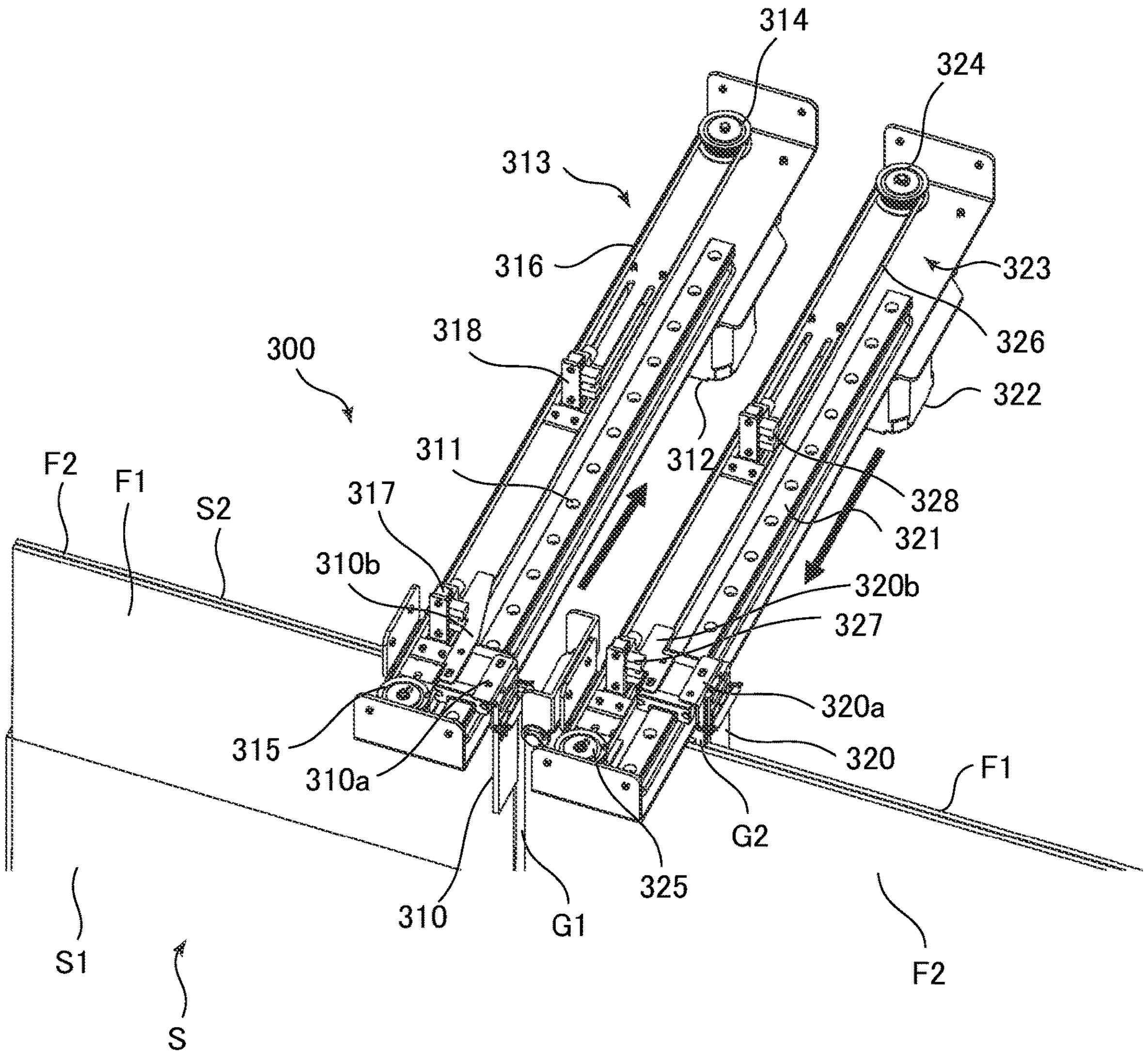
FIG. 6 is a perspective view in which a configuration of opening arms of the embodiment is extracted and illustrated.

Next, a configuration for opening the cardboard sheet will be described with reference to FIGS. 6 to 11. The cardboard sheet S inserted to the insertion position, as described above, is opened by the opening mechanism 300 and formed like a tube whose cross section is substantially rectangular. The opening mechanism 300 includes a first opening arm 310 and a second opening arm 320. As illustrated in FIGS. 6 and 7, the first opening arm 310 and the second opening arm 320 are disposed so that when the first opening arm 310 and the second opening arm 320 are located at a home position, the first opening arm 310 and the second opening arm 320 nip upper flaps of the cardboard sheet S located at the insertion position in the thickness direction. As illustrated in FIGS. 2 and 3, the first opening arm 310 is on standby at a position on the left side with respect to the other-side regulation member 660. In addition, the second opening arm 320 is on standby at a position on the right side with respect to the right edge portion of the insertion hole 102. Since the first opening arm 310 and the second opening arm 320 are located at the above-described standby positions, the cardboard sheet S inserted by an operator can be led to a space between the first opening arm 310 and the second opening arm 320. In addition, the first opening arm 310 and the second opening arm 320 are disposed at positions shifted from each other in the front-back direction.

In other words, the cardboard sheet S is conveyed to the space between the first opening arm 310 and the second opening arm 320, by the above-described conveyance configuration. In the box forming apparatus 100 of the present embodiment, the distance from the leading edge of the inserted cardboard sheet S to a below-described clearance (slit) between flaps is predetermined, and the first opening arm 310 and the second opening arm 320 are disposed at the predetermined position.

The first opening arm 310 and the second opening arm 320 are disposed with respect to the leading-edge stopper 205. For this reason, the leading edge of the cardboard sheet S is forced to reliably abut against the leading-edge stopper 205, as described above. As described above, for forcing the leading edge of the cardboard sheet S to reliably abut against the leading-edge stopper 205, the conveyance roller 201 is rotated more than the expected number of pulses or distance that causes the leading edge of the cardboard sheet S to abut against the leading-edge stopper 205, after the cardboard sheet is detected by the second detection sensor 204.

The cardboard sheet S used for the box forming apparatus 100 of the present embodiment has a rectangular shape when the cardboard sheet S is assembled (formed) into a box and viewed from the flap side. Thus, a pair of plate-like portions S1 and S2 of the cardboard sheet that face each other in a state where the cardboard is folded like a plate each have a pair of flaps whose lengths are different from each other. The pair of flaps are adjacent to each other in a state where the cardboard is a sheet. The pair of flaps whose lengths are different from each other are formed on both sides of each of the plate-like portions S1 and S2 (i.e., on both sides of each of the plate-like portions S1 and S2, located in the insertion position, in the up-down direction). In general, a clearance is formed between adjacent flaps that form a pair. In a cardboard that has a rectangular shape, as described above, when viewed from the flap side, the position of the clearance of the plate-like portion S1 and the position of the clearance of the plate-like portion S2 are different from each other (the plate-like portions S1 and S2 form a pair).

In a state where the cardboard sheet S is opened in the box forming apparatus 100 of the present embodiment, flaps located on both sides in the front-back direction are defined as first flaps F1, and flaps located on both sides in the right-left direction are defined as second flaps F2. In addition, in the present embodiment, the first opening arm 310 is disposed downstream (on the back side) of the second opening arm 320 in the insertion direction of the cardboard sheet S. As described below, the cardboard sheet S is opened by largely moving the first opening arm 310 toward the right side of the apparatus. Thus, the first flap F1 is shorter in length than the second flap F2. In addition, a clearance (hereinafter referred to as a first clearance G1) between a pair of flaps F1 and F2 of one plate-like portion S1, which constitutes the pair of plate-like portions S1 and S2 and which is located on the left side at the insertion position, is positioned on the back side with respect to a clearance (hereinafter referred to as a second clearance G2) between a pair of flaps F1 and F2 of the other plate-like portion S2, which is located on the right side. Thus, in the box forming apparatus 100 of the present embodiment, the shape of the cardboard and the insertion direction of the cardboard sheet S are determined in advance. In addition, the box forming apparatus 100 is suitable for forming a cardboard into a box, and in this case, the position of the first clearance G1 and the position of the second clearance G2 do not overlap with each other in a state where the cardboard sheet S is folded like a plate. That is, the box forming apparatus 100 of the present embodiment opens the cardboard sheet S by using flaps that face each other via a clearance in a state where the cardboard sheet S is a folded cardboard sheet.

In addition, as illustrated in FIG. 6, the second flap F2 of the plate-like portion S2 faces the first clearance G1 of the plate-like portion S1, and the second flap F2 of the plate-like portion S1 faces the second clearance G2 of the plate-like portion S2. The first opening arm 310 is inserted into the first clearance G1 and is moved further, so that the second flap F2 of the plate-like portion S2 that faces the first clearance G1 is pushed by the first opening arm 310. Similarly, the second opening arm 320 is inserted into the second clearance G2 and is moved further, so that the second flap F2 of the plate-like portion S1 that faces the second clearance G2 is pushed by the second opening arm 320. In the present embodiment, the cardboard sheet S is opened by largely moving the first opening arm 310.

Note that since the insertion direction of the cardboard sheet S is fixed, the order of the first clearance G1 and the second clearance G2 in the insertion direction (i.e., the front-back direction) is always the same. In the actual use state of the box forming apparatus, the position of a label stuck to the cardboard and the printing position of the cardboard are almost the same in the same type of cardboards. Thus, in the actual operation, the cardboard sheet S is generally inserted in the same direction. Hereinafter, a configuration for opening the cardboard sheet will be specifically described.

Figure 8:
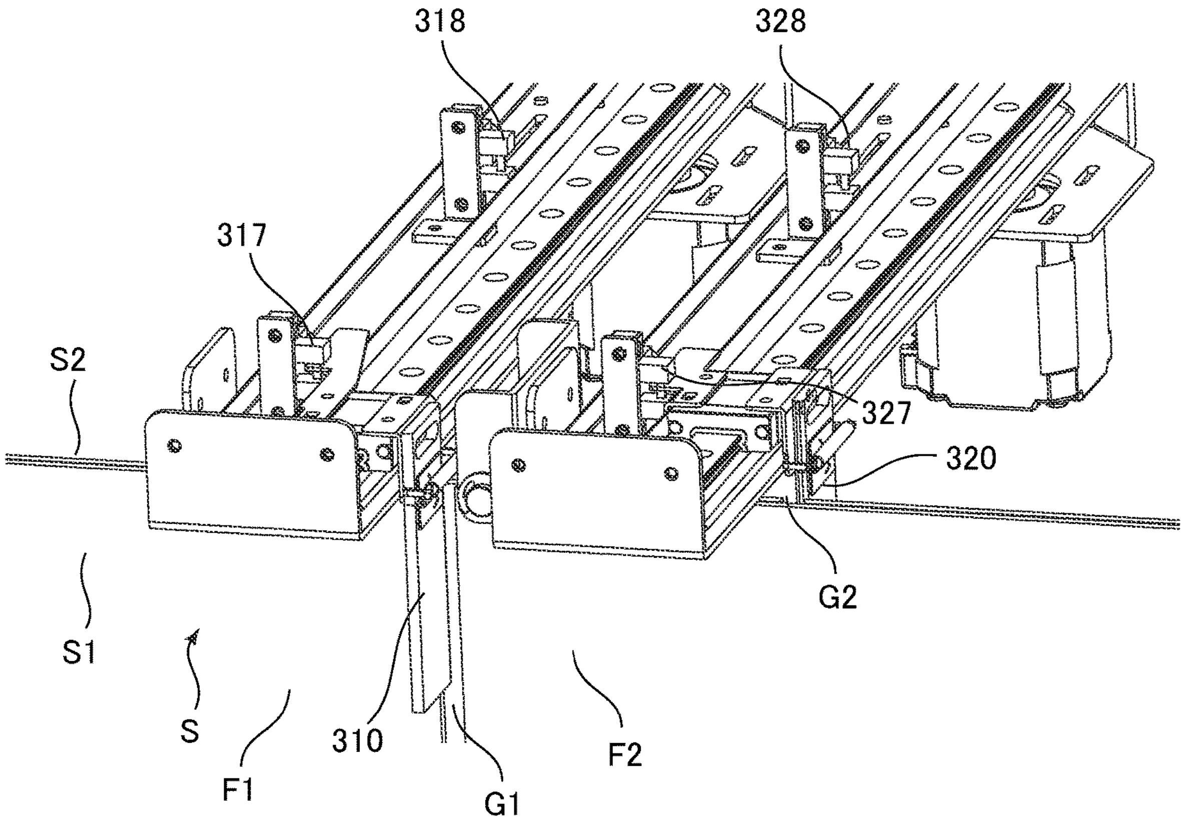
FIG. 8 is an enlarged perspective view in which the configuration of the opening arms of the embodiment is extracted, and which illustrates an opening arm that is being inserted into a clearance.

As illustrated in FIG. 8, the first opening arm 310 that serves as an opening arm is a plate-like member whose thickness is smaller than the clearance (i.e., the first clearance G1) between the flaps of the one plate-like portion S1 (i.e., between the first flap F1 and the second flap F2 of the one plate-like portion S1) of the pair of plate-like portions S1 and S2 of the cardboard sheet S folded like a plate (the plate-like portion S1 and the plate-like portion S2 form a pair and face each other). The length of the first opening arm 310 is smaller than the length of the first clearance G1. The first opening arm 310 is fixed to a first moving block 310*a*, and the first moving block 310*a* can move along a first guide rail 311 disposed in the right-left direction.

As illustrated in FIG. 6, the first opening arm 310 is moved by a first opening motor (i.e., a left opening motor) 312 that serves as a moving unit. Specifically, the driving force from the first opening motor 312 is transmitted to the first opening arm 310 via a first opening mechanism 313, so that the first opening arm 310 is moved in the right-left direction. The first opening mechanism 313 includes a pulley 314, a pulley 315, and a belt 316. The pulley 314 is connected with the driving shaft of the first opening motor 312 via a driving-force transmission mechanism, such as a pulley mechanism. The belt 316 is stretched between and wound around the pulley 314 and the pulley 315. In addition, the first moving block 310*a* is fixed to the belt 316.

If the first opening motor 312 is driven, the pulley 314 rotates, and the belt 316 moves in a circumferential direction. When the belt 316 moves in a circumferential direction, the first moving block 310*a* and the first opening arm 310 are moved along the first guide rail 311 by the movement of the belt 316 because the first moving block 310*a* is fixed to the belt 316.

In the present embodiment, a first home-position detection sensor (i.e., a left-opening-arm HP sensor) 317 and a first arm-position detection sensor (i.e., a left-opening-arm position sensor) 318 are disposed. The first home-position detection sensor 317 detects the first opening arm 310 located at the home position. The first arm-position detection sensor 318 detects the first opening arm 310 that has moved to a first predetermined position. Each of both detection sensors 317 and 318 is a photo-interrupter that has a light emitting portion and a light receiving portion, which face each other. In addition, a first flag 310*b* is disposed on the first moving block 310*a*, and can pass through the detection sensors 317 and 318. Each of both detection sensors 317 and 318 detects the position of the first opening arm 310 by detecting the passage of the first flag 310*b*.

Figure 9:
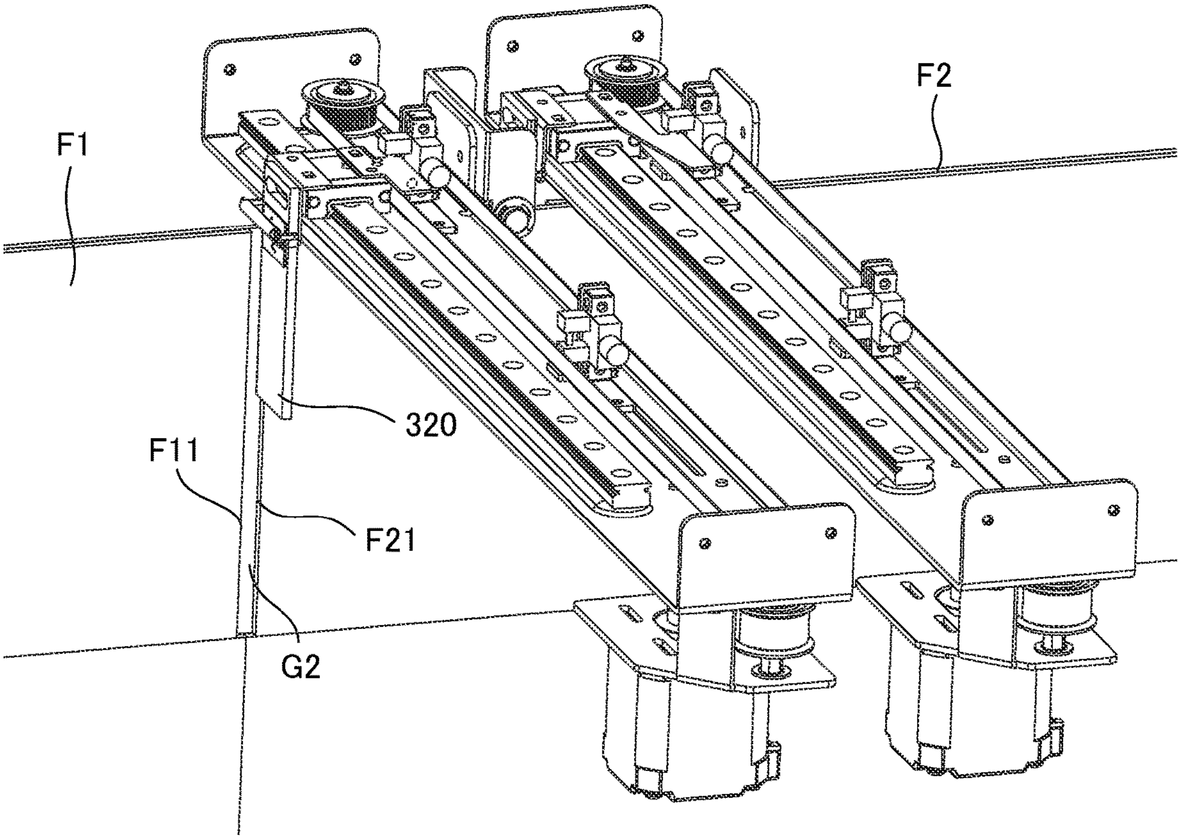
FIG. 9 is a perspective view viewed from a side opposite to a side from which the perspective view of FIG. 8 is viewed.

As illustrated in FIG. 9, the second opening arm 320 is a plate-like member whose thickness is smaller than the clearance (i.e., the second clearance G2) between the flaps of the other plate-like portion S2 (i.e., between the first flap F1 and the second flap F2 of the other plate-like portion S2) of the pair of plate-like portions S1 and S2 of the cardboard sheet S folded like a plate (the plate-like portion S1 and the plate-like portion S2 form a pair and face each other). The length of the second opening arm 320 is smaller than the length of the second clearance G2. The second opening arm 320 is fixed to a second moving block 320*a*, and the second moving block 320*a* can move along a second guide rail 321 disposed in the right-left direction.

As illustrated in FIG. 6, the second opening arm 320 is moved by a second opening motor (i.e., a right opening motor) 322. Specifically, the driving force from the second opening motor 322 is transmitted to the second opening arm 320 via a second opening mechanism 323, so that the second opening arm 320 is moved in the right-left direction. The second opening mechanism 323 includes a pulley 324, a pulley 325, and a belt 326. The pulley 324 is connected with the driving shaft of the second opening motor 322 via a driving-force transmission mechanism, such as a pulley mechanism. The belt 326 is stretched between and wound around the pulley 324 and the pulley 325. In addition, the second moving block 320*a* is fixed to the belt 326.

If the second opening motor 322 is driven, the pulley 324 rotates, and the belt 326 moves in a circumferential direction. When the belt 326 moves in a circumferential direction, the second moving block 320*a* and the second opening arm 320 are moved along the second guide rail 321 by the movement of the belt 326 because the second moving block 320*a* is fixed to the belt 326.

In the present embodiment, a second home-position detection sensor (i.e., a right-opening-arm HP sensor) 327 and a second arm-position detection sensor (i.e., a right-opening-arm position sensor) 328 are disposed. The second home-position detection sensor 327 detects the second opening arm 320 located at the home position. The second arm-position detection sensor 328 detects the second opening arm 320 that has moved to a second predetermined position. Each of both detection sensors 327 and 328 is a photo-interrupter that has a light emitting portion and a light receiving portion, which face each other. In addition, a second flag 320*b* is disposed on the second moving block 320*a*, and can pass through the detection sensors 327 and 328. Each of both detection sensors 327 and 328 detects the position of the second opening arm 320 by detecting the passage of the second flag 320*b*. Note that if the position control can be performed by using pulses from a motor, the first arm-position detection sensor 318 and the second arm-position detection sensor 328 may not be disposed.

Figure 10:
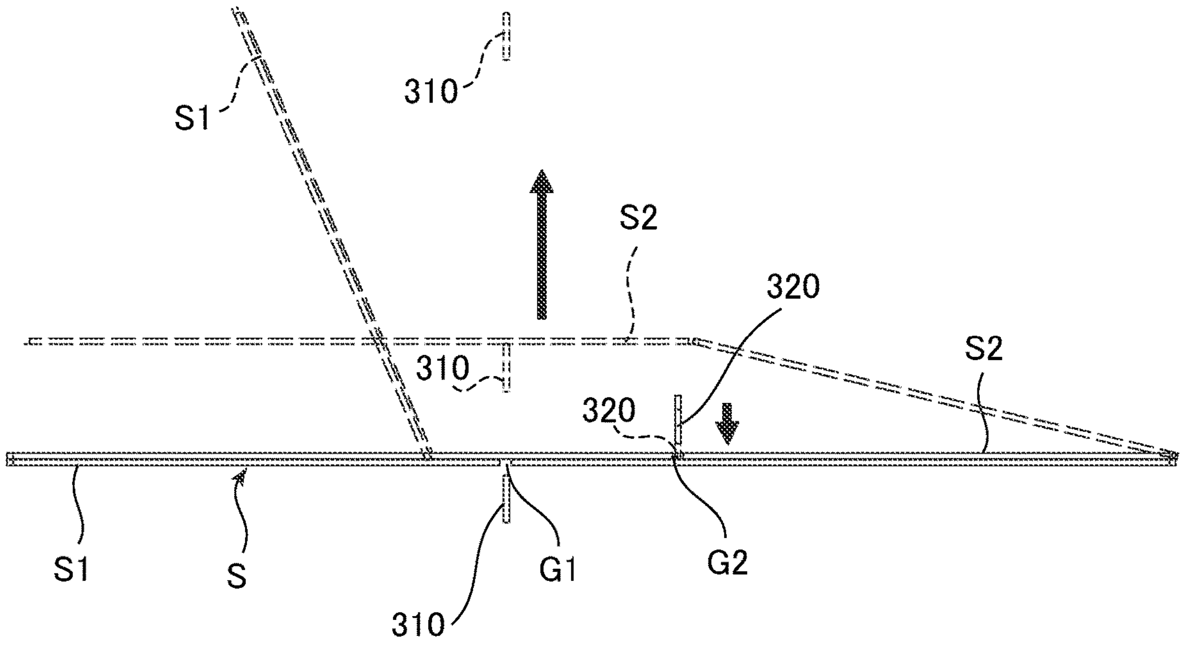
FIG. 10 is a schematic diagram illustrating a state where a cardboard sheet is being opened by the opening arm.
Figure 11:
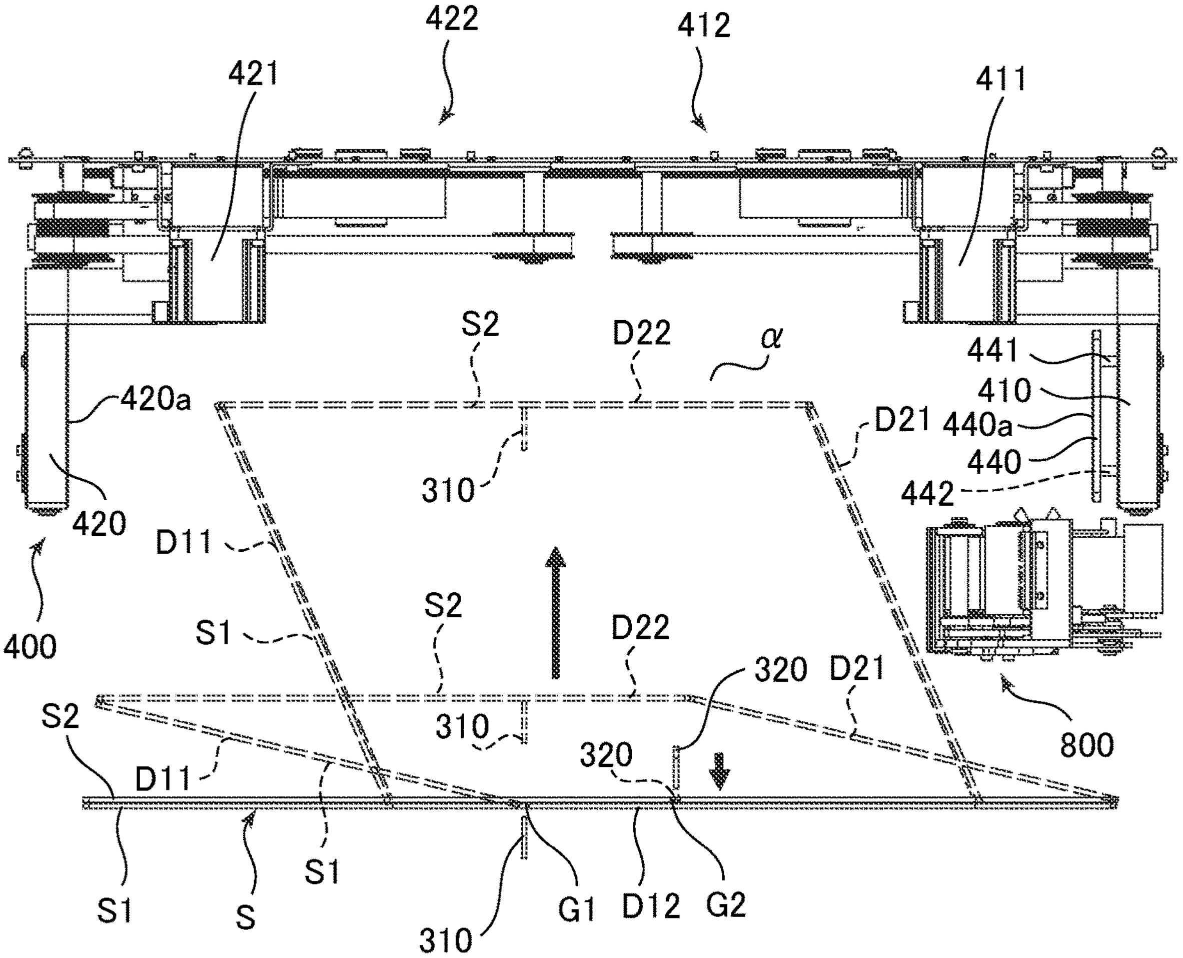
FIG. 11 is a plan view illustrating pressing arms and a tape unit of the embodiment, in a state where a cardboard sheet is being opened.

For opening the cardboard sheet S in the above-described configuration, the first opening arm 310 is moved from the home position, illustrated in FIGS. 6 and 7, rightward by driving the first opening motor 312. As illustrated in FIGS. 10 and 11, when the cardboard sheet S is opened, the first opening arm 310 moves, while pushing the second flap F2 of the other plate-like portion S2, so that the other plate-like portion S2 is separated from the one plate-like portion S1. The first opening arm 310 is arranged such that the first opening arm 310 pushes the second flap F2 and moves the other plate-like portion S2 with respect to the above-described insertion position.

In a state where the cardboard sheet S is conveyed to the insertion position by the above-described conveyance configuration, the cardboard sheet S is nipped by the conveyance roller 201 and the driven roller 202. In this state, it is difficult to open the cardboard sheet S. Thus, in the present embodiment, after the cardboard sheet S is conveyed to the insertion position by the conveyance roller 201, the cardboard sheet S is released from the nip by the conveyance roller 201 and the driven roller 202, by operating the roller lifting-and-lowering mechanism 220. After the cardboard sheet S is released from the nip, the movement of the first opening arm 310 is started.

However, if the cardboard sheet S is opened in a state where the cardboard sheet S is released from the nip, the posture of the cardboard sheet S will become unstable and the cardboard sheet S may be inclined in the opening operation. For this reason, in the present embodiment, after a predetermined time has elapsed since the start of movement of the first opening arm 310, the cardboard sheet S is nipped again. The predetermined time is a time required for the other plate-like portion S2 to reach a position separated from the conveyance roller 201 in the rotation-axis direction of the conveyance roller 201. That is, the other plate-like portion S2 is moved to a position at which the other plate-like portion S2 is not nipped even if the nip operation is performed again, and after that, only the one plate-like portion S1 is nipped. With this operation, the difficult opening operation for the cardboard sheet S, caused by the nip, can be avoided, and the disturbance in posture of the cardboard sheet S, such as inclining, can be prevented in the opening operation.

Preferably, the predetermined time is a time in which the other plate-like portion S2, moved by the first opening arm 310, has still not reached the movement path of the tape unit 800. This is because if the other plate-like portion S2 moves to the movement path of the tape unit 800, the cardboard sheet will easily incline.

On the other hand, while the first opening arm 310 moves the other plate-like portion S2 by pushing the second flap F2 of the other plate-like portion S2, the second opening arm 320 is in contact with the second flap F2 that is formed in the one plate-like portion S1 and that faces the second clearance G2, in a state where the second opening arm 320 is inserted in the second clearance G2. Thus, when the first opening arm 310 moves rightward and enters the first clearance G1, the second opening arm 320 moves leftward and enters the second clearance G2 and abuts against the second flap F2. With this operation, in a state where the one plate-like portion S1 is held by the second opening arm 320, the other plate-like portion S2 can be moved by the first opening arm 310, toward a direction in which the other plate-like portion S2 is separated from the one plate-like portion S1. As a result, the cardboard sheet S is opened.

Specifically, as illustrated by a broken line of FIG. 11, the shape of the cardboard sheet S is changed from a plate-like shape to a parallelogram. Note that the four sides of the parallelogram illustrated in FIG. 11 are four side plate portions D11, D12, D21, and D22 of the tube-shaped cardboard. If the shorter side plate portions are the side plate portions D11 and D21 and the longer side plate portions are the side plate portions D12 and D22, the one plate-like portion S1 is constituted by the side plate portions D11 and D12 and the other plate-like portion S2 is constituted by the side plate portions D21 and D22. The first flaps F1 are formed in the shorter side plate portions D11 and D21, and the second flaps F2 are formed in the longer side plate portions D12 and D22.

If the first opening arm 310 moves the other plate-like portion S2 upward in FIG. 11 by pushing the second flap F2 of the other plate-like portion S2, the side plate portion D11 of the one plate-like portion S1 and the side plate portion D21 of the other plate-like portion S2 rise clockwise. In addition, the side plate portion D22 of the other plate-like portion S2 is separated from the side plate portion D12 of the one plate-like portion S1. In this state, since the second flap F2 of the side plate portion D12 of the one plate-like portion S1 is prevented from moving, by the second opening arm 320, the side plate portion D12 does not move. In addition, the second clearance G2 between flaps of the other plate-like portion S2 passes the second opening arm 320. The width of the second opening arm 320 (i.e., the length in the up-down direction in FIG. 11) is set so that the second clearance G2 can smoothly pass the second opening arm 320.

In the present embodiment, the first opening arm 310 on the back side is moved rightward, so that the cardboard sheet S is opened such that the side plate portions D11 and D21 turn clockwise, as illustrated in FIG. 11. In other words, the cardboard sheet changes its shape such that a portion of the one plate-like portion S1 on the back side rises earlier. This is because the tape unit 800 is located on the front side in the housing 101 when the tape unit 800 is at the home position, as described below, and the tape unit 800 is located at the home position, also when the opening operation is performed.

That is, if a portion of the one plate-like portion S1 on the front side rises earlier in the opening operation for the cardboard sheet S, the tape unit 800 can be separated from a space in which the opening operation is performed for the cardboard sheet S, for avoiding the interference between the cardboard sheet S and the tape unit 800. In this case, however, the apparatus will be upsized. In contrast, in the present embodiment, the direction in which the one plate-like portion S1 rises is set in consideration of the home position of the tape unit 800. As a result, the interference between the cardboard sheet S and the tape unit 800 can be prevented in the opening operation, and the apparatus can be downsized. Note that the home position of the tape unit 800 may be on the back side in the housing 101 and a portion of the one plate-like portion S1 on the front side may rise earlier. That is, the side plate portions D11 and D21 may turn counterclockwise.

In the present embodiment, the first opening arm 310 moves until the first opening arm 310 is detected by the first arm-position detection sensor 318, that is, until the first opening arm 310 reaches a first predetermined position. In this state, as illustrated in FIG. 11, the cardboard sheet S is merely opened until the cardboard sheet S has a shape of parallelogram. Then, the first pressing mechanism 400 is operated in the state where the cardboard sheet S has a shape of parallelogram. The operation will be described below.

Note that if the direction in which the cardboard sheet is inserted into the apparatus is opposite to the above-described direction, each of the opening arms moves in a reverse direction. That is, if the positional relationship between the clearance between the flaps of the one plate-like portion and the clearance between the flaps of the other plate-like portion (the one plate-like portion and the other plate-like portion form a pair) is opposite to the above-described positional relationship, the home position of the first opening arm 310 and the home position of the second opening arm 320 is switched in the right-left direction, and the cardboard sheet S is opened by largely moving the second opening arm 320 rightward.

In addition, if the position of the first opening arm 310 and the second opening arm 320 can be adjusted in the front-back direction, the apparatus is applicable even if the cardboard has a different form and the position of the first clearance G1 and the second clearance G2 shifts from the above-described position of the first clearance G1 and the second clearance G2. That is, in the above-described configuration, the position of the first opening arm 310 and the second opening arm 320 is fixed in the front-back direction. However, the first opening arm 310 and the second opening arm 320 may move in the conveyance direction of the cardboard sheet.

In this case, a sensor is disposed for measuring a distance from the leading edge of the cardboard sheet to a clearance between flaps, and the position of at least one of the first opening arm 310 and the second opening arm 320 is moved in the conveyance direction of the cardboard sheet, in accordance with the length detected by the sensor. Also in this case, the leading-edge stopper 205 serves as a reference of the abutment. Thus, for reliably abutting the leading edge of the cardboard sheet material against the leading-edge stopper 205, the conveyance roller 201 is rotated, as described above, more than the expected number of pulses or distance required in a period of time from when the second detection sensor 204 detects the leading edge of the cardboard sheet, until when the leading edge of the cardboard sheet abuts against the leading-edge stopper 205.

In the present embodiment, the cardboard sheet is opened by the first opening arm 310 and the second opening arm 320, as described above. Thus, the configuration of the present embodiment can be made smaller than the configuration in which the cardboard sheet is opened, for example, by sucking a side face of the cardboard sheet. That is, if the cardboard sheet is opened by sucking a side face of the cardboard sheet, a sucking apparatus, such as a vacuum pump, is necessary, so that the apparatus will be upsized. In contrast, in the present embodiment, the cardboard sheet is opened by moving an opening arm. Since the opening arm can be moved by driving a motor, the configuration of the present embodiment can be significantly made smaller than the configuration in which a vacuum pump or the like is disposed.

In addition, the cardboard sheet is opened by putting the opening arm into a clearance between flaps and by pushing and moving a flap that faces the clearance. Thus, since the apparatus is applicable as long as the cardboard sheet has a rectangular shape, the apparatus has multiplicity of use. After the cardboard sheet is opened, the first opening arm 310 and the second opening arm 320 are left inside the cardboard sheet. If a sucking apparatus such as a vacuum pump is used, a mechanism for sucking a cardboard sheet needs to be disposed outside the opened cardboard sheet, for sucking an outer side face of the cardboard sheet. Since the apparatus of the present embodiment allows the first opening arm 310 and the second opening arm 320 to stay inside the opened cardboard sheet, the configuration of the present embodiment can be significantly made smaller than the configuration in which a sucking apparatus, such as a vacuum pump, is disposed. In addition, since the excessive force is hardly applied to the cardboard in the opening operation, the cardboard can be prevented from being damaged in assembling the cardboard.

[Configuration for Forming Cardboard Sheet Like Tube and Bending First Flap]

Next, a configuration for forming the cardboard sheet like a tube and bending first flaps F1 will be described with reference to FIGS. 11 to 14. As described above, in the opening operation in which the cardboard sheet S is opened by the first opening arm 310 and the second opening arm 320, the cardboard sheet S is merely opened until the cardboard sheet S has a shape of parallelogram, as illustrated in FIG. 11. In the present embodiment, in a state where the cardboard sheet S has a shape of parallelogram, the cardboard sheet S is formed, by operating the first pressing mechanism 400, so that the cardboard sheet S has a rectangular shape when viewed from the flap side. In addition, in the present embodiment, the first flap-bending mechanism 500 is operated in accordance with the movement of the first pressing mechanism 400.

That is, first pressing portions 410 and 420 of the first pressing mechanism 400 abut against side faces of the cardboard box, which has been opened by the first opening arm 310 and the second opening arm 320, and thereby regulate the position of the cardboard box in the apparatus. In addition, for forming the opened cardboard sheet S so that the cardboard sheet S has a rectangular shape, the first pressing portions 410 and 420 of the first pressing mechanism 400 are moved toward a center portion of the apparatus. When the first pressing portions 410 and 420 of the first pressing mechanism 400 are moved toward a center portion of the apparatus, the first flap-bending mechanism 500 bends first flaps F1 in accordance with the movement of the first pressing mechanism 400.

[First Pressing Mechanism]

The first pressing mechanism 400 includes the first pressing portions 410 and 420.

Figure 12:
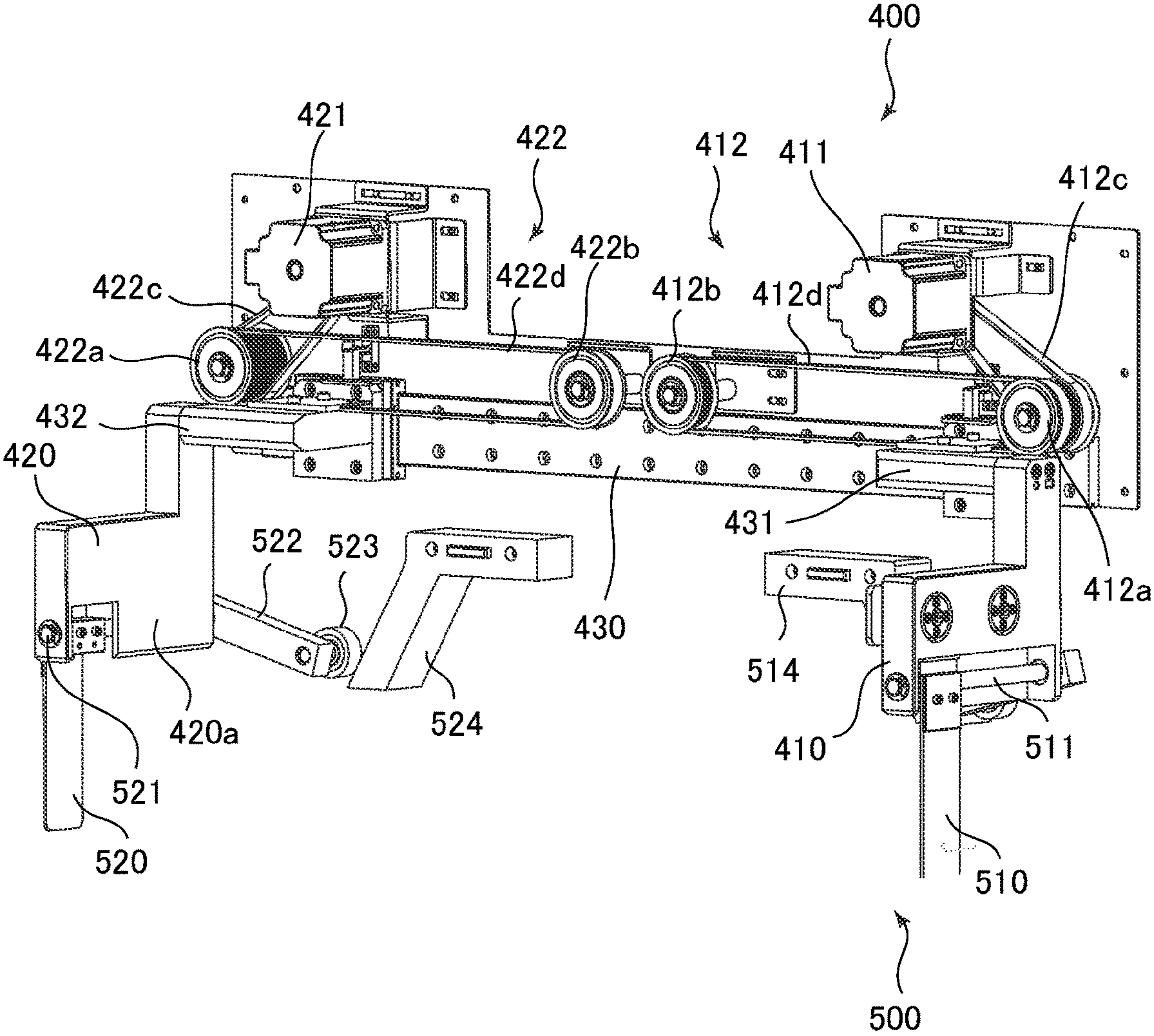
FIG. 12 is a perspective view in which a configuration of the pressing arms and first flap-bending arms of the embodiment is extracted and illustrated.
Figure 13:
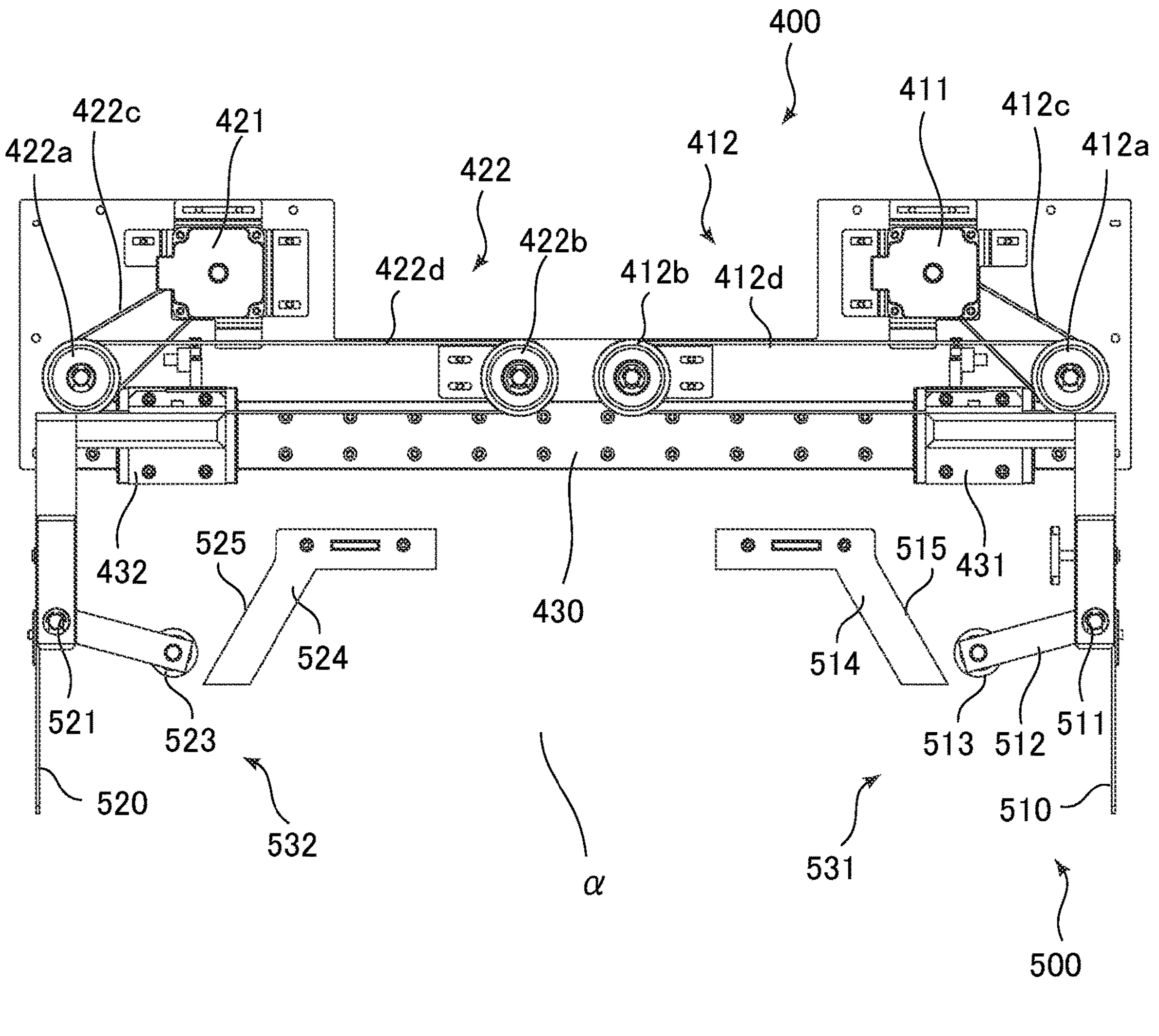
FIG. 13 is a side view in which the configuration of the pressing arms and the first flap-bending arms of the embodiment is extracted and illustrated.

As illustrated in FIGS. 11 to 13, the first pressing portions 410 and 420 are disposed in the housing 101, on both sides in the front-back direction, so as to nip an opening space a in which the opening operation for the cardboard sheet S is performed. The surface of each of the first pressing portions 410 and 420 that faces the opening space a is parallel with the right-left direction and the up-down direction (the surface is orthogonal to the insertion direction of the cardboard sheet S). In addition, the first pressing portions 410 and 420 are positioned, in the height direction, at a position at which the first pressing portions 410 and 420 face the side plate portions D11 and D21. At the position, the first pressing portions 410 and 420 push the side plate portions D11 and D21 when the cardboard sheet S is formed.

The first pressing portion 410 on the front side has a surface that faces the opening space a, that is, a surface on the back side. The surface is provided with an urging plate portion 440 via a compression spring 442. The compression spring 442 is disposed in a cylinder 441. The urging plate portion 440 has a pressing surface 440*a*, which faces the opening space a and which is parallel with the right-left direction. The urging plate portion 440 is urged toward the opening space a. Thus, as described below, the urging plate portion 440 does not excessively push the side plate portion D21 when the cardboard sheet S is formed like a tube. In other words, when the first pressing portion 410 pushes the side plate portion D21 as described below, the urging plate portion 440 moves slightly in the front-back direction. In this manner, the side plate portion D21 and the first pressing portion 410 are prevented from being applied with the excessive force.

The first pressing portion 420 on the back side has a pressing surface 420*a* that faces the opening space a. The pressing surface 420*a* is parallel with the right-left direction. The first pressing portion 420 is not provided with the above-described urging plate portion. However, the first pressing portion 420 may be provided with the urging plate portion. In another case, the urging plate portion 440 may be disposed on not the first pressing portion 410 but the first pressing portion 420.

The first pressing portions 410 and 420 are respectively moved in the front-back direction, by driving first pressing-portion moving motors 411 and 421. As illustrated in FIGS. 11 and 12, on the right side (i.e., the upper side in FIG. 11) of the opening space a in the right-left direction (i.e., the up-down direction in FIG. 11), a first-pressing-portion guide rail 430 (see FIG. 12) that is disposed so as to extend in the front-back direction, the first-pressing-portion moving motors 411 and 412, and first-pressing-portion moving mechanisms 412 and 422 are disposed. That is, on the side opposite to the conveyance path (in which the conveyance roller 201 and the driven roller 202 are disposed) of the cardboard sheet S with respect to the opening space a, the first-pressing-portion guide rail 430, the first-pressing-portion moving motors 411 and 421, and the first-pressing-portion moving mechanisms 412 and 422 are disposed. As described previously, the first pressing portions 410 and 420 have surfaces orthogonal to the insertion direction of the cardboard sheet S for pushing the side plate portions D11 and D21 when the cardboard sheet S is formed. If the first pressing portions 410 and 420 are disposed on the side on which the conveyance path of the cardboard sheet S is formed, it will be necessary to dispose the first pressing portions 410 and 420 outside the cardboard sheet S (which has the total length of D21 and D22) inserted in the apparatus. However, when the cardboard sheet S is opened, the length of the cardboard sheet S in the front-back direction is decreased to a length (i.e., the length of D22). Thus, on the side opposite to the side on which the conveyance path is formed, the first pressing portions 410 and 420 can be disposed outside the shortened cardboard sheet S. As a result, the apparatus can be made smaller than the apparatus in which the first pressing portions 410 and 420 are disposed on the side on which the conveyance path is formed.

As illustrated in FIGS. 12 and 13, the first pressing portions 410 and 420 are respectively supported by the first-pressing-portion guide rail 430 via moving blocks 431 and 432 such that the first pressing portions 410 and 420 can move in the front-back direction. The first pressing portion 410 is moved along the first-pressing-portion guide rail 430 by driving the first-pressing-portion moving motor (i.e., a right motor for bending the first flap and applying pressure) 411. The first pressing portion 420 is moved along the first-pressing-portion guide rail 430 by driving the first-pressing-portion moving motor (i.e., a left motor for bending the first flap and applying pressure) 421.

The driving force from the first-pressing-portion moving motors 411 and 421 are respectively transmitted to the first pressing portions 410 and 420 via the first-pressing-portion moving mechanisms 412 and 422. The first-pressing-portion moving mechanism 412 includes a pulley 412*a*, a pulley 412*b*, a belt 412*c*, and a belt 412*d*. The belt 412*c* is stretched between and wound around the pulley 412*a* and a driving pulley (not illustrated) disposed on the driving shaft of the first-pressing-portion moving motor 411. The belt 412*d* is stretched between and wound around the pulley 412*a* and the pulley 412*b*. The moving block 431 is fixed to the belt 412*d*. Thus, the driving force from the first-pressing-portion moving motor 411 is transmitted to the belt 412*c*, the pulley 412*a*, and the belt 412*d*, so that the belt 412*d* moves in a circumferential direction. As a result, the moving block 431 and the first pressing portion 410, together with the belt 412*d*, move along the first-pressing-portion guide rail 430. Thus, the first-pressing-portion moving motor 411 rotates in a forward or reverse direction, so that the first pressing portion 410 moves frontward or backward in the front-back direction.

Similarly, the first-pressing-portion moving mechanism 422 includes a pulley 422*a*, a pulley 422*b*, a belt 422*c*, and a belt 422*d*. The belt 422*c* is stretched between and wound around the pulley 422*a* and a driving pulley (not illustrated) disposed on the driving shaft of the first-pressing-portion moving motor 421. The belt 422*d* is stretched between and wound around the pulley 422*a* and the pulley 422*b*. The moving block 432 is fixed to the belt 422*d*. Thus, the driving force from the first-pressing-portion moving motor 421 is transmitted to the belt 422*c*, the pulley 422*a*, and the belt 422*d*, so that the belt 422*d* moves in a circumferential direction. As a result, the moving block 432 and the first pressing portion 420, together with the belt 422*d*, move along the first-pressing-portion guide rail 430. Thus, the first-pressing-portion moving motor 421 rotates in a forward or reverse direction, so that the first pressing portion 420 moves frontward or backward in the front-back direction. Note that a single driving motor may be shared by the first pressing portions 410 and 420. In the present embodiment, however, since the movement start timing of the first pressing portion 410 and the movement start timing of the first pressing portion 420 are shifted from each other as described below, the first pressing portions 410 and 420 are driven by the respective motors different from each other.

In the present embodiment, the first pressing portion 420 on the back side starts to move earlier than the first pressing portion 410 on the front side does. This is because a portion of the other plate-like portion S2 on the back side is lifted earlier in the opening operation performed by the first opening arm 310, as described above. That is, if the side face of the cardboard that is lifted earlier is pushed earlier, the cardboard can be formed efficiently. The first pressing portion 410 on the front side abuts against a side face of the cardboard pushed by the first pressing portion 420 on the back side. For example, if the size of the cardboard sheet S varies, the first pressing portion 410 on the front side and the first pressing portion 420 on the back side may excessively move toward the center of the apparatus, with respect to the cardboard that is to be formed. In this case, the first pressing portion 410 on the front side and the first pressing portion 420 on the back side may excessively push the side faces of the cardboard. For this reason, the first pressing portion 410 on the front side is provided with the urging plate portion 440 via the compression spring 442, as described above. The urging plate portion 440 abuts against the side face of the cardboard in a state where the compression spring 442 expands. The position of movement of the first pressing portion 410 is set in accordance with a predetermined size of the cardboard, which is to be formed, so that the first pressing portion 410 moves in a state where the compression spring 442 does not completely contract. Thus, even if the size of the cardboard varies, the influence caused by the variations can be eliminated by the contraction of the compression spring 442 unless the compression spring 442 completely contracts. As a result, the deformation of the cardboard can be prevented.

[First Flap-Bending Mechanism]

As described above, the first flap-bending mechanism 500 operates in accordance with the movement of the first pressing mechanism 400. The first flap-bending mechanism 500 includes first bending arms 510 and 520. As illustrated in FIGS. 12 and 13, like the first pressing portions 410 and 420, the first bending arms 510 and 520 are disposed in the housing 101, on both sides in the front-back direction, so as to nip the opening space a in which the opening operation for the cardboard sheet S is performed. In the present embodiment, the first bending arms 510 and 520 are respectively supported by the first pressing portions 410 and 420, and moves in the front-back direction, together with the first pressing portions 410 and 420. In the present embodiment, each of the first bending arms 510 and 520 is a plate-like member, and a surface of each of the first bending arms 510 and 520 that faces the opening space a is parallel with the right-left direction.

The first bending arm 510 on the front side is swingably supported by the lower edge portion of the first pressing portion 410. Specifically, the first bending arm 510 is fixed to a pivot shaft 511 that is pivotally supported by the lower edge portion of the first pressing portion 410. The pivot axis direction of the pivot shaft 511 is parallel with the right-left direction, and the first bending arm 510 can swing in the front-back direction, on the pivot axis of the pivot shaft 511.

Similarly, the first bending arm 520 on the back side is swingably supported by the lower edge portion of the first pressing portion 420. Specifically, the first bending arm 520 is fixed to a pivot shaft 521 that is pivotally supported by the lower edge portion of the first pressing portion 420. The pivot axis direction of the pivot shaft 521 is parallel with the right-left direction, and the first bending arm 520 can swing in the front-back direction, on the pivot axis of the pivot shaft 521.

In addition, interlocking arms 512 and 522 are respectively fixed to the above-described pivot shafts 511 and 521, and each of the interlocking arms 512 and 522 also swings on the pivot axis of a corresponding one of the pivot shafts 511 and 521. That is, the interlocking arm 512 and the first bending arm 510 swing, as one body, on the pivot axis of the pivot shaft 511, and the interlocking arm 522 and the first bending arm 520 swing, as one body, on the pivot axis of the pivot shaft 521.

In addition, a cam follower 513 is disposed on an end of the interlocking arm 512, and a cam follower 523 is disposed on an end of the interlocking arm 522. The cam follower 513 is a roller that is rotatably supported by the end of the interlocking arm 512. Similarly, the cam follower 523 is a roller that is rotatably supported by the end of the interlocking arm 522. The cam follower 513 contacts a cam surface 515 of a cam member 514 disposed below the first-pressing-portion guide rail 430. Similarly, the cam follower 523 contacts a cam surface 525 of a cam member 524 disposed below the first-pressing-portion guide rail 430.

As illustrated in FIG. 13, the cam surface 515 that contacts the cam follower 513 on the front side is a sloped surface that approaches the upper side as the sloped surface extends backward. Similarly, the cam surface 525 that contacts the cam follower 523 on the back side is a sloped surface that approaches the upper side as the sloped surface extends frontward. That is, the cam surfaces 515 and 525 are sloped surfaces that are sloped in directions opposite to each other.

The cam follower 513 does not contact a lower portion of the cam surface 515 (i.e., a lower end portion in the present embodiment) when the first bending arm 510 is located at a home position that is separated most from the opening space a in the front-back direction. Similarly, the cam follower 523 does not contact a lower portion of the cam surface 525 (i.e., a lower end portion in the present embodiment) when the first bending arm 520 is located at a home position that is separated most from the opening space a in the front-back direction. In this state, the first bending arms 510 and 520 hang down in the substantially vertical direction. If the first pressing portions 410 and 420 move toward the opening space a in the front-back direction, the cam followers 513 and 523 contact the cam surfaces 515 and 525, and the interlocking arms 512 and 522 are pivoted so that the leading end of each of the interlocking arms 512 and 522 is moved upward by the engagement between the cam follower 513 and the cam surface 515 and between the cam follower 523 and the cam surface 525. As a result, the first bending arm 510 linked to the interlocking arm 512 via the pivot shaft 511 pivots in the same direction as the direction in which the interlocking arm 512 pivots. Similarly, the first bending arm 520 linked to the interlocking arm 522 via the pivot shaft 521 pivots in the same direction as the direction in which the interlocking arm 522 pivots.

Figure 14:
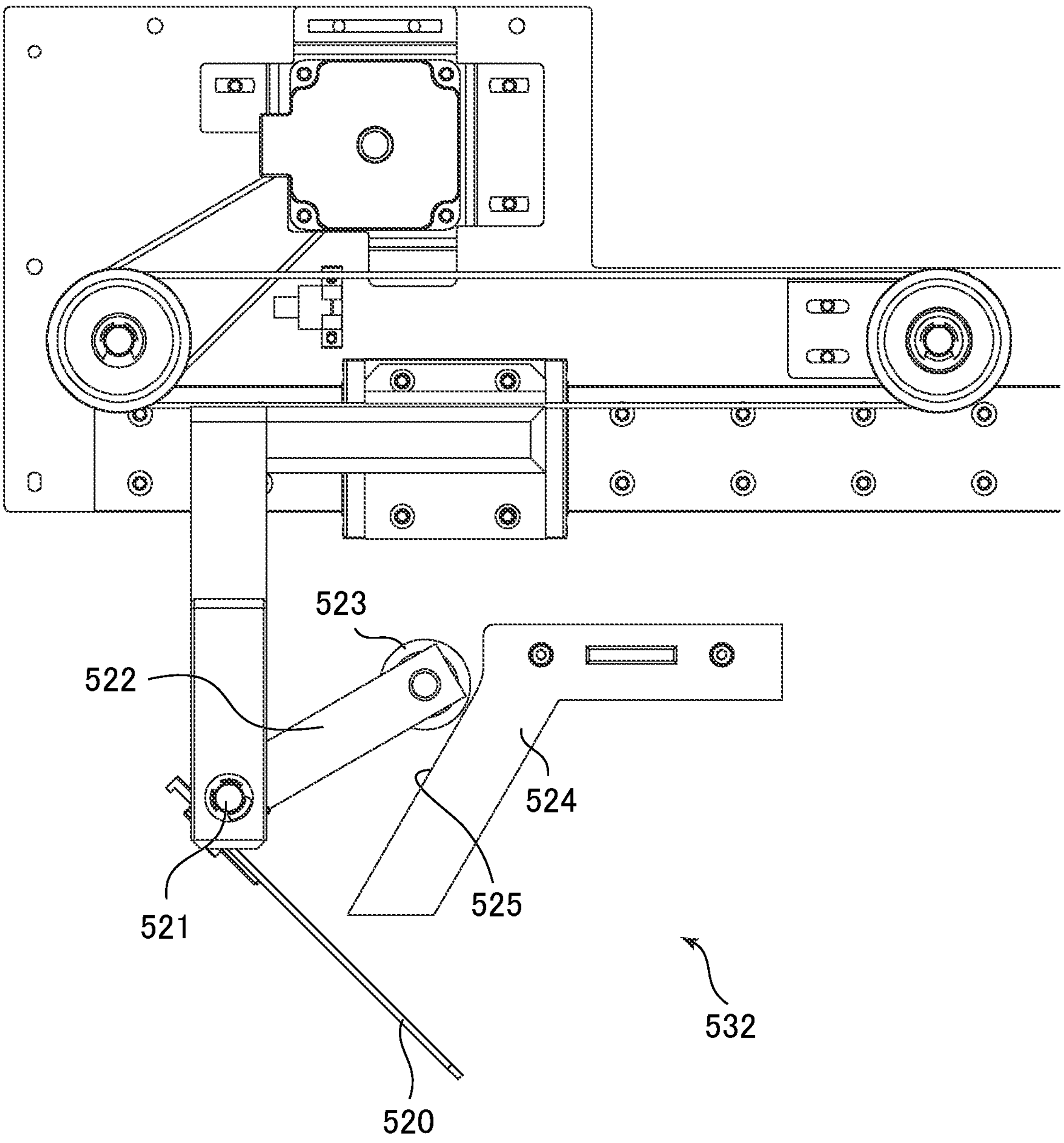
FIG. 14 is a side view in which a configuration of one pressing arm and one first flap-bending arm of the embodiment is extracted and illustrated.

With reference to FIG. 14, the first bending arm 520 on the back side will be described, as an example. If the first pressing portion 420 moves frontward, the cam follower 523 moves along the cam surface 525, and the interlocking arm 522 and the first bending arm 520 pivot counterclockwise on the pivot axis of the pivot shaft 521. Similarly, if the first pressing portion 410 moves backward, the first bending arm 510 on the front side, together with the interlocking arm 512, is pivoted clockwise by the engagement between the cam follower 513 and the cam surface 515. Thus, in the present embodiment, the interlocking arm 512, the cam follower 513, and the cam surface 515 constitute an interlocking mechanism 531 that causes the first bending arm 510 to perform the bending operation in accordance with the movement of the first pressing portion 410. Similarly, the interlocking arm 522, the cam follower 523, and the cam surface 525 constitute an interlocking mechanism 532 that causes the first bending arm 520 to perform the bending operation in accordance with the movement of the first pressing portion 420.

When the first bending arms 510 and 520 pivot on the pivot axis of the pivot shafts 511 and 521 as described above, the first bending arms 510 and 520 bend first flaps F1 formed below the side plate portions D11 and D21 of the cardboard that has been opened by the opening mechanism 300 (the side plate portions D11 and D21 are located in the front-back direction). In the following description, the cardboard sheet S that has been opened is referred to as a cardboard. The bend angle of the first flaps F1 is an angle at which the first flaps F1 are substantially horizontal, or an angle at which the first flaps F1 incline with respect to the horizontal direction such that the leading edges of the first flaps F1 face down. In the present embodiment, after the first flaps F1 are bent, the second flaps F2 are bent, as described below. Thus, the first flaps F1 are bent until just before the first flaps F1 have an angle at which the first flaps F1 are horizontal, and are further bent when the second flaps F2 are bent.

In the present embodiment, since the first bending arms 510 and 520 are respectively disposed on the first pressing portions 410 and 420, the installation space can be made smaller and the apparatus can be downsized, compared with a case where the first bending arms 510 and 520 are separated from the first pressing portions 410 and 420. In addition, since the pivot operation of the first bending arms 510 and 520 is performed in accordance with the movement of the first pressing portions 410 and 420, the mechanism for operating can be simplified, and thus the installation space can be made smaller. As a result, the apparatus can be reduced in cost and size.

In addition, in the present embodiment, just before the cardboard is opened completely, that is, in a state where the cardboard has a shape of parallelogram, the first pressing portions 410 and 420 abut against the side plate portions D11 and D21 of the cardboard, and the first flaps F1 formed below the side plate portions D11 and D21 are bent in accordance with the abutment of the first pressing portions 410 and 420. That is, these actions are performed as a single operation. By the way, if the first flaps F1 are bent after the cardboard is opened completely, an edge F11 of each of the first flaps F1 may interfere with an edge F21 (see FIG. 9) of a corresponding one of the second flaps F2, making it difficult to bend the first flaps F1. In the present embodiment, however, the first flaps F1 are bent in a state where the cardboard has a shape of parallelogram. In this case, since the first flaps F1 push the second flaps F2, the first flaps F1 can be bent smoothly, without the interference between the edge F11 of the first flap F1 and the edge F21 of the second flap F2.

[Configuration for Regulating Cardboard]

Next, a configuration for regulating the cardboard will be described with reference to FIGS. 15 and 16. As described above, in the opening operation in which the cardboard sheet S is opened by the first opening arm 310 and the second opening arm 320, the cardboard sheet S is merely opened until the cardboard sheet S has a shape of parallelogram, as illustrated in FIG. 11. In the present embodiment, in a state where the cardboard sheet S has a shape of parallelogram, the position of the side plate portions D11 and D21, which are located in the front-back direction, is regulated by operating the regulation mechanism 600, so that the cardboard sheet S has a rectangular shape when viewed from the flap side.

Note that the above-described first pressing mechanism 400 and the regulation mechanism 600 operate in synchronization with each other, for forming the cardboard sheet S so that the cardboard sheet S has a rectangular shape. In the operation of the first pressing mechanism 400 and the regulation mechanism 600, the operation of the first pressing mechanism 400 may be started earlier than the operation of the regulation mechanism 600, or the operation of the regulation mechanism 600 may be started earlier than the operation of the first pressing mechanism 400. In the present embodiment, the operation of the regulation mechanism 600 is started earlier than the operation of the first pressing mechanism 400.

The regulation mechanism 600 includes regulation arms 610 and 620. The regulation arm 610 can pivot on the pivot axis of a pivot shaft 616, and the regulation arm 620 can pivot on the pivot axis of a pivot shaft 626. The regulation arms 610 and 620 are disposed on the side opposite to the side (in the right-left direction) on which the first pressing portions 410 and 420 are disposed. In the present embodiment, the regulation arms 610 and 620 are disposed at positions that face the first pressing portions 410 and 420 via the insertion position of the cardboard sheet S.

Figure 15:
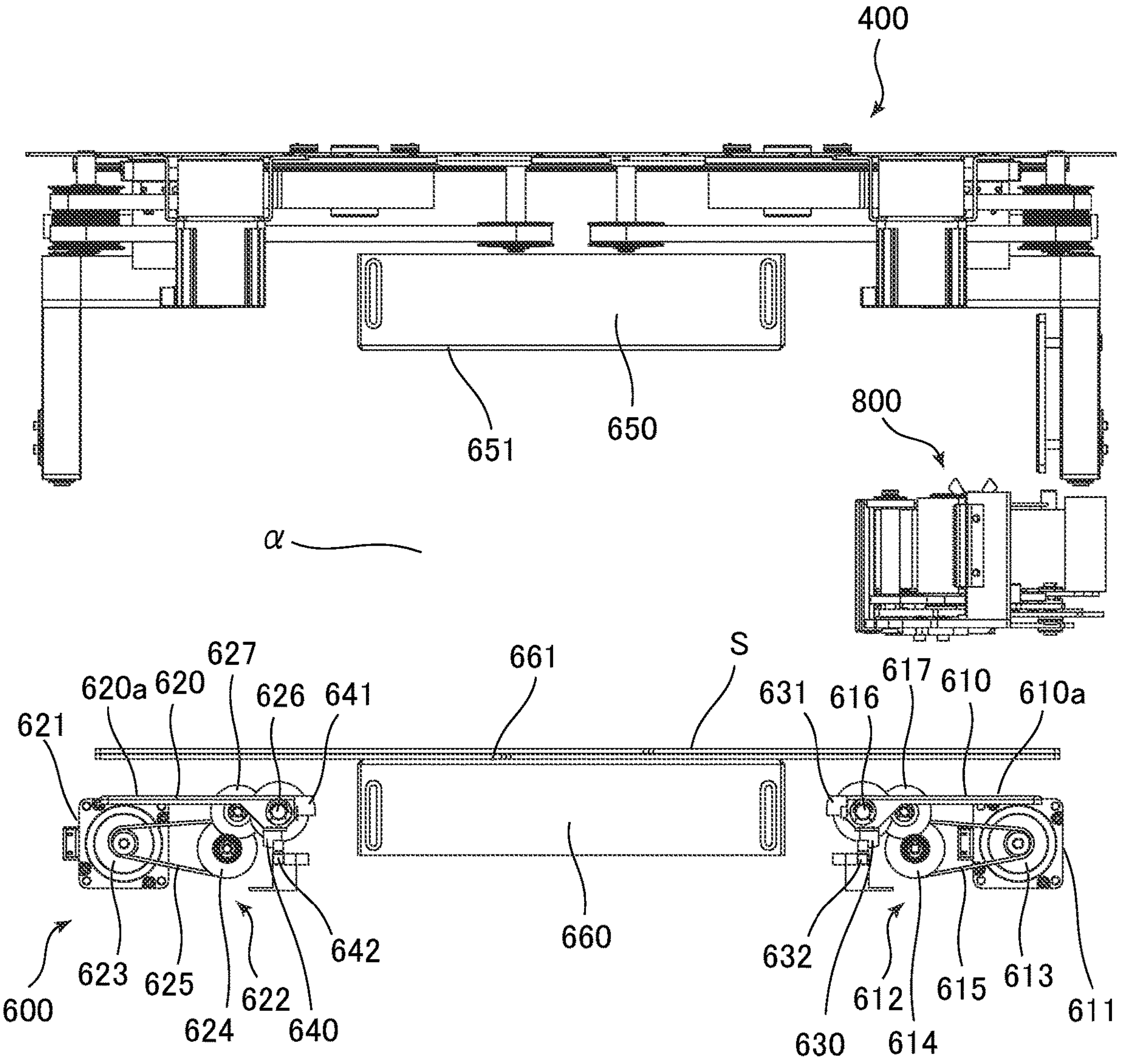
FIG. 15 is a plan view in which a configuration of the pressing arms and regulation arms of the embodiment is extracted and illustrated.

In a state where the regulation arms 610 and 620 are folded as illustrated in FIG. 15, the regulation arms 610 and 620 are located at positions retracted from the conveyance path of the cardboard sheet S. In the present embodiment, the regulation mechanism 600 is disposed on the left side (i.e., the lower side in FIG. 15) of the conveyance path of the cardboard sheet S. Since the regulation arms 610 and 620 are retracted from the conveyance path, the regulation arms 610 and 620 can be prevented from blocking the conveyance of the cardboard sheet S.

Thus, when the cardboard sheet S is inserted from the insertion hole 102, the regulation arms 610 and 620 are retracted from the conveyance path such that regulation surfaces 610*a* and 620*a*, which regulate side faces of the cardboard sheet S, are parallel with the insertion direction of the cardboard sheet S. In addition, when the cardboard sheet S is opened so that the cardboard sheet S has a rectangular shape, the regulation arms 610 and 620 pivot so as to cross the conveyance path, and regulate the side faces of the cardboard. Since the regulation arms 610 and 620 are configured in this manner, the position at which the cardboard sheet S is inserted and the position at which the regulation arms 610 and 620 pivot and regulate the side faces of the cardboard can be arranged so as to overlap with each other. As a result, the apparatus can be downsized.

In addition, like the first pressing portions 410 and 420, the regulation arms 610 and 620 are disposed in the housing 101, on both sides in the front-back direction. The regulation arms 610 and 620 are plate-like members, and respectively includes regulation surfaces 610*a* and 620*a* that are surfaces parallel to the up-down direction. The regulation arm 610 is pivoted on the pivot axis of a pivot shaft 616 by driving a regulation-arm driving motor 611. Similarly, the regulation arm 620 is pivoted on the pivot axis of a pivot shaft 626 by driving a regulation-arm driving motor 621. The driving force from the regulation-arm driving motor 611 is transmitted to the regulation arm 610 via a regulation-arm driving mechanism 612, and the driving force from the regulation-arm driving motor 621 is transmitted to the regulation arm 620 via a regulation-arm driving mechanism 622.

The regulation-arm driving mechanism 612, which transmits the driving force to the regulation arm 610 on the front side, includes a pulley 613, a pulley 614, a belt 615, and a gear train 617. The pulley 613 is disposed on the driving shaft of the regulation-arm driving motor 611, and the belt 615 is stretched between and wound around the pulley 613 and the pulley 614. The pulley 614 and the regulation arm 610 are connected with each other via the gear train 617. The rotational force from the regulation-arm driving motor 611 is transmitted to the pulley 613, the belt 615, and the pulley 614; and the rotational force from the pulley 614 is transmitted to the regulation arm 610 via the gear train 617. In this manner, the regulation arm 610 pivots on the pivot axis of the pivot shaft 616. The direction in which the regulation arm 610 on the front side pivots from the retracting position to the regulation position is a counterclockwise direction.

Similarly, the regulation-arm driving mechanism 622, which transmits the driving force to the regulation arm 620 on the back side, includes a pulley 623, a pulley 624, a belt 625, and a gear train 627. The pulley 623 is disposed on the driving shaft of the regulation-arm driving motor 621, and the belt 625 is stretched between and wound around the pulley 623 and the pulley 624. The pulley 624 and the regulation arm 620 are connected with each other via the gear train 627. The rotational force from the regulation-arm driving motor 621 is transmitted to the pulley 623, the belt 625, and the pulley 624; and the rotational force from the pulley 624 is transmitted to the regulation arm 620 via the gear train 627. In this manner, the regulation arm 620 pivots on the pivot axis of the pivot shaft 626. The direction in which the regulation arm 620 on the back side pivots from the retracting position to the regulation position is a clockwise direction.

In addition, sensor flags 630 and 631 are disposed on the base end portion of the regulation arm (i.e., the right regulation arm) 610. The sensor flags 630 and 631 are disposed around the pivot shaft 616, at positions having different phases in the rotational direction. The sensor flags 630 and 631 are detected by a rotational-position detection sensor 632 for the right regulation arm. The rotational-position detection sensor 632 is a photo-interrupter, and detects the passage of the sensor flag 630 or 631. The sensor flag 630 is disposed so that the rotational-position detection sensor 632 can detect the regulation arm 610 located at the retracting position illustrated in FIG. 15. The sensor flag 631 is disposed so that the rotational-position detection sensor 632 can detect the regulation arm 610 located at the regulation position illustrated in FIG. 16. In a case where the photo-interrupter detects the sensor flag 630 as a reference, the retracting position is a home position of the regulation arm 610, and the regulation arm 610 is forced to stop at the regulation position by controlling pulses or time used for driving the regulation-arm driving motor 611. In a case where the photo-interrupter detects the sensor flag 631 as a reference, the regulation position is a home position of the regulation arm 610, and the regulation arm 610 is forced to stop at the retracting position by controlling pulses or time used for driving the regulation-arm driving motor 611.

Similarly, sensor flags 640 and 641 are disposed on the base end portion of the regulation arm (i.e., the left regulation arm) 620. The sensor flags 640 and 641 are disposed around the pivot shaft 626, at positions having different phases in the rotational direction. The sensor flags 640 and 641 are detected by a rotational-position detection sensor 642 for the left regulation arm. The rotational-position detection sensor 642 is a photo-interrupter, and detects the passage of the sensor flag 640 or 641. The sensor flag 640 is disposed so that the rotational-position detection sensor 642 can detect the regulation arm 620 located at the retracting position illustrated in FIG. 15. The sensor flag 641 is disposed so that the rotational-position detection sensor 642 can detect the regulation arm 620 located at the regulation position illustrated in FIG. 16. In a case where the photo-interrupter detects the sensor flag 640 as a reference, the retracting position is a home position of the regulation arm 620, and the regulation arm 620 is forced to stop at the regulation position by controlling pulses or time used for driving the regulation-arm driving motor 621. In a case where the photo-interrupter detects the sensor flag 641 as a reference, the regulation position is a home position of the regulation arm 620, and the regulation arm 620 is forced to stop at the retracting position by controlling pulses or time used for driving the regulation-arm driving motor 621.

In addition, in the present embodiment, the one-side regulation member 650 and the other-side regulation member 660 are disposed on both sides of the opening space a in the right-left direction. The one-side regulation member 650 on the right side (i.e., the upper side in FIG. 15) is disposed between the first pressing portions 410 and 420 in the front-back direction. The one-side regulation member 650 has a one-side regulation surface 651 on the opening space a side. The one-side regulation surface 651 is parallel with the up-down direction, and regulates the position of the side plate portion D22 of the cardboard that has been opened so as to have a rectangular shape.

Similarly, the other-side regulation member 660 on the left side (i.e., the lower side in FIG. 15) is disposed between the regulation arms 610 and 620 in the front-back direction. The other-side regulation member 660 has an other-side regulation surface 661 on the opening space a side. The other-side regulation surface 661 is parallel with the up-down direction, and regulates the position of the side plate portion D12 of the cardboard that has been opened so as to have a rectangular shape. As described above, when the cardboard sheet is inserted from the insertion hole 102, the other-side regulation surface 661 guides the left side face of the cardboard sheet S.

Figure 16:
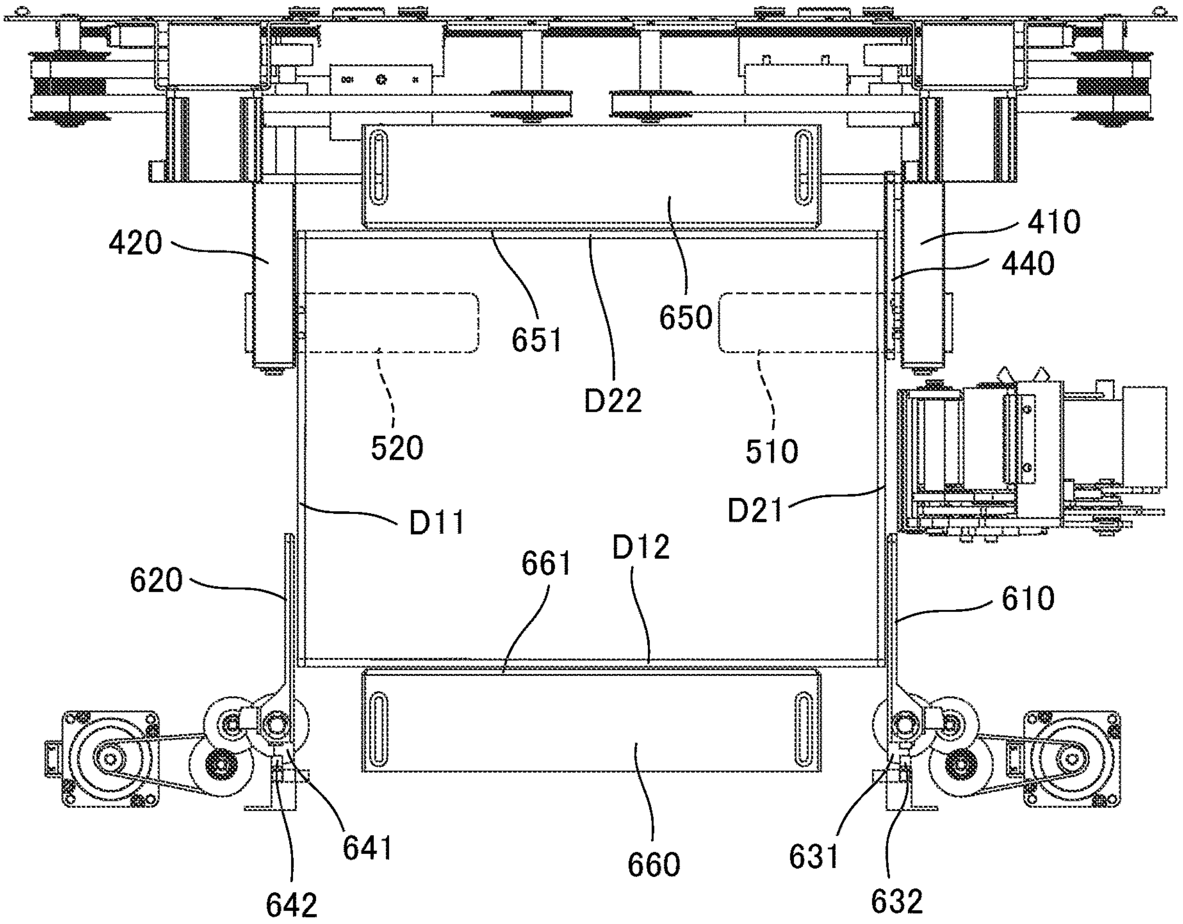
FIG. 16 is a plan view illustrating a cardboard sheet that has been formed into a box by the pressing arms and the regulation arms of the embodiment.

If the first opening arm 310 is detected by the first arm-position detection sensor 318, the regulation arms 610 and 620 start to pivot from the retracting position illustrated in FIG. 15 toward the regulation position illustrated in FIG. 16. Then, at the regulation position, the regulation surfaces 610*a* and 620*a* abut against the side plate portions D11 and D21 of the cardboard that has been opened by the first opening arm 310 and the second opening arm 320, so as to have a shape of parallelogram. In this operation, the regulation arms 610 and 620 press the side plate portions D11 and D21 in cooperation with the first pressing portions 410 and 420, and thereby forms the cardboard sheet S, which is being opened, into a rectangular cardboard and regulates the position of the cardboard in the front-back direction. In addition, in this operation, the position of the cardboard in the right-left direction is regulated by the one-side regulation member 650 and the other-side regulation member 660.

In the present embodiment, the members that abut against the side faces of the cardboard in the front-back direction, and that regulates the position of the cardboard in the front-back direction operate in different manners. That is, the first pressing portions 410 and 420 regulate the side plate portions D11 and D21 of the cardboard while sliding. On the other hand, the regulation arms 610 and 620 regulate the side plate portions D11 and D21 of the cardboard while pivoting.

In addition, in the present embodiment, the first pressing portions 410 and 420 and the regulation arms 610 and 620 are disposed substantially on diagonal lines of the cardboard. That is, the regulation arm 620 on the back side is disposed substantially on a diagonal line on which the first pressing portion 410 on the front side is disposed. Similarly, the regulation arm 610 on the front side is disposed substantially on a diagonal line on which the first pressing portion 420 on the back side is disposed. Thus, when the cardboard is formed while regulated, the deformation of the cardboard caused by force applied to the cardboard can be prevented by the above-described members.

In particular, since the first pressing portion 420 on the back side starts to push the cardboard earlier than the first pressing portion 410 on the front side does, the cardboard may be deformed if the regulation arm 610 on the front side is not disposed on the diagonal line. This is because the force produced for forming the cardboard, so as to have a rectangular shape, cannot be received. Thus, the occurrence of such deformation of the cardboard can be prevented by at least disposing the regulation arm 610 on the front side. Note that the regulation arm 620 on the back side receives the force produced when the first pressing portion 410 on the front side pushes the cardboard, preventing the deformation of the cardboard. However, when the regulation arm 620 on the back side receives the force, the cardboard has been formed so as to have a substantially rectangular shape and the force is not strong. Thus, the regulation arm 620 on the back side may not be disposed. However, if the regulation arm 620 on the back side is disposed, the cardboard can be reliably formed so as to have a rectangular shape. Thus, the regulation arm 620 on the back side is preferably disposed for ensuring the shape of the cardboard. In addition, the regulation arm 620 on the back side is preferably disposed because the regulation in the front-back direction can be enhanced for the tape unit 800 to stick a tape on the cardboard, as described below.

[Flow of Opening Cardboard Sheet into Box and Bending First Flap]

Figure 42:
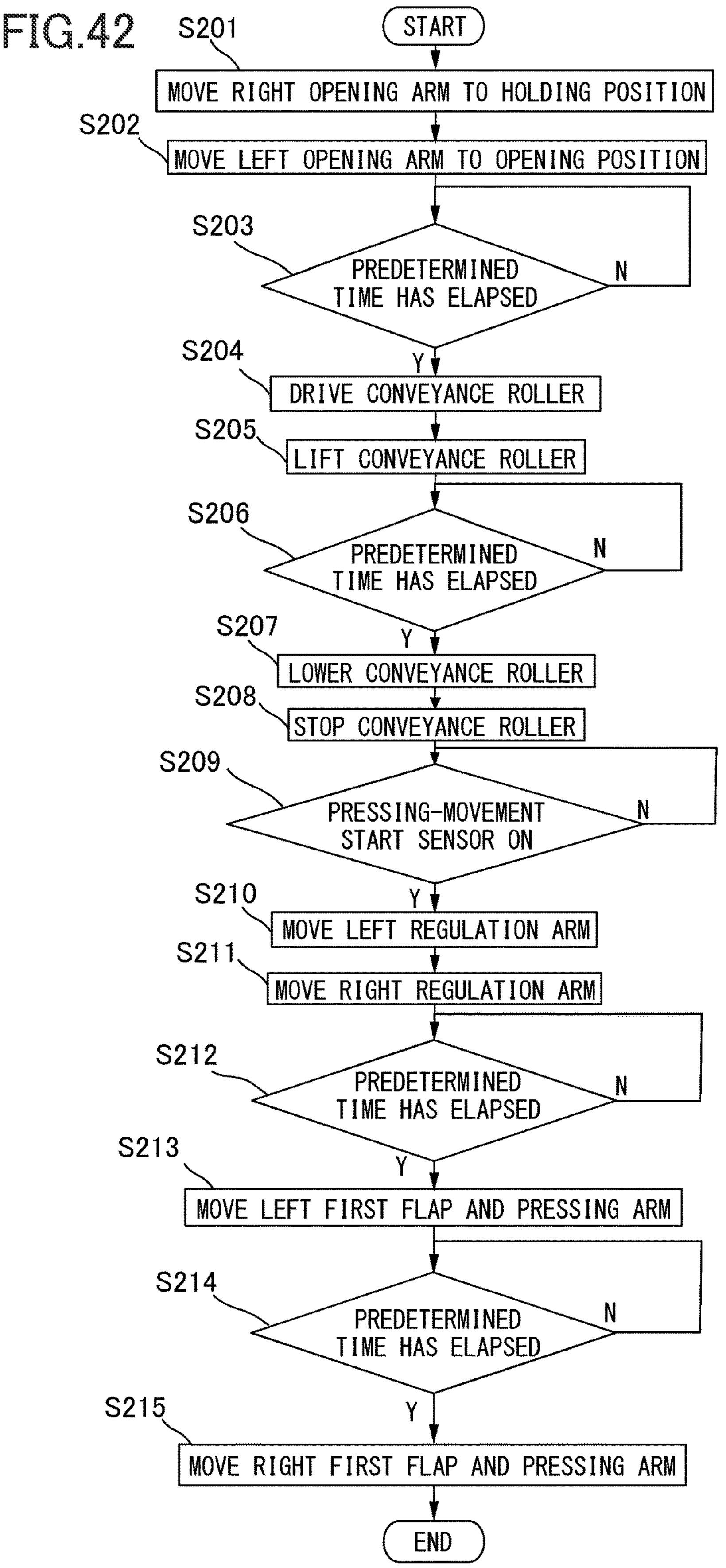
FIG. 42 is a flowchart of the embodiment illustrating the control performed in a period of time from when the cardboard sheet is opened, until when the first flaps are bent.

Next, a flow of the opening operation for the cardboard sheet S (the operation for opening the cardboard sheet S into a box) performed by the above-described opening mechanism 300, the forming operation for the cardboard performed by the above-described pressing mechanism 400, and the bending operation for the first flaps F1 will be described with reference to FIG. 42 (the opening operation is followed by the forming operation and the bending operation). First, if the cardboard sheet S is conveyed to the insertion position, the second opening arm (i.e., the right opening arm) 320 is moved toward the second clearance G2 between the first flap F1 and the second flap F2 of the other plate-like portion S2. Then, the second opening arm 320 enters the second clearance G2, abuts against the second flap F2 of the one plate-like portion S1 (the second flap F2 faces the second clearance G2), and holds the one plate-like portion S1 (S201). The second opening arm 320 moves by the thickness of the other plate-like portion S2, and stops.

Then, the first opening arm (i.e., the left opening arm) 310 is moved toward the first clearance G1 between the first flap F1 and the second flap F2 of the one plate-like portion 51. Then, the first opening arm 310 enters the first clearance G1, and abuts against the second flap F2 of the other plate-like portion S2 (the second flap F2 faces the first clearance G1) (S202). The other plate-like portion S2 is moved so as to be separated from the one plate-like portion S1, by further moving the first opening arm 310.

While the first opening arm 310 abuts against the second flap F2 of the other plate-like portion S2 and moves rightward, the second opening arm 320 is stopping in contact with the second flap F2 of the one plate-like portion S1. Thus, it seems that the cardboard sheet S is opened while only the other plate-like portion S2 moves. When the opening of the cardboard sheet S is started, the conveyance roller 201 has been lowered and the cardboard sheet S has been released from the nip by the conveyance roller 201 and the driven roller 202, as described for the process S107 of FIG. 41.

If a predetermined time has elapsed since the start of the movement of the first opening arm 310 (S203), the driving of the conveyance roller 201 is started (S204), and then the conveyance roller 201 is lifted for causing the conveyance roller 201 and the driven roller 202 to nip the cardboard sheet S (S205). As described above, the predetermined time is a time in which the other plate-like portion S2 moves to a position separated from the conveyance roller 201.

Since the conveyance roller 201 is in contact with the cardboard sheet (i.e., the one plate-like portion S1 in the present embodiment) in a state where the conveyance roller 201 rotates, the one plate-like portion S1 is conveyed backward by the conveyance roller 201. Thus, in the present embodiment, while the opening operation for the cardboard sheet is performed by moving the first opening arm 310, the cardboard sheet is further conveyed backward. With this operation, the amount of relative movement between the first opening arm 310 and the second flap F2 in the front-back direction can be reduced, so that the opening operation for the cardboard sheet can be performed smoothly. In addition, since the cardboard sheet is conveyed backward, the interference between the cardboard sheet and the tape unit 800, which is located on the front side, can be prevented.

If a predetermined time has elapsed since the conveyance roller 201 was lifted (S206), the conveyance roller 201 is lowered (S207) and stopped (S208). For example, the predetermined time is a time required for the other plate-like portion S2, moved by the first opening arm 310, to reach the scooping member 671. That is, the cardboard sheet is nipped by the conveyance roller 201 and the driven roller 202 while the cardboard sheet, which is being opened, is moving across the conveyance path of the tape unit 800, and is released from the nip when the lower edge of the cardboard sheet is supported by the scooping member 671. With this operation, even if the cardboard sheet is released from the nip, the cardboard sheet that is being opened can be prevented from inclining.

If the first opening arm 310 is detected by the first arm-position detection sensor (i.e., the pressing-movement start sensor) 318 (S209), the pivot of the regulation arm 620 on the back side (i.e., the left regulation arm) is started (S210). Then, the pivot of the regulation arm 610 on the front side (i.e., the right regulation arm) is started (S211). The reason that the regulation arm 620 on the back side is pivoted earlier is that the cardboard sheet is opened such that a portion of the cardboard sheet on the back side rises earlier in the opening operation performed by the first opening arm 310. In this case, if the regulation arm 620 on the back side abuts against the side face of the cardboard sheet earlier, the cardboard can be formed stably.

If a predetermined time has elapsed since the pivot of the regulation arm 610 on the front side was started (S212), the first pressing portion 420 on the back side (i.e., the left first flap and pressing arm) starts to move toward the front side (that is, toward a center portion of the apparatus) (S213). If a predetermined time has elapsed since the first pressing portion 420 on the back side started to move (S214), the first pressing portion 410 on the front side (i.e., the right first flap and pressing arm) starts to move toward the back side (that is, toward a center portion of the apparatus) (S215). The reason that the first pressing portion 420 on the back side moves earlier is the same as the reason that the regulation arm 620 on the back side moves earlier. As described above, if the first pressing portions 410 and 420 move, the first bending arms 510 and 520 pivot in accordance with the movement of the first pressing portions 410 and 420, so that the first flaps F1, which are formed as a lower portion of the cardboard and which face each other in the front-back direction, are bent inward.

[Configuration for Bending Second Flap]

Figure 17:
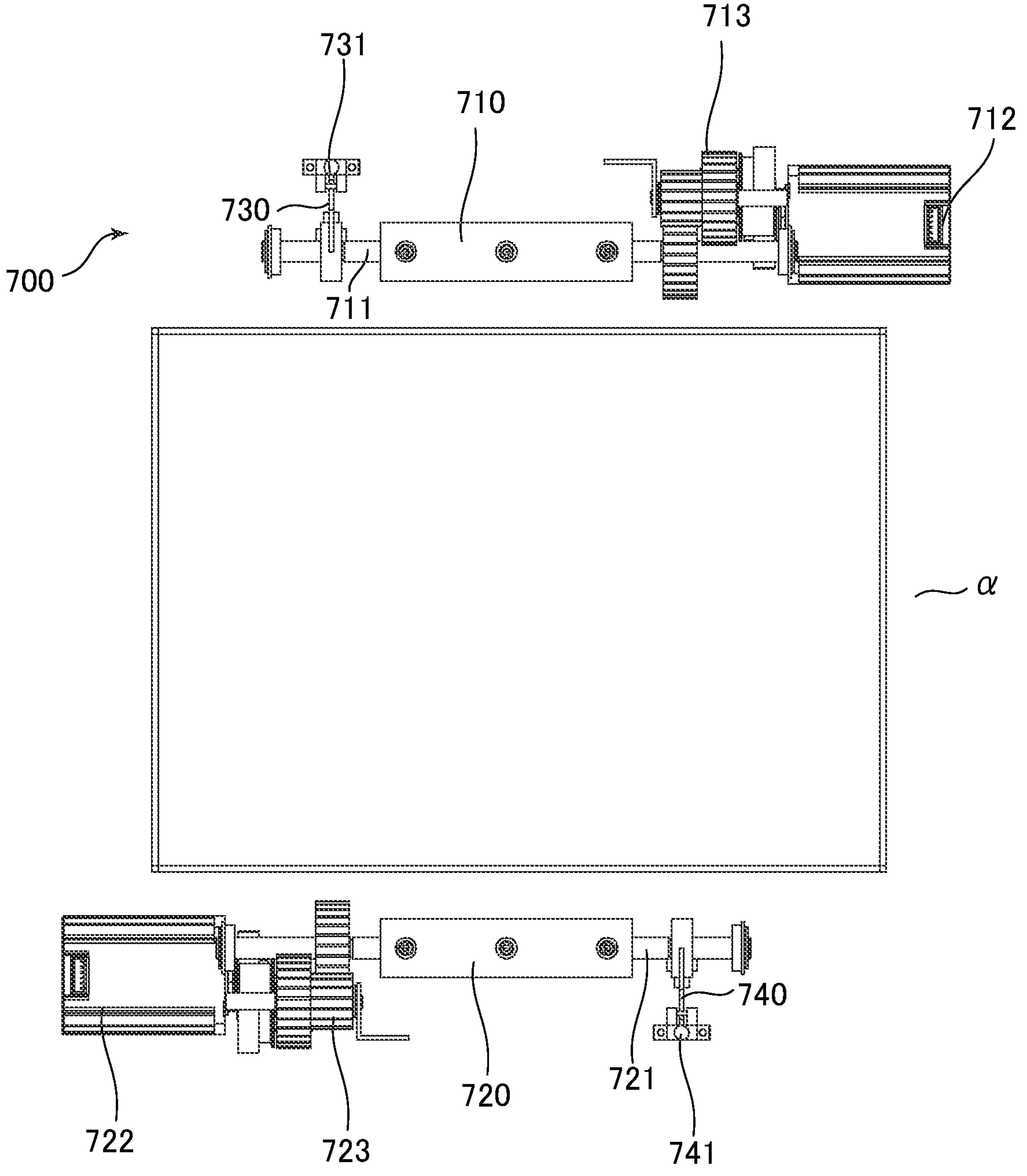
FIG. 17 is a plan view in which second flap-bending arms of the embodiment are extracted and illustrated.
Figure 18:
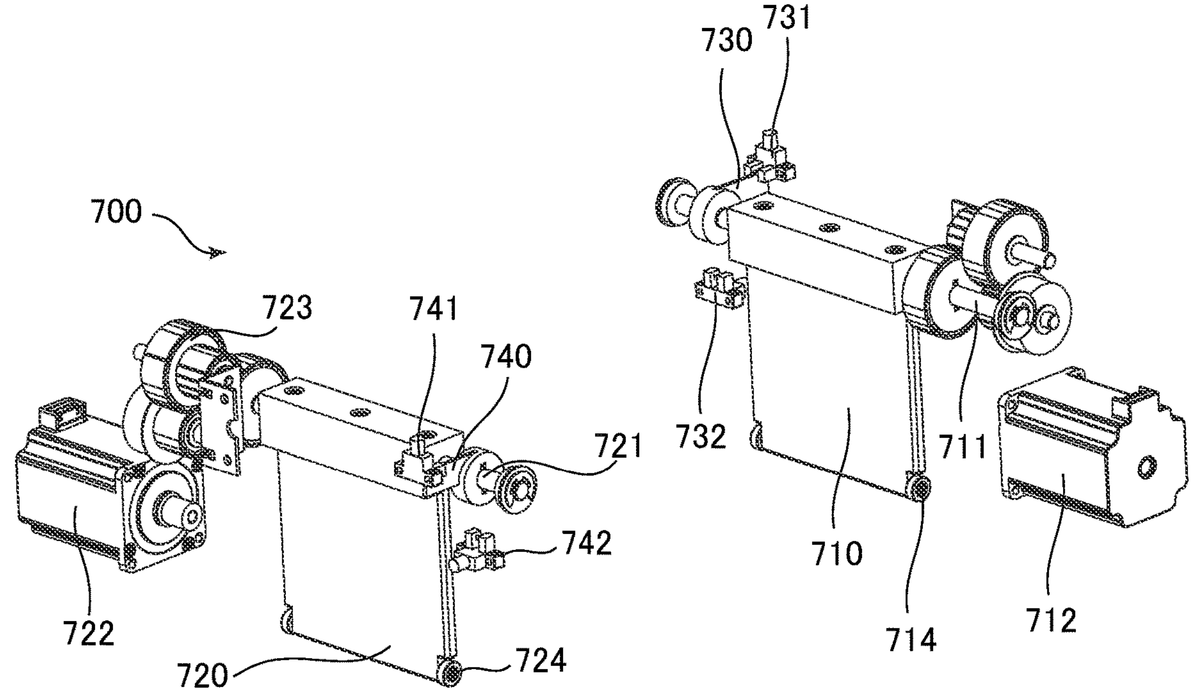
FIG. 18 is a perspective view in which the second flap-bending arms of the embodiment are extracted and illustrated.

Next, a configuration for bending the second flaps F2 will be described with reference to FIGS. 17 to 21. After the first flaps F1, which are formed in the front-back direction, are bent as described above, the second flaps F2, which are formed in the right-left direction, are bent. The second flap-bending mechanism 700 includes second bending arms 710 and 720. As illustrated in FIGS. 17 and 18, the second bending arms 710 and 720 are disposed in the housing 101, on both sides in the right-left direction, so as to nip the opening space a in which the opening operation for the cardboard sheet S is performed. In the present embodiment, each of the second bending arms 710 and 720 is a plate-like member, and a surface of each of the second bending arms 710 and 720 that faces the opening space a is parallel with the front-back direction (i.e., the insertion direction of the cardboard sheet S).

The second bending arm 710 on the right side (that is, the upper side in FIG. 17) is fixed to a pivot shaft 711. The pivot shaft 711 is rotatably supported by a frame (not illustrated) disposed in the housing 101. The rotation-axis direction of the pivot shaft 711 is parallel with the front-back direction. The second bending arm 710 can swing on the pivot axis of the pivot shaft 711, in the right-left direction. At a standby position (i.e., a position illustrated in FIG. 19) at which the second bending arm 710 does not perform the bending operation, the second bending arm 710 is substantially parallel to the vertical direction. The second bending arm 710 moves to a bending position (i.e., a position illustrated in FIG. 21) by pivoting leftward, from the standby position, on the pivot axis of the pivot shaft 711.

Similarly, the second bending arm 720 on the left side (that is, the lower side in FIG. 17) is fixed to a pivot shaft 721. The pivot shaft 721 is rotatably supported by a frame (not illustrated) disposed in the housing 101. The rotation-axis direction of the pivot shaft 721 is parallel with the front-back direction. The second bending arm 720 can swing on the pivot axis of the pivot shaft 721, in the right-left direction. At a standby position (i.e., a position illustrated in FIG. 19) at which the second bending arm 720 does not perform the bending operation, the second bending arm 720 is substantially parallel to the vertical direction. The second bending arm 720 moves to a bending position (i.e., a position illustrated in FIG. 21) by pivoting rightward, from the standby position, on the pivot axis of the pivot shaft 721. Note that like the regulation arms 610 and 620, when the second bending arm 720 on the left side is located at the standby position at which the second bending arm 720 does not perform the bending operation, the second bending arm 720 is retracted to the left side of the conveyance path of the cardboard sheet S, so as not to block the conveyance of the cardboard sheet S.

The second bending arm 710 is pivoted on the rotation axis of the pivot shaft 711, by driving a second-bending-arm driving motor 712. Similarly, the second bending arm 720 is pivoted on the rotation axis of the pivot shaft 721, by driving a second-bending-arm driving motor 722. The driving force from the second-bending-arm driving motor 712 is transmitted to the second bending arm 710 via a second-bending-arm driving-force transmission mechanism 713. Similarly, the driving force from the second-bending-arm driving motor 722 is transmitted to the second bending arm 720 via a second-bending-arm driving-force transmission mechanism 723. In each of the second-bending-arm driving-force transmission mechanisms 713 and 723, a mechanism that includes pulleys and a belt and a gear train are combined with each other. Specifically, the driving force from the second-bending-arm driving motor 712 is transmitted to a gear train via pulleys and a belt, and then is transmitted to the second bending arm 710 by a gear of the gear train that engages with a gear fixed to the pivot shaft 711. Similarly, the driving force from the second-bending-arm driving motor 722 is transmitted to a gear train via pulleys and a belt, and then is transmitted to the second bending arm 720 by a gear of the gear train that engages with a gear fixed to the pivot shaft 721. In addition, the second bending arm 710 is pivoted in the right-left direction by the second-bending-arm driving motor 712 rotating in a forward or reverse direction, and the second bending arm 720 is pivoted in the right-left direction by the second-bending-arm driving motor 722 rotating in a forward or reverse direction.

In addition, a sensor flag 730 is disposed on the pivot shaft 711, and a sensor flag 740 is disposed on the pivot shaft 721. In addition, rotational-position detection sensors 731 and 732 are disposed at positions at which the sensor flag 730 passes the respective rotational-position detection sensors 731 and 732, and which have different phases in the rotational direction of the pivot shaft 711. Similarly, rotational-position detection sensors 741 and 742 are disposed at positions at which the sensor flag 740 passes the respective rotational-position detection sensors 741 and 742, and which have different phases in the rotational direction of the pivot shaft 721. Each of the rotational-position detection sensors 731 and 732 is a photo-interrupter, and detects the passage of the sensor flag 730. Similarly, each of the rotational-position detection sensors 741 and 742 is a photo-interrupter, and detects the passage of the sensor flag 740. The rotational-position detection sensors 731 and 741 respectively detect second bending arms 710 and 720 located at the standby position. The rotational-position detection sensors 732 and 742 respectively detect the second bending arms 710 and 720 located at the bending position.

In addition, in the present embodiment, rollers 714 and 724 are respectively supported by the edge portions of the second bending arms 710 and 720 (the rollers 714 and 724 can rotate freely). Thus, when the second flaps F2 are bent by the second bending arms 710 and 720, the rollers 714 and 724 contact the second flaps F2. As a result, the friction between the second bending arms 710 and 720 and the second flaps F2 in the bending operation can be reduced, so that the bending operation can be performed smoothly.

In particular, in the present embodiment, since the second flaps F2 are longer than the first flaps F1, the load for bending the second flaps F2 is larger than the load for bending the first flaps F1. For this reason, the rollers 714 and 724 are disposed at the edge portions of the second bending arms 710 and 720, although not disposed at the edge portions of the first bending arms 510 and 520.

Note that although the rollers may also be disposed in the first bending arms 510 and 520, the rollers are not disposed in the first bending arms 510 and 520 in the present embodiment. The reason is as follows. That is, the first bending arms 510 and 520 bend the first flaps F1, which are bent earlier than the second flaps F2. Thus, while the second flaps F2 are being bent by the second bending arms 710 and 720, the first bending arms 510 and 520 are holding the first flaps F1 in a state where the first flaps F1 are bent. As a result, the first bending arms 510 and 520 are sandwiched between the first flaps F1 and the second flaps F2 in a state where the second flaps F2 are bent by the second bending arms 710 and 720.

As described below, after the second flaps F2 are bent, a tape is stuck on the bottom face of the cardboard by the tape unit 800. Thus, the first bending arms 510 and 520 are pulled out of the space between the first flaps F1 and the second flaps F2 when the sticking operation is performed. For this reason, it is preferable that the first bending arms 510 and 520 be made as thin as possible. In a case where the rollers are disposed at the edge portions of the first bending arms 510 and 520, since the thickness of the first flaps F1 increases by the size of the rollers, the rollers are not disposed at the edge portions of the first bending arms 510 and 520. Since the first flaps F1 are smaller in length than the second flaps F2, the load for bending the first flaps F1 is smaller than the load for bending the second flaps F2. Thus, the bending operation can be performed smoothly on the first flaps F1 even if the rollers are not disposed at the edge portions of the first bending arms 510 and 520.

Figure 19:
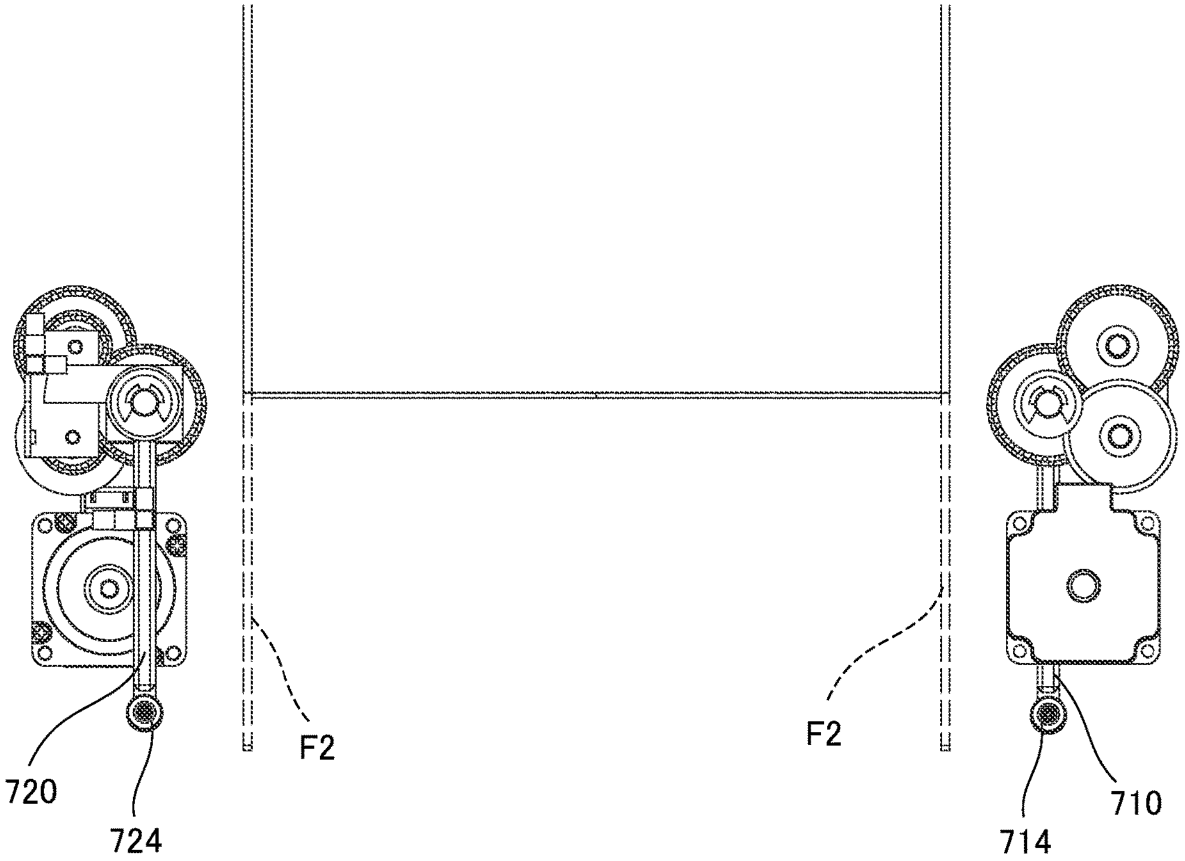
FIG. 19 is a front view illustrating a state where second flaps are still not bent by the second flap-bending arms of the embodiment.

Next, the bending operation of the second bending arms 710 and 720 will be described with reference to FIGS. 19 to 21. FIG. 19 illustrates the standby position at which the second bending arms 710 and 720 do not perform the bending operation. At the standby position, the second bending arms 710 and 720 are substantially parallel with the up-down direction. As described above, if the first flaps F1 are bent to a predetermined position by the first bending arms 510 and 520, the first bending arms 510 and 520 stop at the position. In this state, the lower face of the cardboard is supported by the first bending arms 510 and 520, and the upper face of the cardboard is held by the driven roller 202 and the upper-flap holding roller 670. The driven roller 202 and the upper-flap holding roller 670 are in contact with upper flaps of the cardboard (i.e., second flaps F2 in the present embodiment) that are not closed. In this manner, the position of the cardboard in the up-down direction is regulated by the first bending arms 510 and 520, the driven roller 202, and the upper-flap holding roller 670.

Figure 20:
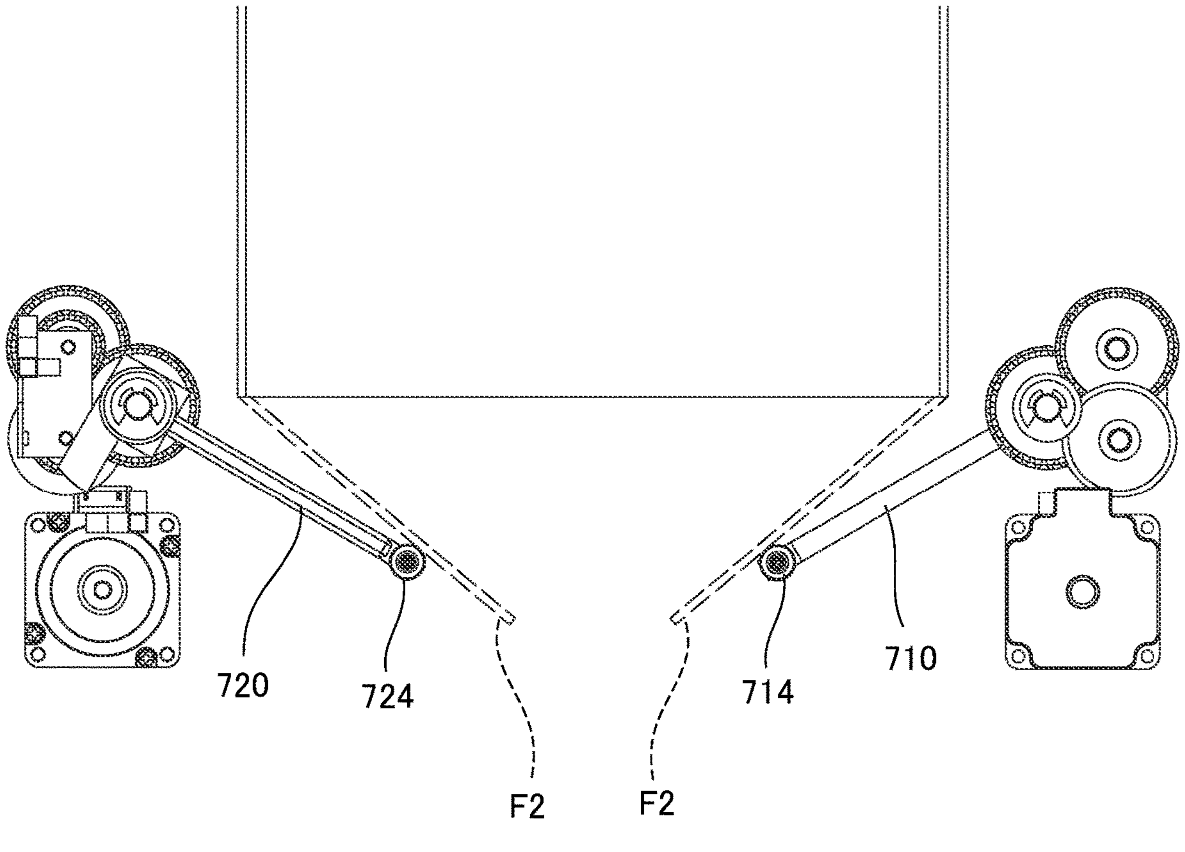
FIG. 20 is a front view illustrating a state where the second flaps are being bent by the second flap-bending arms of the embodiment.

As illustrated in FIG. 20, in this state, the second bending arms 710 and 720 start to pivot and bend the second flaps F2. Even in this state, the first bending arms 510 and 520 stay at the position at which the first bending arms 510 and 520 have bent the first flaps F1, and hold the cardboard. The second bending arms 710 and 720 further pivot to a bending position illustrated in FIG. 21, and stop.

Figure 21:
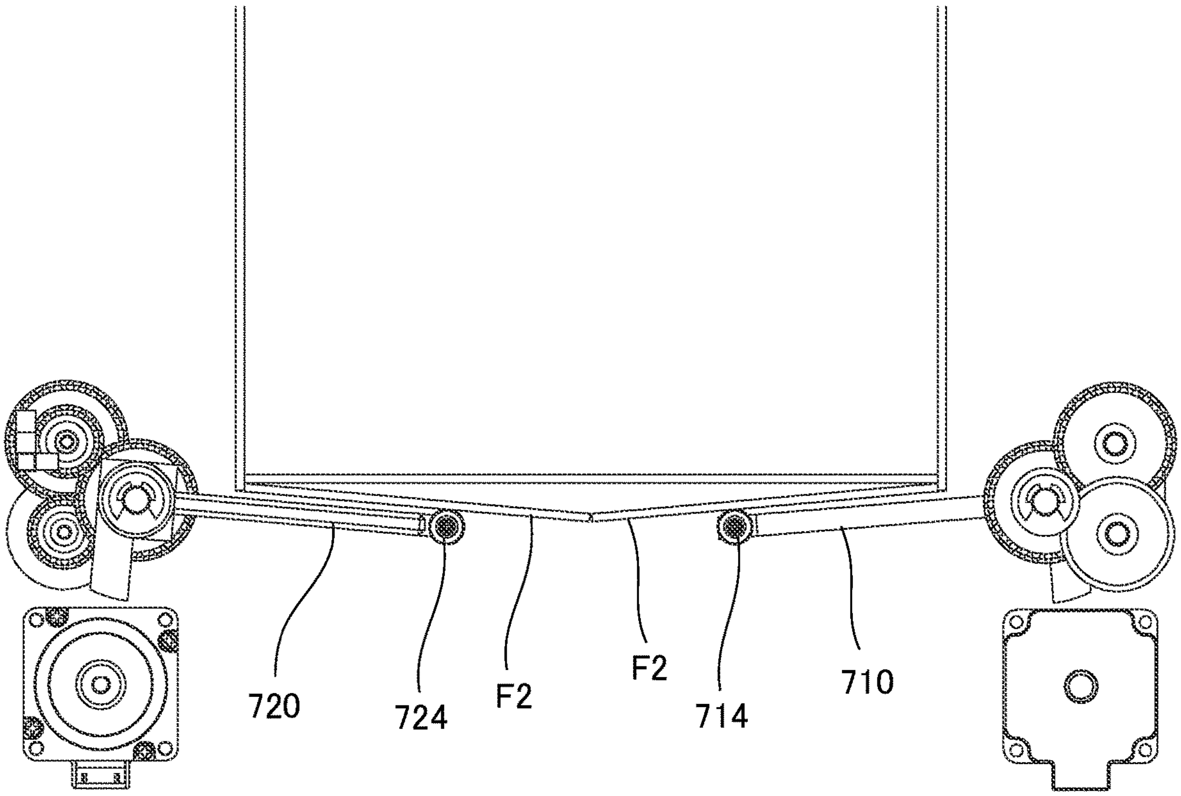
FIG. 21 is a front view illustrating a state where the second flaps have been bent by the second flap-bending arms of the embodiment.

As illustrated in FIG. 21, at the bending position, the pair of second flaps F2, which face each other, is not completely closed. That is, the edge portions of the second flaps F2 (that form a pair) are located lower than the edge positions of the second flaps F2 that are horizontal. For example, the second bending arms 710 and 720 stop pivoting at a position at which the second flaps F2 incline with respect to a horizontal plane by 3 degrees, for example, and at which the edge portions of the second flaps F2 are located lower than the edge positions of the second flaps F2 that are horizontal. The angle with respect to the horizontal plane is not limited to 3 degrees, and can be set appropriately in a range equal to or larger than 1 degree and equal to or smaller than 10 degrees.

As described above, in the present embodiment, the second flaps F2 are not completely closed (the closing operation is stopped before the second flaps F2 become horizontal), and are inclined. With this operation, the first bending arms 510 and 520 sandwiched between the second flaps F2 and the first flaps F1 can be easily pulled out. If the second flaps F2 are closed to the extent that the second flaps F2 are horizontal, the first bending arms 510 and 520 and the first flaps F1 will be pushed up by the second flaps F2. In this case, not only does it become difficult to pull out the first bending arms 510 and 520, but the cardboard may also be deformed. Thus, in the present embodiment, the second bending arms 710 and 720 stop pivoting at a position at which the closing operation for the second flaps F2 is stopped before the second flaps F2 become horizontal.

In addition, as illustrated in FIG. 21, the second bending arms 710 and 720 are stopped at a position at which the second flaps F2 are inclined and the edge portions of the second flaps F2 are located lower than the edge portions of the second flaps F2 that are horizontal. In this state, the pair of the second flaps F2 forms a valley shape. Since a tape is stuck on the second flaps F2 in this state, as described below, the tape can be easily and neatly stuck on the second flaps F2, without the edge portions of the second flaps F2 overlapping with each other.

If the second flaps F2, on which a tape is to be stuck by the tape unit 800, are bent until the second flaps F2 become horizontal, the edge portions of the second flaps F2 (that form a pair) may overlap with each other. If a tape is stuck on the second flaps F2 in this state, the quality of the product will decrease. In contrast, if the edge portions of the second flaps F2 (that form a pair) form a valley shape, the tape will be easily stuck on the second flaps F2, without the edge portions of the second flaps F2 overlapping with each other, and the quality of the product can be ensured stably.

As described with reference to FIG. 21, after the second bending arms 710 and 720 are pivoted to the bending position, the first bending arms 510 and 520 are pulled out of the space between the first flaps F1 and the second flaps F2. After the first bending arms 510 and 520 are pulled out, the bending operation of the first bending arms 510 and 520 is performed again, and the first bending arms 510 and 520 is forced to abut against the bottom face of the second flaps F2. This operation is performed in accordance with the movement of the above-described first pressing portions 410 and 420 by moving the first pressing portions 410 and 420 in the front-back direction. When the cardboard is in this state, the bottom face of the cardboard is supported by the first bending arms 510 and 520 and the second bending arms 710 and 720. In this state, the tape is stuck on the bottom face of the cardboard by the below-described tape unit 800.

[Tape Unit]

Figure 22:
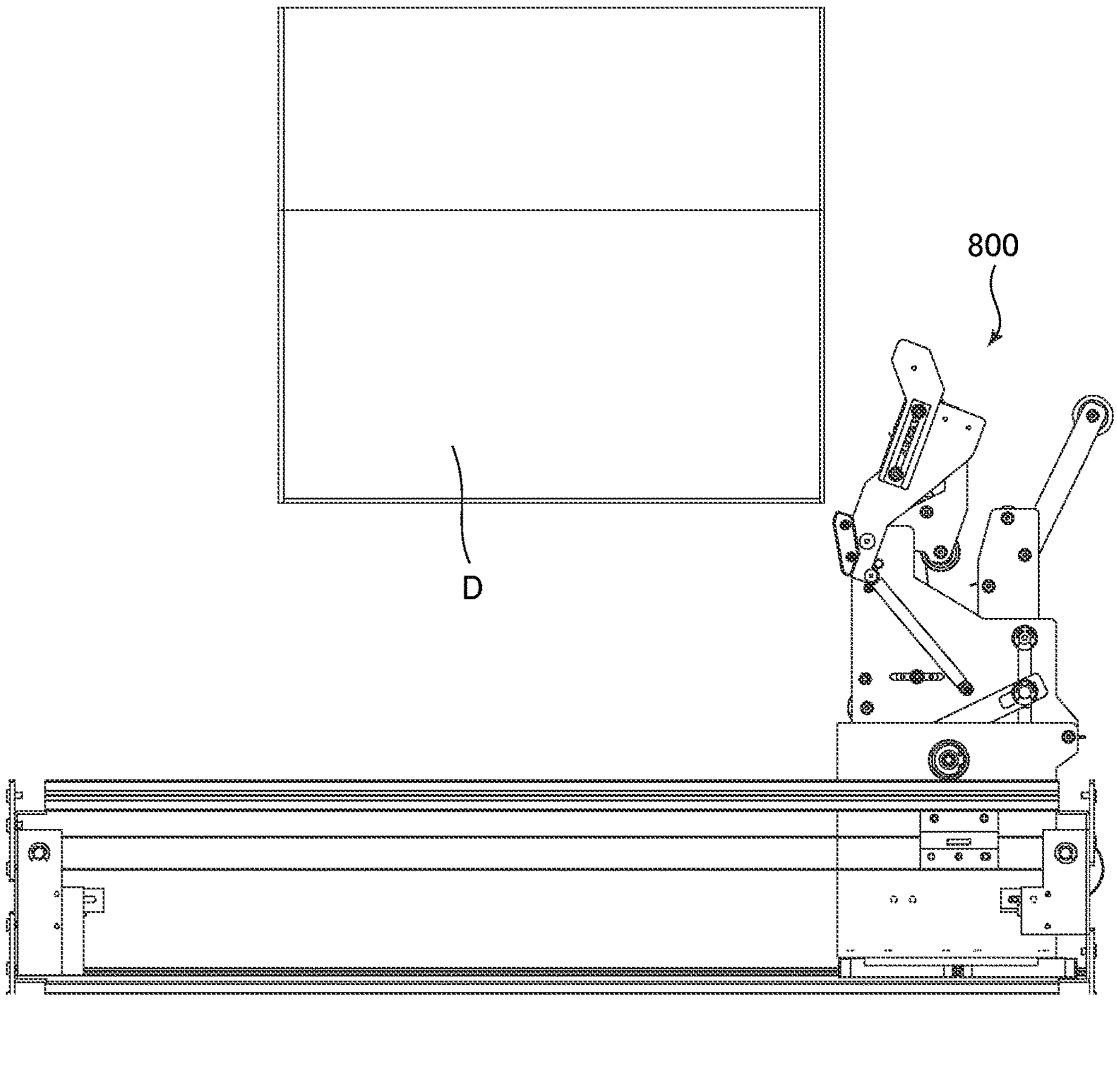
FIG. 22 is a side view in which the tape unit of the embodiment is extracted and illustrated.
Figure 23:
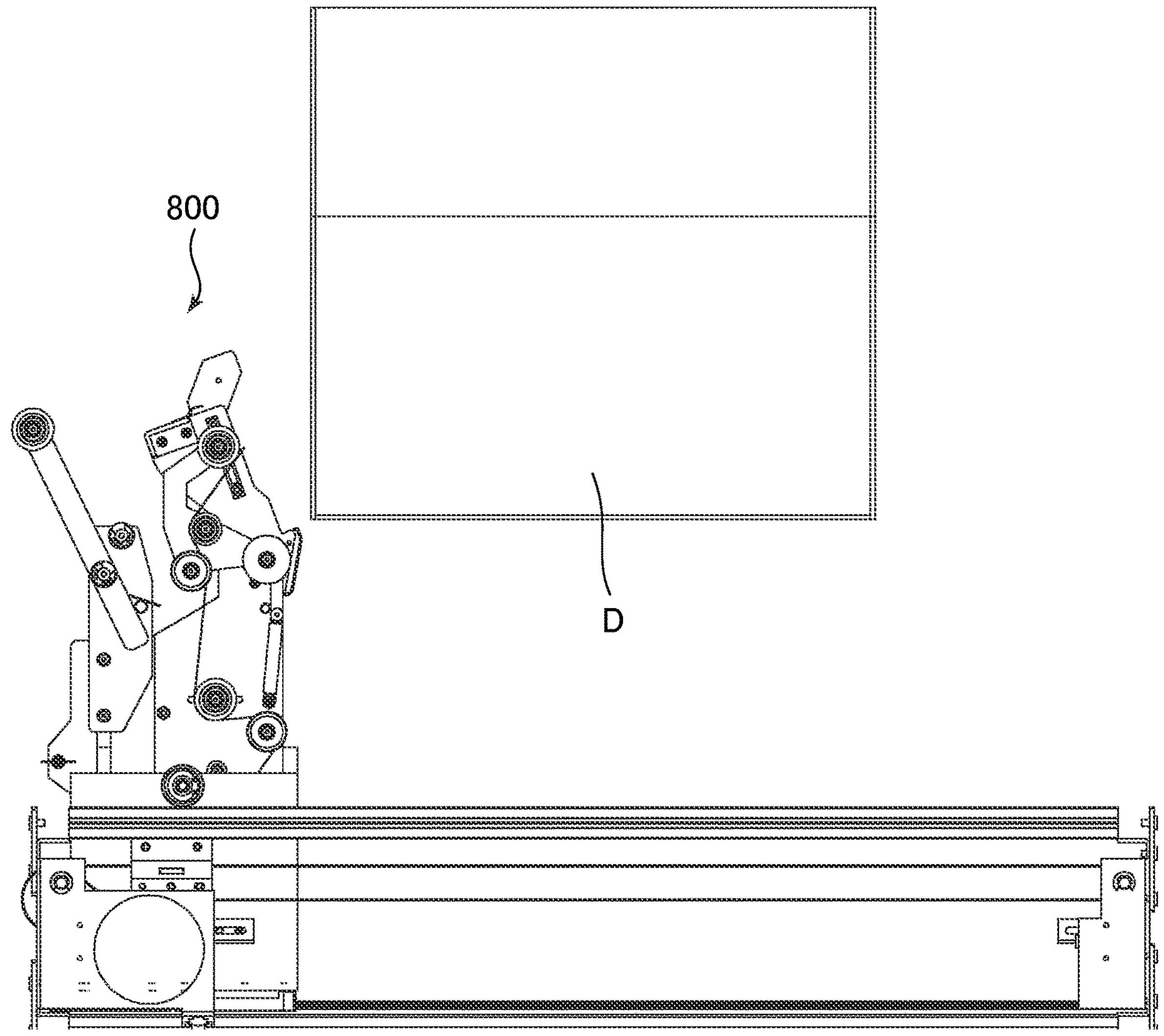
FIG. 23 is a side view viewed from a side opposite to a side from which the side view of FIG. 22 is viewed.

Next, the tape unit 800 that sticks a tape on the bottom face of the cardboard will be described with reference to FIGS. 22 to 39. As described previously, at a home position, the tape unit 800 is located on the front side in the housing 101. FIGS. 22 and 23 illustrate the tape unit 800 located at the home position. FIG. 22 is a diagram in which the tape unit 800 is viewed from the left side, and FIG. 23 is a diagram in which the tape unit 800 is viewed from the right side. As is clear from FIGS. 22 and 23, the tape unit 800 at the home position is located on the front side with respect to the cardboard D whose lower first flaps F1 and second flaps F2 are closed as described above.

Figure 24:
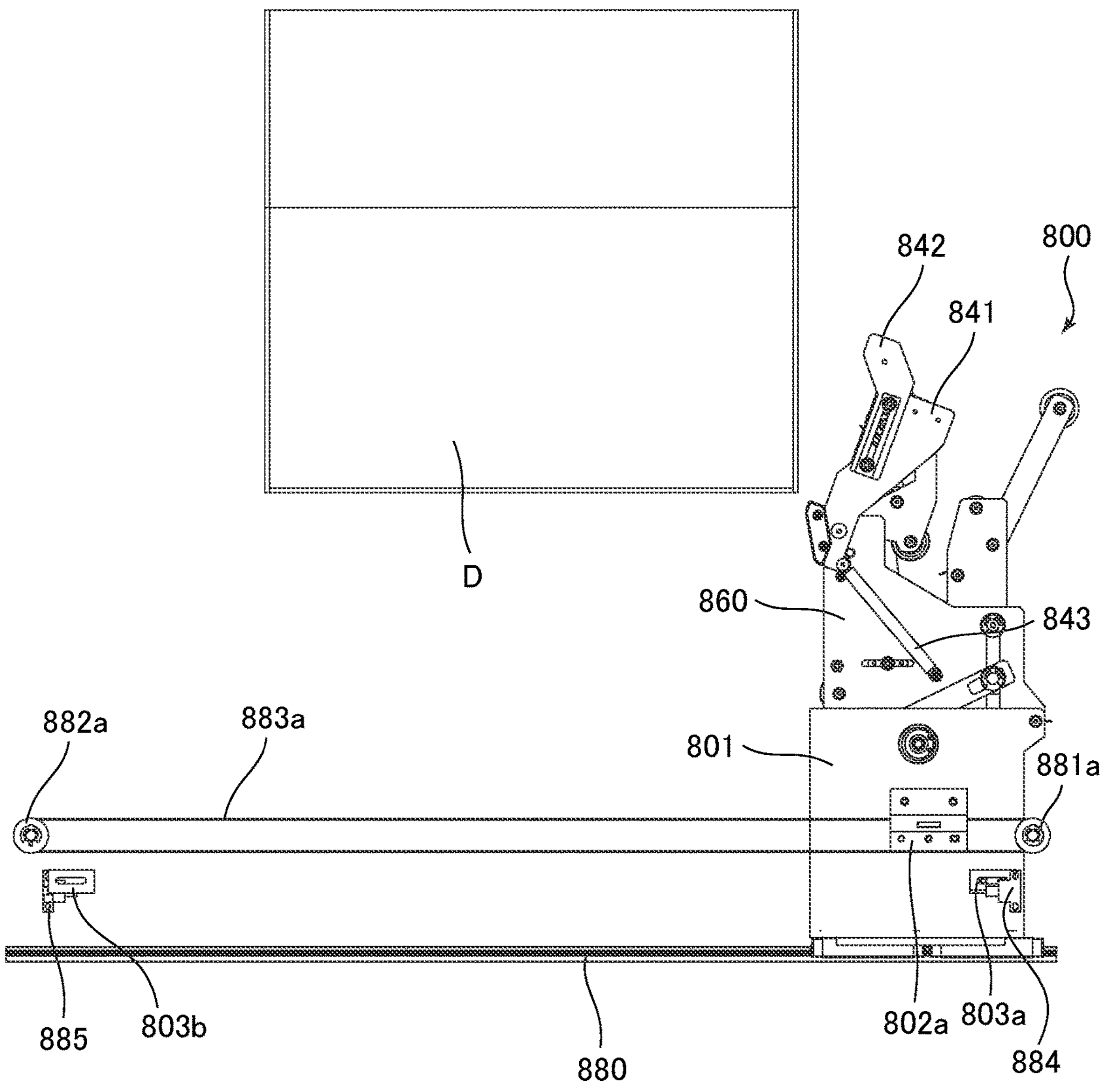
FIG. 24 is a side view illustrating a state before a tape sticking operation is performed by the tape unit of the embodiment.
Figure 25:
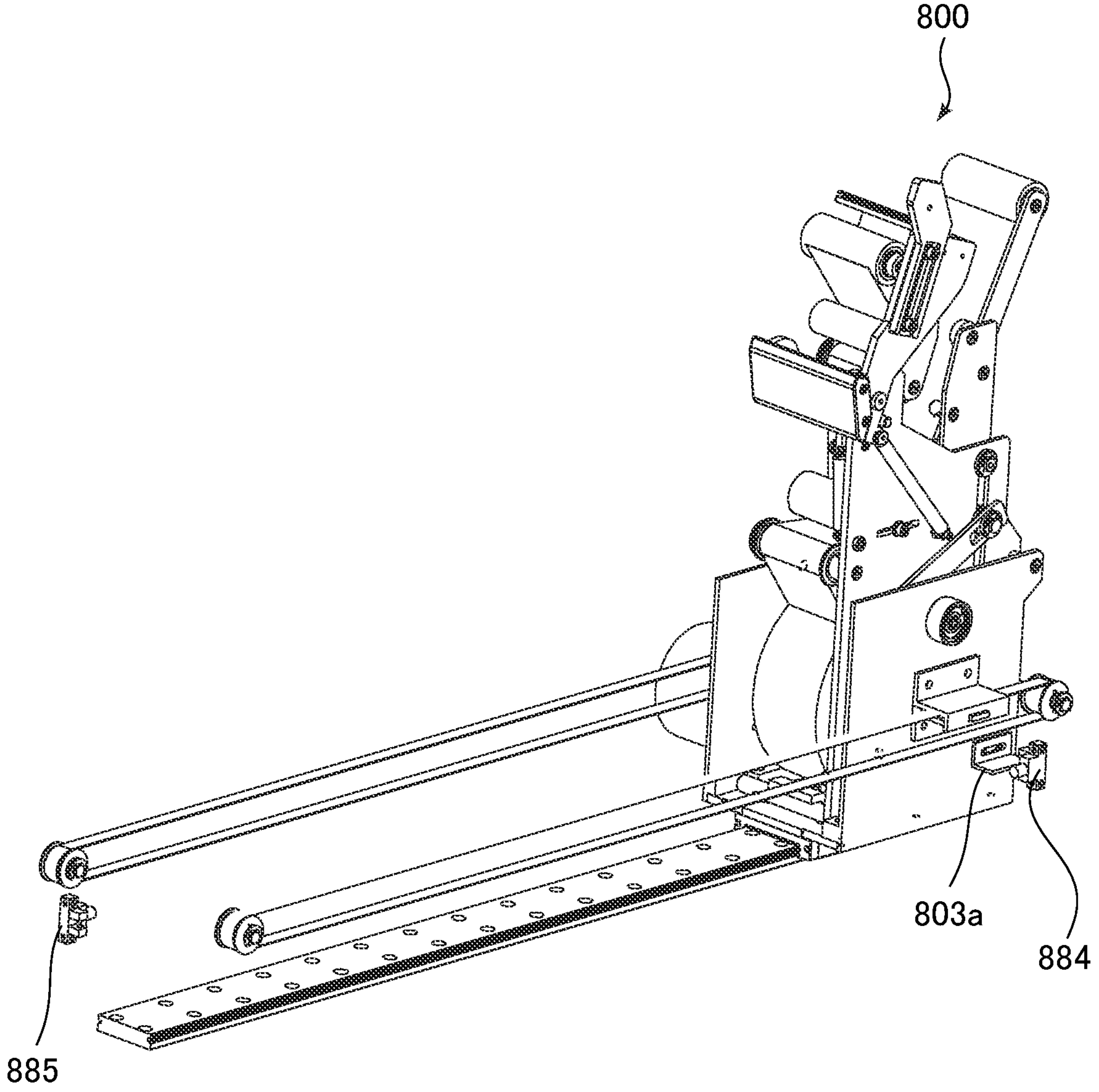
FIG. 25 is a perspective view in which the tape unit of the embodiment is extracted and illustrated.
Figure 26:
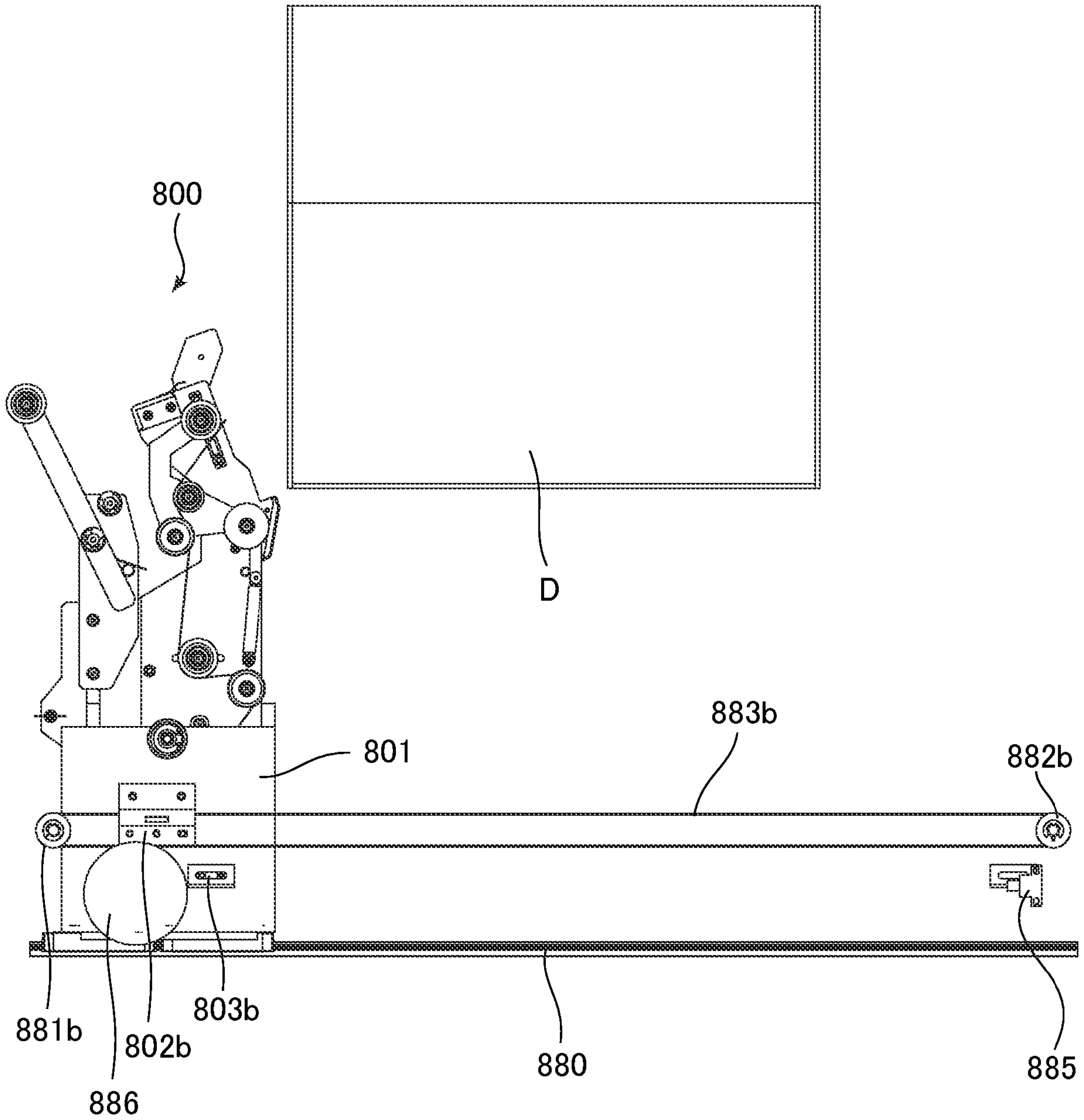
FIG. 26 is a side view viewed from a side opposite to a side from which the side view of FIG. 24 is viewed.
Figure 27:
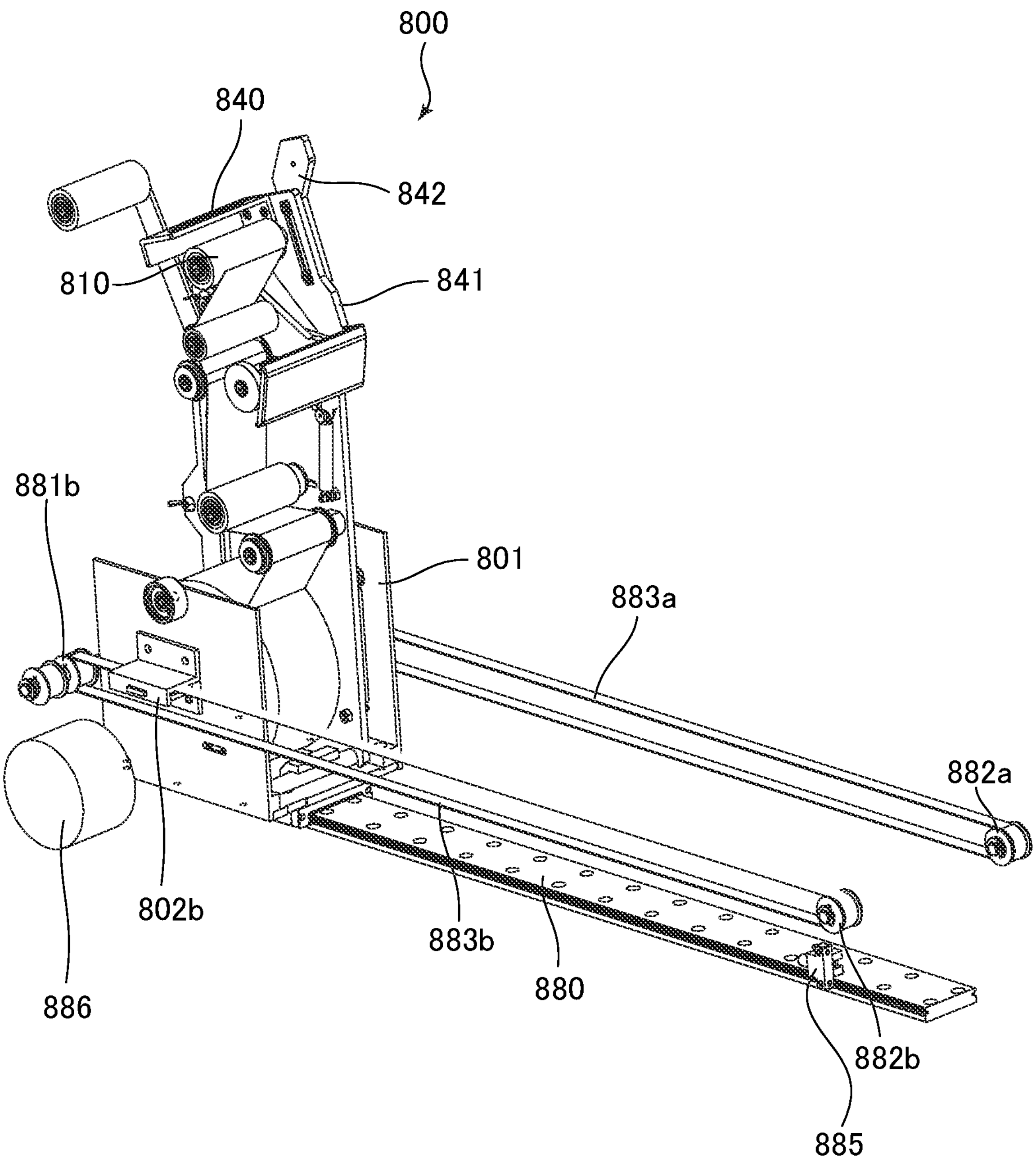
FIG. 27 is a perspective view viewed from a side opposite to a side from which the perspective view of FIG. 25 is viewed.

As illustrated in FIGS. 24 to 27, the tape unit 800 is disposed on a guide rail 880 so as to be able to move in the front-back direction. FIGS. 24 to 27 also illustrate the tape unit 800 located at the home position. FIG. 24 is a plan view in which the tape unit 800 is viewed from the left side. FIG. 25 is a perspective view in which the tape unit 800 is viewed from the left back side. FIG. 26 is a plan view in which the tape unit 800 is viewed from the right side. FIG. 27 is a perspective view in which the tape unit 800 is viewed from the right back side.

On the guide rail 880 of the tape unit 800, a base 801 is placed. A moving block 802*a* is fixed to the left side surface of the base 801, and a moving block 802*b* is fixed to the right side surface of the base 801. On the left side of the tape unit 800 disposed in the housing 101, a pulley 881*a*, a pulley 882*a*, and a belt 883*a* are disposed. On the right side of the tape unit 800, a pulley 881*b*, a pulley 882*b*, and a belt 883*b* are disposed. The pulley 881*a*, the pulley 882*a*, and the belt 883*a* are disposed on the left side of the tape unit 800, and the belt 883*a* stretched between and wound around the pulleys 881*a* and 882*a* is disposed so as to extend in the front-back direction. Similarly, the pulley 881*b*, the pulley 882*b*, and the belt 883*b* are disposed on the right side of the tape unit 800, and the belt 883*b* stretched between and wound around the pulleys 881*b* and 882*b* is disposed so as to extend in the front-back direction.

The moving blocks 802*a* and 802*b* are respectively fixed to the belts 883*a* and 883*b*. On the right side of the tape unit 800, a tape-unit moving motor (i.e., a tape sticking motor) 886 is disposed. The driving force from the tape-unit moving motor 886 is transmitted to the right pulley 881*b* via a driving-force transmission mechanism (not illustrated) that includes pulleys and a belt. The right pulley 881*b* and the left pulley 881*a* are linked with each other via the same rotary shaft, and the driving force from the tape-unit moving motor 886 is transmitted also to the left pulley 881*a*. Thus, the pulley 881*a* and the pulley 881*b* are rotated, in synchronization with each other, in a forward or reverse direction by the tape-unit moving motor 886 rotating in a forward or reverse direction.

The pulleys 882*a* and 882*b* on the back side are not linked with each other because the pulleys 882*a* and 882*b* are driven pulleys. The pulleys 882*a* and 882*b* are disposed such that the rotation axis of the pulley 882*a* is equal to the rotation axis of the pulley 882*b*. The belt 883*a* stretched between and wound around the pulleys 881*a* and 882*a* moves in a circumferential direction if the pulley 881*a* is rotated by driving the tape-unit moving motor 886. Similarly, the belt 883*b* stretched between and wound around the pulleys 881*b* and 882*b* moves in a circumferential direction if the pulley 881*b* is rotated by driving the tape-unit moving motor 886. As a result, the tape unit 800, connected to the belts 883*a* and 883*b* via the moving blocks 802*a* and 802*b*, moves along the guide rail 880 in the front-back direction.

On the left side surface of the base 801, a sensor flag 803*a* is disposed. Similarly, on the right side surface of the base 801, a sensor flag 803*b* is disposed. On the other hand, in the housing 101, a home position sensor 884 is disposed on the front side, and a stop position sensor 885 is disposed on the back side. Each of the sensors 884 and 885 is a photo-interrupter, and detects the passage of the sensor flag 803*a* or 803*b*. In the present embodiment, the home position sensor 884 is disposed on the left side of the tape unit 800, and the stop position sensor 885 is disposed on the right side of the tape unit 800. If the left sensor flag 803*a* passes the home position sensor 884, the home position sensor 884 detects the tape unit 800 located at the home position. If the right sensor flag 803*b* passes the stop position sensor 885, the stop position sensor 885 detects the tape unit 800 located at a stop position. Note that the sensors 884 and 885 may be disposed on only one side of the right and left sides and the sensor flags may also be disposed on only one side.

Figure 28:
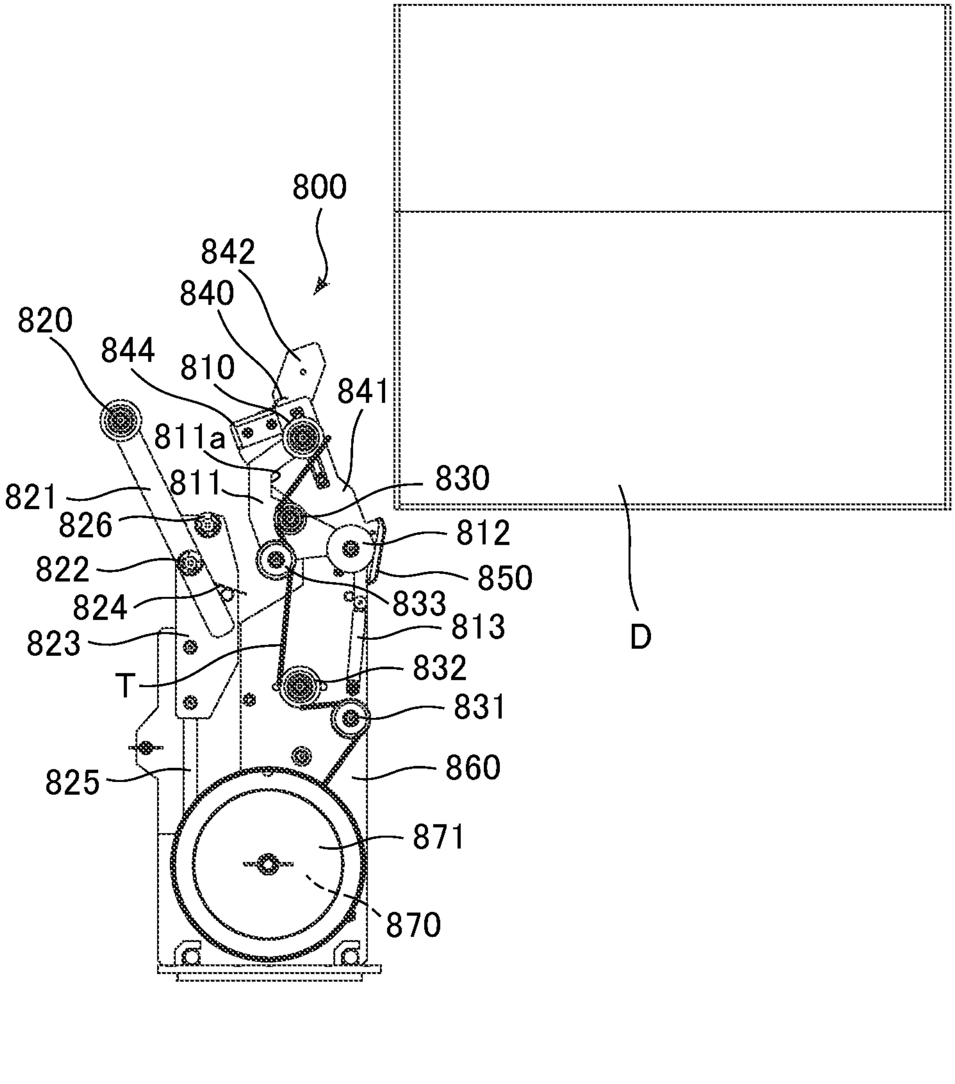
FIG. 28 is a cross-sectional view illustrating a standby state of the tape unit of the embodiment.

Next, a configuration of the tape unit 800 for sticking a tape T will be described, mainly with reference to FIG. 28. Note that FIG. 28 is a diagram in which the tape unit 800 is viewed from the right side. As is clear from the perspective views of FIGS. 25 and 27, in the present embodiment, components for sticking the tape T are supported by a frame 860 disposed on the left side of the tape unit 800. For this reason, the description will be made with reference to FIG. 28 in which the tape unit 800 is viewed from the right side. Note that the frame that supports the components may be disposed on the right side, or may be disposed on both of the right and left sides.

The tape unit 800 includes a first holding roller 810, a second holding roller 820, a tape cutter 840, a flap holding portion 850, and a tape holding portion 870. The first holding roller 810 is pivotally supported by the leading edge of a tape roller arm 811. The tape roller arm 811 is pivotally supported by a pivot shaft 812, and is urged by a tension spring 813 so that the first holding roller 810 pivots toward the front face side of the housing 101, on the pivot shaft 812. The first holding roller 810 is a roller that moves while sticking the tape T on the cardboard. The first holding roller 810 is supplied with the tape T from a tape body that is rotatably supported by the tape holding portion 870. Specifically, the tape T is pulled out of the tape body, and is supplied to the first holding roller 810 via a tape guide roller 831, a tape guide roller 832, a tape guide roller 833, and a final feeding roller 830.

Since the first holding roller 810 sticks the tape T on the front side face of the cardboard D first, the first holding roller 810 is positioned at a position higher than the bottom face of the cardboard D when the sticking operation of the tape T is started. As described below, the first holding roller 810 sticks the tape T on the front side face of the cardboard D that extends upward from the bottom face of the cardboard D, and then on the bottom face of the cardboard D. For sticking the tape T on the bottom face, the first holding roller 810 falls backward in the moving direction of the tape unit 800, against the urging force of the tension spring 813, in accordance with the movement of the tape unit 800 in the backward direction, and then sticks the tape T on the bottom face of the cardboard D while moving along the bottom face of the cardboard D.

The tape roller arm 811 that supports the first holding roller 810 has a curved shape so that the tape roller arm 811 does not interfere with a corner portion of the cardboard D when the first holding roller 810 moves from the side face to the bottom face as described above. That is, the tape roller arm 811 does not linearly link the pivot shaft 812 and the first holding roller 810. Specifically, if the first holding roller 810 is located at a position illustrated in FIG. 28, the tape roller arm 811 is formed such that the tape roller arm 811 extends from the pivot shaft 812 backward in the moving direction of the tape unit 800, then extends upward, and then extends frontward. That is, the tape roller arm 811 forms a recess shape 811*a* between the first holding roller 810 and the pivot shaft 812.

The second holding roller 820 is disposed on the front side of the first holding roller 810, that is, upstream of the first holding roller 810 in the sticking direction of the tape T. The second holding roller 820 is supported by an end of a second roller arm 821, and the second roller arm 821 is pivotally supported by a pivot shaft 822. The pivot shaft 822 is positioned downstream of the center of pivot of the second holding roller 820 in the sticking direction. With this arrangement, the tape unit 800 can be made smaller than a tape unit in which the pivot shaft 822 is positioned upstream of the center of pivot of the second holding roller 820. The second roller arm 821 is supported by a slide member 823 via the pivot shaft 822, and the slide member 823 is supported so as to be able to move with respect to the frame 860 in the up-down direction.

The second roller arm 821 is urged by an urging spring 824 in a direction in which the second holding roller 820 pivots on the pivot shaft 822 and moves frontward in the moving direction of the tape unit 800. In addition, the slide member 823 is urged upward by an urging spring (not illustrated) disposed on the back side of the tape unit 800 in a direction illustrated in FIG. 28. In addition, the slide member 823 slides along a slide groove 825 in the up-down direction.

As described below, the second holding roller 820 further presses the tape T, which has been stuck on the cardboard D by the first holding roller 810, against the cardboard D, and sticks the tape T on the back side face of the cardboard D. That is, after the tape T is stuck on the bottom face of the cardboard D by the first holding roller 810, and the tape T is cut by the tape cutter 840, the second holding roller 820 sticks the rest of the tape T, on the back side face of the cardboard D that extends upward from the bottom face of the cardboard D.

The tape cutter 840 is disposed on a tape cutter arm 841. As illustrated in FIGS. 24 and 27, the tape cutter arm 841 is pivotally supported by the left side surface of the frame 860, and can pivot independently of the first holding roller 810. The tape cutter 840 is disposed so as to project from the tape cutter arm 841 toward the first holding roller 810. The tape cutter arm 841 pivots as described below, and thereby the tape T stuck on the cardboard D by the first holding roller 810 is cut.

At the leading edge of the tape cutter arm 841, a tape-cutter-arm abutment portion 842 is disposed so as to project above the first bending arm 510 in a state illustrated in FIGS. 24 and 28. When viewed from the front side of the housing 101, the tape-cutter-arm abutment portion 842 is disposed on the left side of the trajectory of pivot of the first bending arm 510, and separated from the trajectory of pivot of the first bending arm 510. Thus, the tape-cutter-arm abutment portion 842 pivots together with the tape cutter arm 841, regardless of the pivot of the first bending arm 510. As illustrated in FIG. 24, the tape cutter arm 841 is urged by a tension spring 843 so that the tape cutter 840 and the tape-cutter-arm abutment portion 842 can move frontward in the moving direction of the tape unit 800.

The flap holding portion 850 is disposed on the tape cutter arm 841, and can pivot together with the tape cutter arm 841. The flap holding portion 850 is positioned on the leading end side (i.e., the downstream side) in the tape sticking direction, and when the tape sticking operation is performed, the flap holding portion 850 moves along the bottom face of the cardboard D while holding an abutment portion of the pair of the second flaps F2. The holding surface of the flap holding portion 850 is a flat surface parallel to the horizontal direction. The abutment portion of the pair of the second flaps F2 is held by the holding surface of the flap holding portion 850, so that edge portions of the second flaps F2 (that form a pair) can abut against each other in the substantially horizontal direction, without overlapping with each other. After the abutment portion of the pair of the second flaps F2 is held by the flap holding portion 850, the first tape-holding roller 810 sticks the tape T on the abutment portion.

Figure 36A:
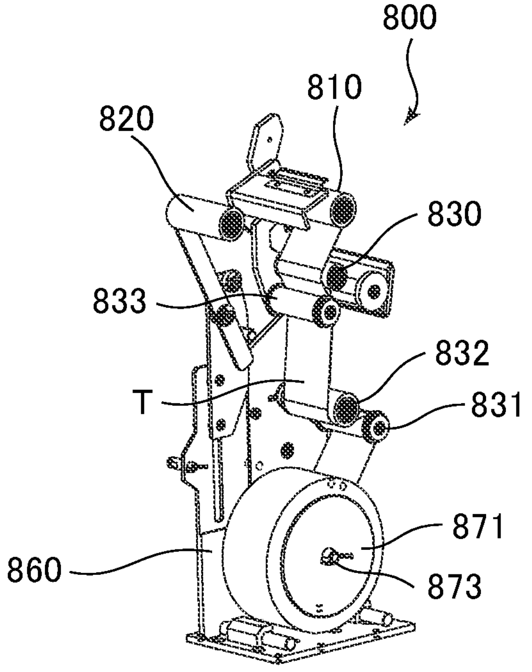
FIG. 36A is a perspective view illustrating a state where the tape of the tape unit of the embodiment is exposed.
Figure 36B:
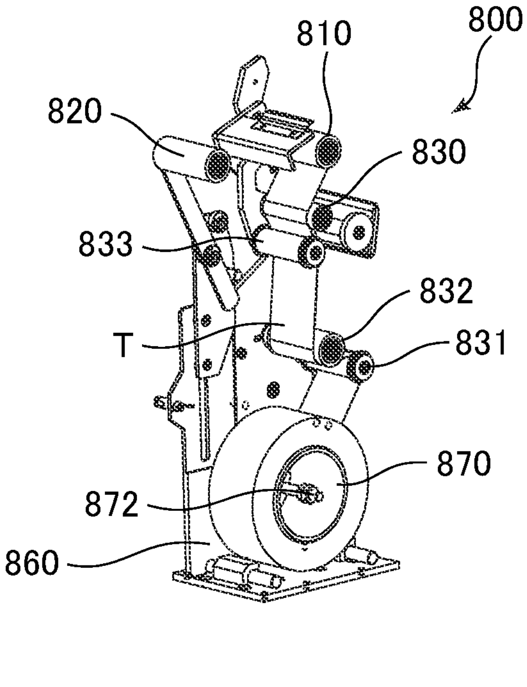
FIG. 36B is a perspective view illustrating a state where a fixing plate for the tape of the tape unit of the embodiment is removed.
Figure 37:
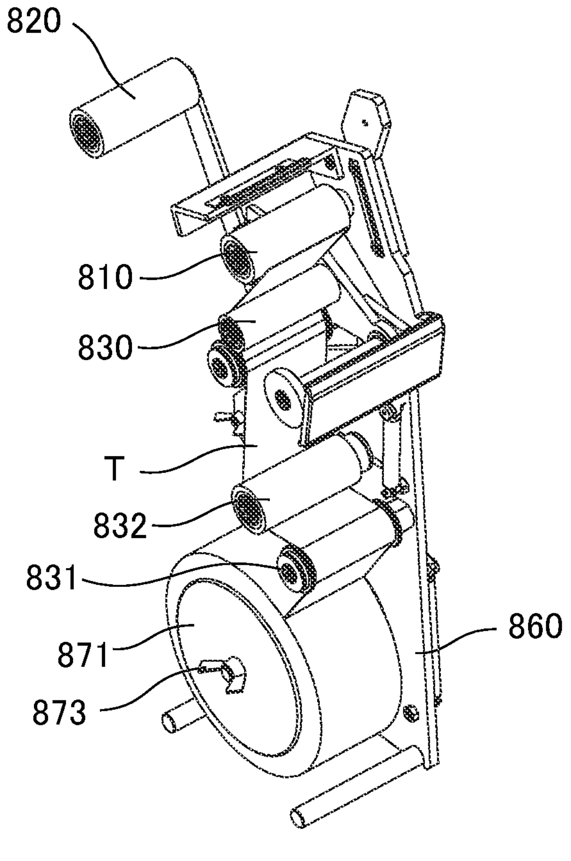
FIG. 37 is a perspective view viewed from a direction different from a direction from which the perspective view of FIG. 36A is viewed.
Figure 38:
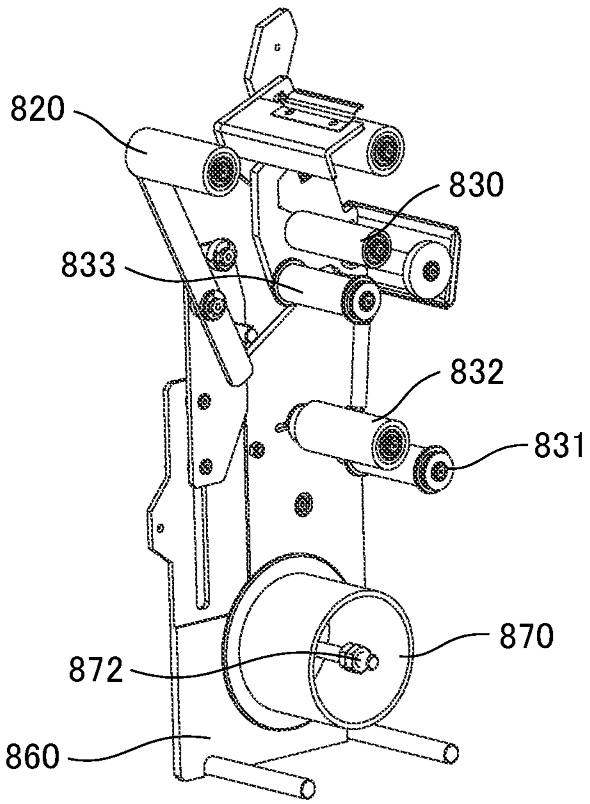
FIG. 38 is a perspective view illustrating a state where the tape is removed from the tape unit of the embodiment.

As illustrated in FIGS. 36A to 38, the tape holding portion 870 holds the tape body portion such that the tape body portion can rotate. FIG. 36A is a perspective view illustrating a state where the tape body portion is held by the tape holding portion 870 and pressed by a tape holding plate 871. FIG. 36B is a perspective view illustrating a state where the tape holding plate 871 is removed. FIG. 37 is a perspective view illustrating a state where the tape T is pulled out from the tape body, held by the tape holding portion 870, to the first tape-holding roller 810 via the tape guide rollers 831, 832, and 833, and the final feeding roller 830. FIG. 38 is a perspective view illustrating a state where the tape holding portion 870 is not holding the tape body portion.

The tape holding portion 870 is formed like a cylinder so that the cylindrical tape body portion can be externally fitted loosely to the tape holding portion 870. In addition, the tape holding portion 870 is disposed so as to project rightward from the frame 860 disposed on the left side. Thus, the tape body portion can be replaced with another tape body portion, on the right side of the tape holding portion 870.

At a center of the tape holding portion 870, a screw 872 is disposed so as to project. The tape holding plate 871 can be fixed to the screw 872 by causing the screw 872 to pass through a through-hole formed at the center of the tape holding plate 871, and by tightening the screw 872 with a nut 873. In a state where the tape body portion is externally fitted to the tape holding portion 870, a side face of the tape body portion 870 is held by the tape holding plate 871, and the screw 872 is tightened with the nut 873. In this manner, the tape body portion can be held by the tape holding portion 870 such that the tape body portion can rotate and does not fall off.

Figure 29:
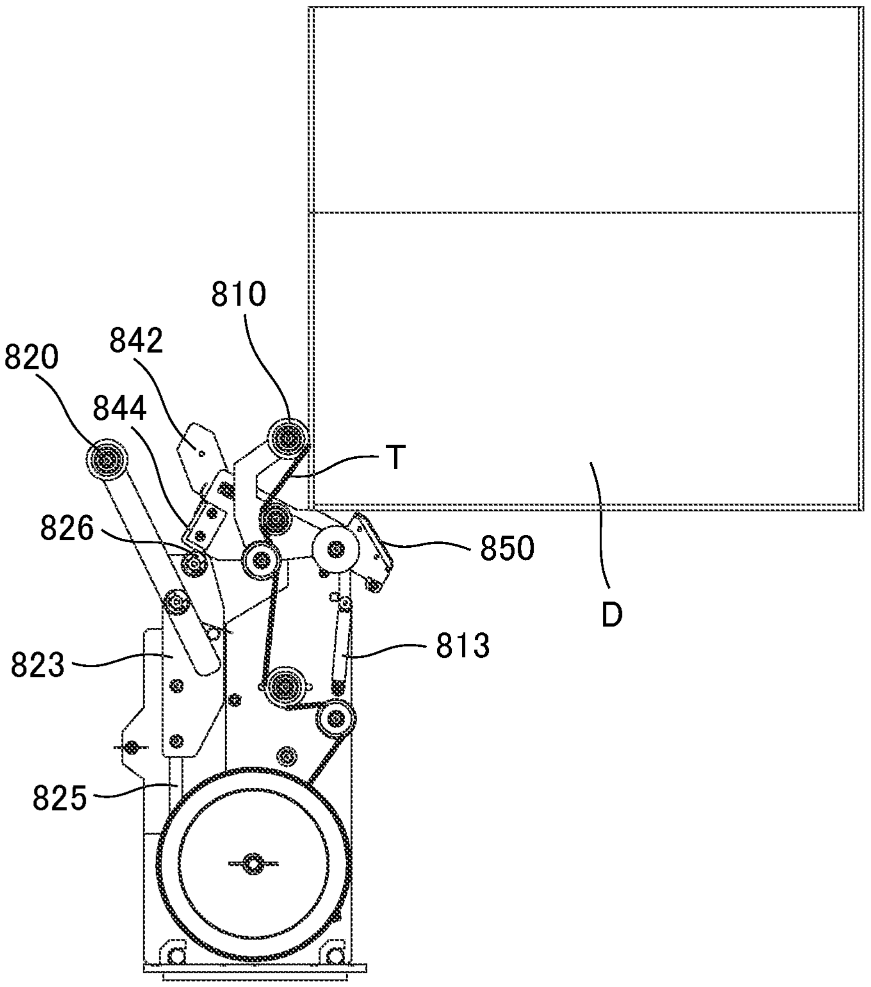
FIG. 29 is a cross-sectional view illustrating a state where a tape sticking operation is started by the tape unit of the embodiment.

Next, the tape sticking operation performed by the tape unit 800 will be described with reference to FIGS. 29 to 35. The tape unit 800 starts to move from the home position toward the back side with respect to the front side of the housing 101. As illustrated in FIG. 29, while the flap holding portion 850 holds the abutment portion of the second flaps F2 of the bottom face of the cardboard D, the first tape-holding roller 810 abuts against the front side face of the cardboard D, and the end of the tape T supported by the first tape-holding roller 810 is stuck on the front side face of the cardboard D.

Figure 30:
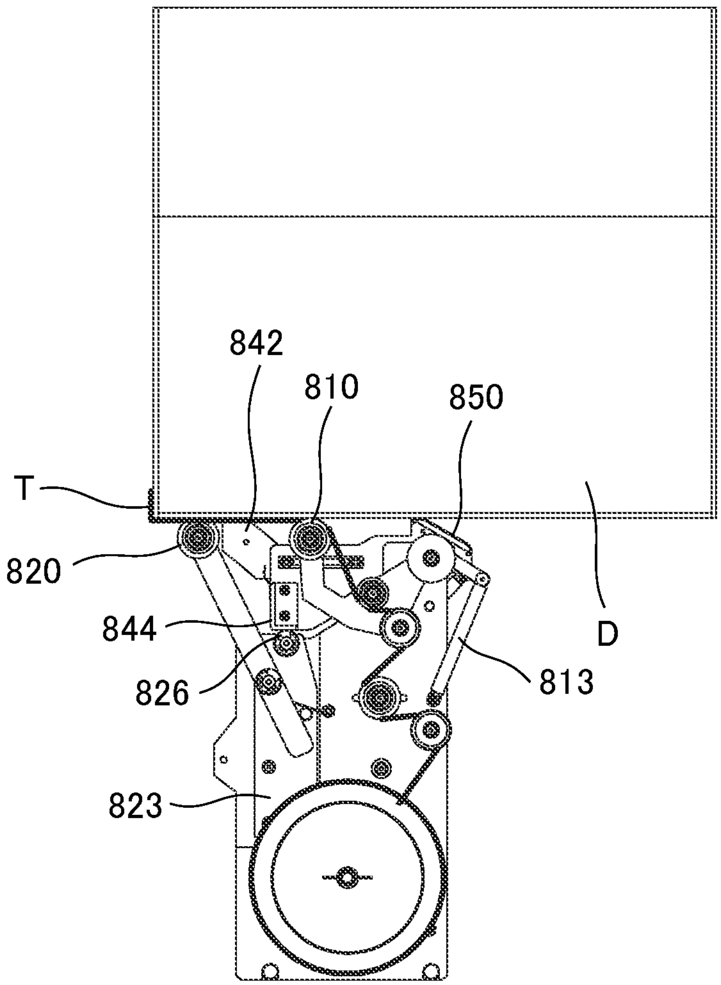
FIG. 30 is a cross-sectional view illustrating a state where the tape sticking operation is being perform by the tape unit of the embodiment.

As illustrated in FIG. 30, if the tape unit 800 moves backward, the first tape-holding roller 810 pivots frontward against the urging force of the tension spring 813, and enters the bottom face of the cardboard D. When the first tape-holding roller 810 enters the bottom face of the cardboard D, the first tape-holding roller 810 moves along a corner portion formed between the bottom face and the front side face of the cardboard D. As a result, the tape T is stuck also on the corner portion. In addition, the tape-cutter-arm abutment portion 842 abuts against the cardboard D and pivots frontward. Then, the tape-cutter-arm abutment portion 842 also enters the bottom face of the cardboard D. In addition, an L-shaped pushing portion 844 disposed on the tape cutter arm 841 abuts against a projection portion 826 disposed on the slide member 823, in accordance with the pivot of the tape-cutter-arm abutment portion 842. When the tape-cutter-arm abutment portion 842 enters the bottom face of the cardboard D, the tape-cutter-arm abutment portion 842 further pivots, and the slide member 823 moves downward against the urging force of an urging spring (not illustrated). As a result, the second holding roller 820 also enters the bottom face of the cardboard D.

Figure 31:
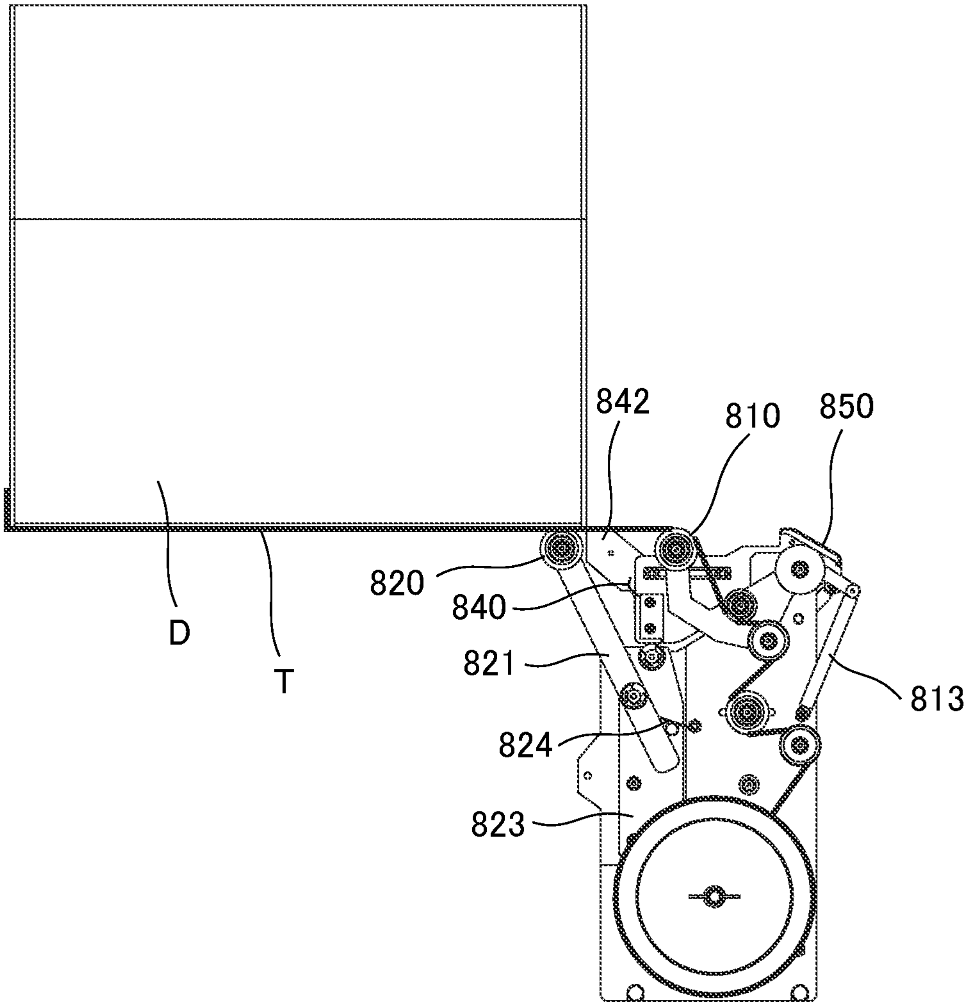
FIG. 31 is a cross-sectional view illustrating a state where the tape sticking operation is being perform by the tape unit of the embodiment, and where a first tape-holding roller is separated from the bottom face.

If the tape unit 800 further moves backward in this state, the tape T is stuck on the bottom face of the cardboard D by the first tape-holding roller 810, and the tape T, stuck on the bottom face, is further pressed against the bottom face by the second holding roller 820. As illustrated in FIG. 31, even after the first tape-holding roller 810 passes the bottom face of the cardboard D, the first holding roller 810 remains pushed down by the tension of the tape T stuck on the bottom face of the cardboard D.

Figure 32:
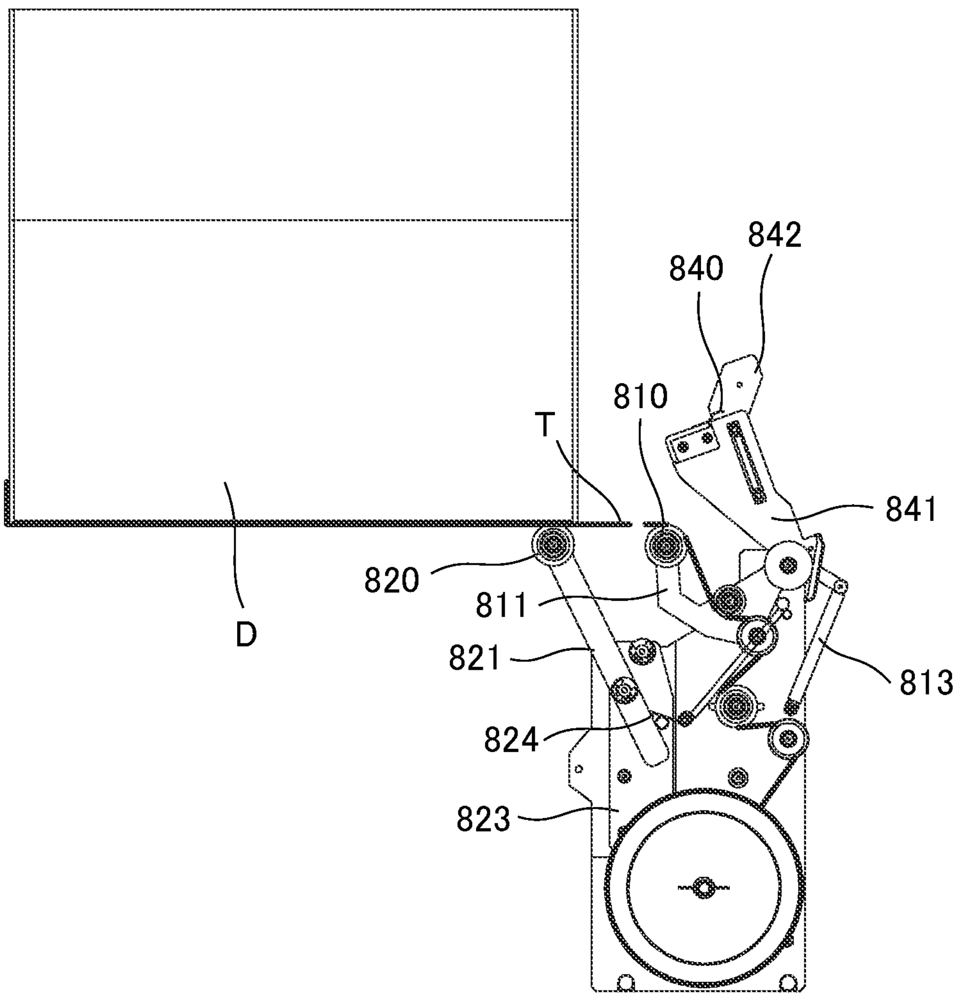
FIG. 32 is a cross-sectional view illustrating a state where the tape has been cut by the tape unit of the embodiment.

As illustrated in FIG. 32, if the tape unit 800 further moves and the tape-cutter-arm abutment portion 842 passes the bottom face of the cardboard D, the tape-cutter-arm abutment portion 842 is pivoted backward by the urging force of the tension spring 843, and the tape cutter 840 disposed on the tape cutter arm 841 is pulled out from the bottom face of the cardboard D and cuts the tape T, which is stretched by the first holding roller 810. Note that a length of the tape T, by which the tape T is cut, can be adjusted by adjusting the position of the tape-cutter-arm abutment portion 842.

Figure 33:
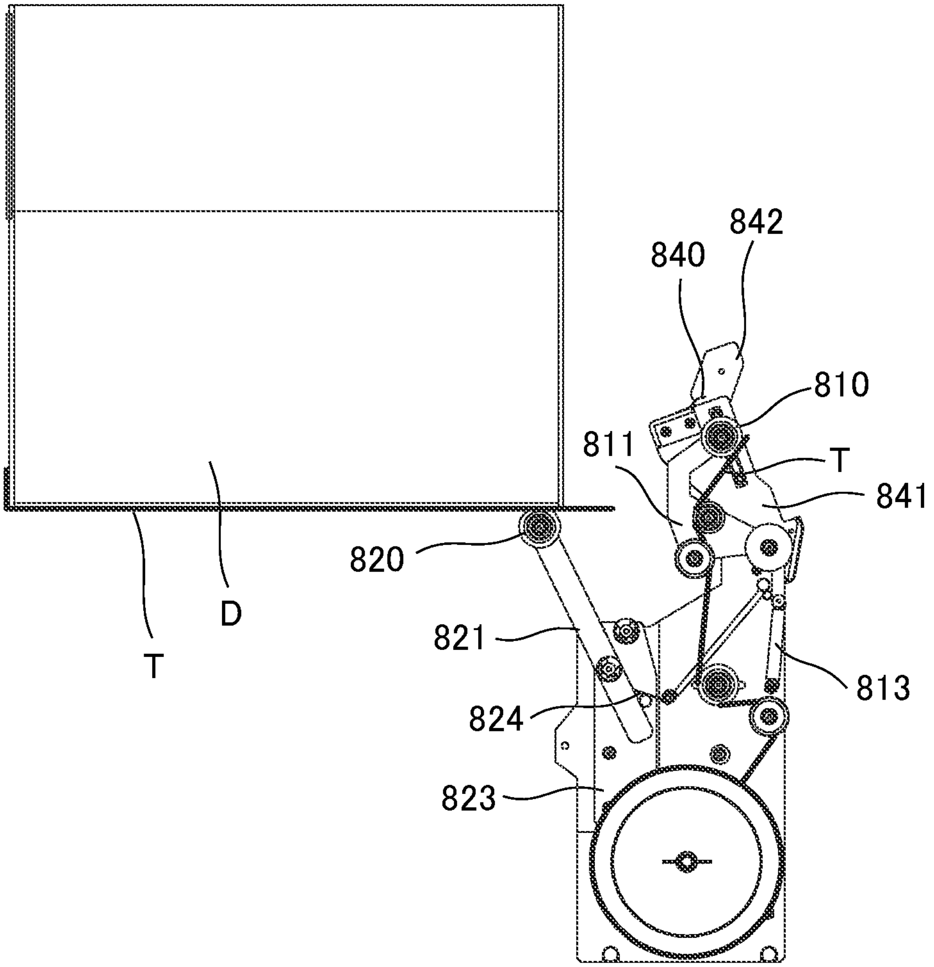
FIG. 33 is a cross-sectional view illustrating a state after the tape has been cut by the tape unit of the embodiment.

As illustrated in FIG. 33, after the tape T is cut, the first tape-holding roller 810 is pivoted backward by the urging force of the tension spring 813. In this state, the second holding roller 820 is located on the bottom face of the cardboard D. In addition, although the tape T has been stuck on the bottom face of the cardboard D, the tape T has still not been stuck on the back side face of the cardboard D.

Figure 34:
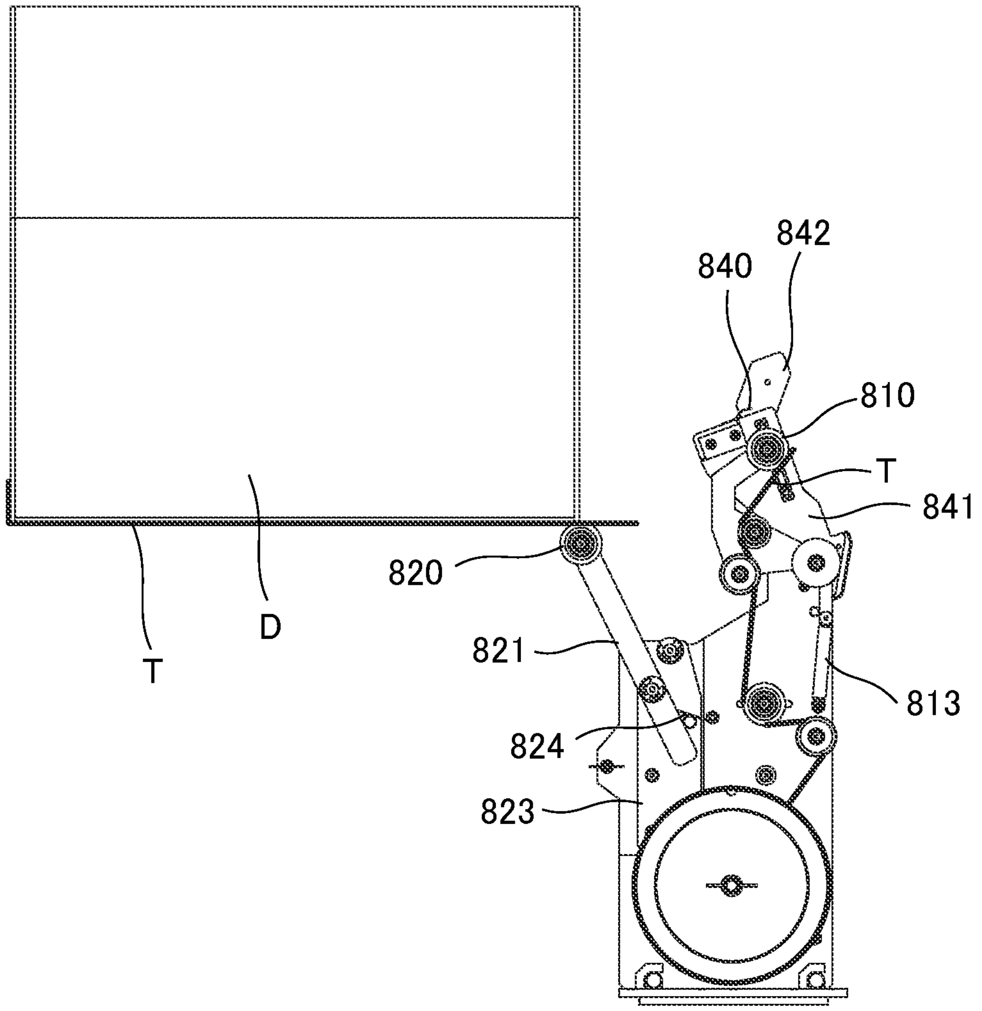
FIG. 34 is a cross-sectional view illustrating a state where the tape sticking operation is being perform by the tape unit of the embodiment, and where a second tape-holding roller has reached a corner portion.
Figure 35:
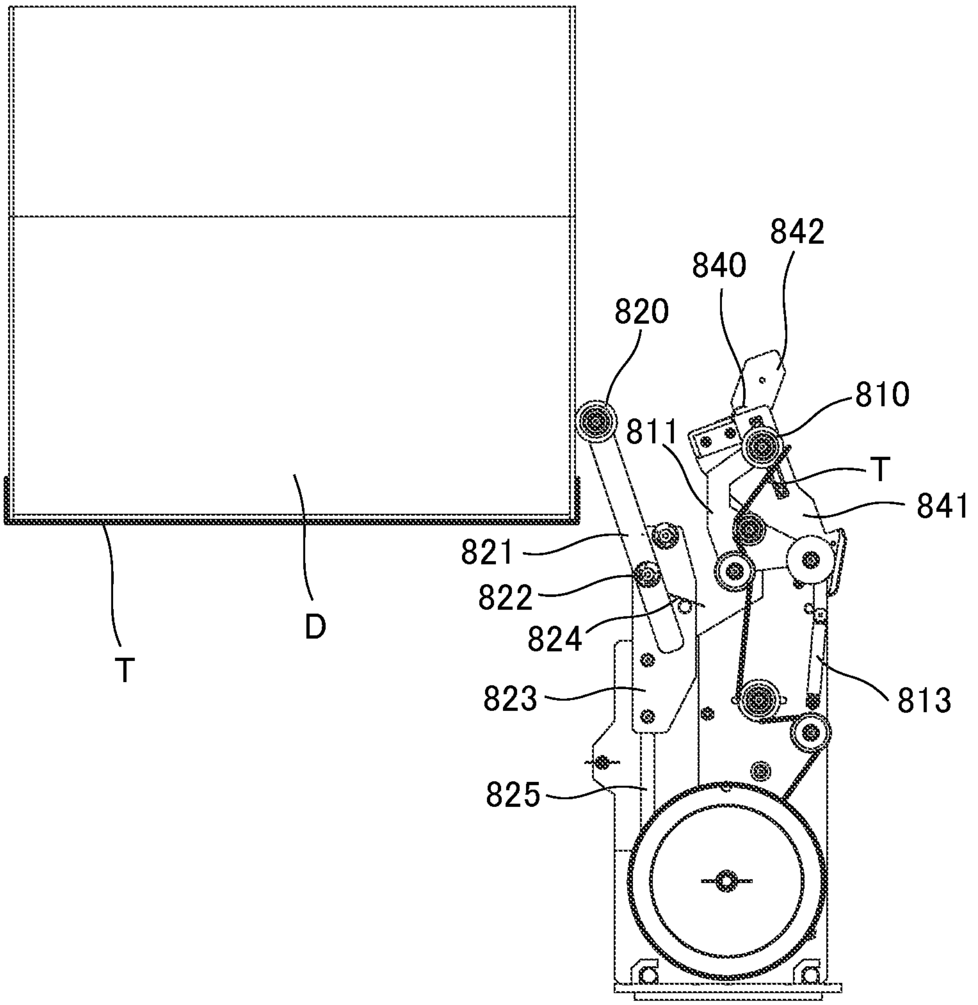
FIG. 35 is a cross-sectional view illustrating a state where the tape sticking operation has been completed by the tape unit of the embodiment.

As illustrated in FIG. 34, if the tape unit 800 further moves, the second holding roller 820 reaches a corner portion formed between the bottom face and the back side face of the cardboard D. As illustrated in FIG. 35, if the second holding roller 820 passes the corner portion, the slide member 823 is moved upward by the urging force of the urging spring, so that the second holding roller 820 moves upward. Simultaneously, the second holding roller 820 is urged frontward by the urging force of the urging spring 824. In this manner, the second holding roller 820 moves along the back-side corner portion of the cardboard D, and then moves along the back side face while urged against the back side face. While the second holding roller 820 moves along the corner portion and the back side face of the cardboard D, the rest of the tape T that has been cut by the tape cutter 840 is stuck on the back-side corner portion and the back side face of the cardboard D by the second holding roller 820.

With this operation, the sticking operation of the tape T performed by the tape unit 800 is completed. If the tape unit 800 reaches the stop position sensor 885, the tape unit 800 stops moving. In the present embodiment, if the sticking operation of the tape T is completed, the cardboard is released from the support by the first bending arms 510 and 520 and the second bending arms 710 and 720 by returning the first bending arms 510 and 520 and the second bending arms 710 and 720. After that, the cardboard is dropped downward. This is because when the cardboard D is taken out, as illustrated in FIG. 1, from the outlet 103 formed in the front face of the housing 101, the cardboard D can be easily taken out. That is, in a state where the cardboard D is supported by the first bending arms 510 and 520 and the second bending arms 710 and 720, the cardboard D is located in an upper portion of the housing 101. Thus, it is difficult to take out the cardboard D from the outlet 103 because the upper face of the cardboard D is caught. For this reason, in the present embodiment, the cardboard D is dropped downward, and then taken out.

In the housing 101, a cardboard presence/absence sensor 101*a* (see FIG. 40) is disposed for detecting the presence or absence of the cardboard D. Thus, the taking out of the cardboard D can be detected by the cardboard presence/absence sensor 101*a*. If the taking out of the cardboard D is detected, the tape unit 800 moves toward the home position.

Figure 39:
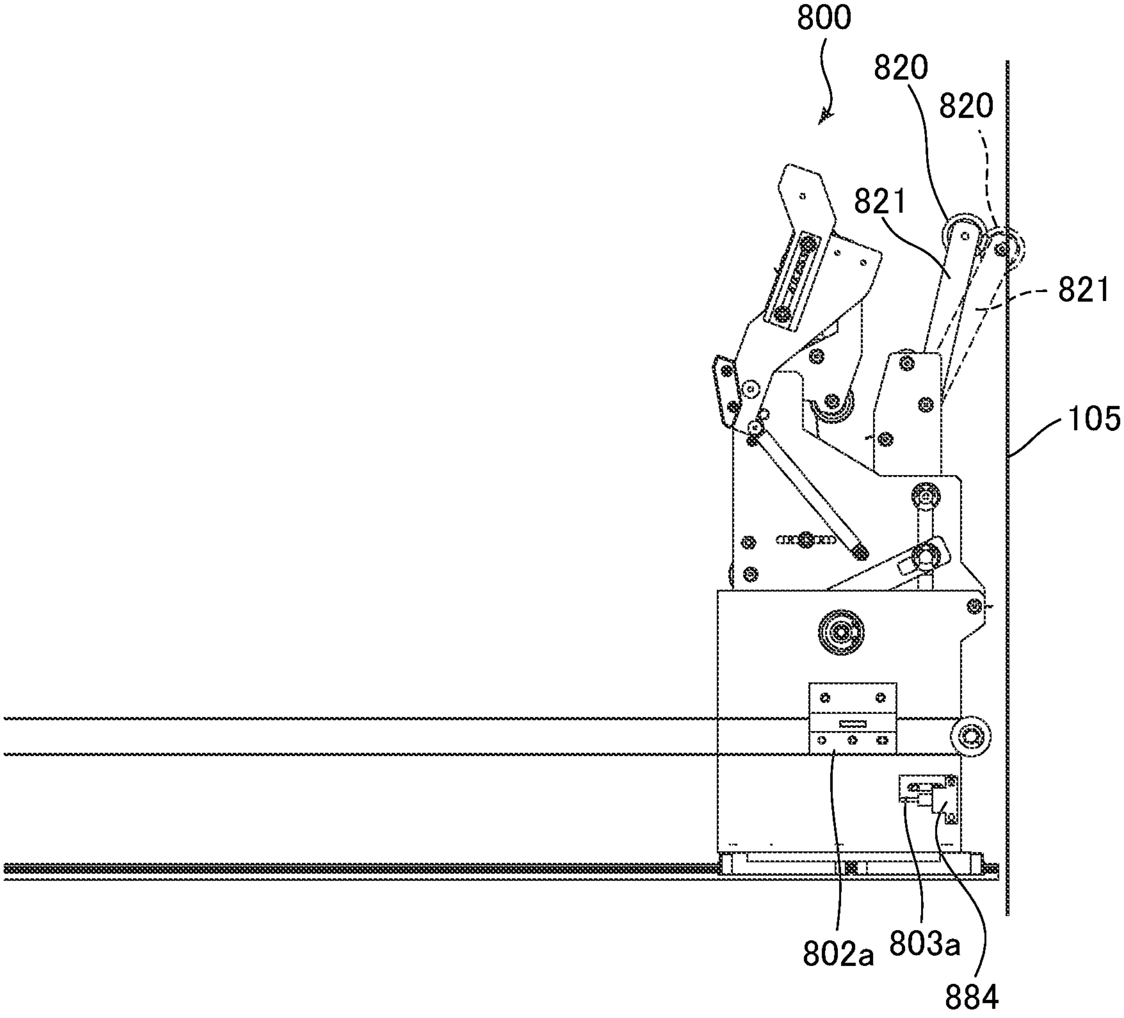
FIG. 39 is a side view illustrating a state where the tape unit of the embodiment has abutted against an inner wall.

In the present embodiment, when the tape unit 800 returns to the home position, the tape unit 800 is positioned near a front side wall 105 of the housing 101, for downsizing the apparatus. As described above, in the front of the tape unit 800, the second tape-holding roller 820 is disposed, projecting frontward. The second tape-holding roller 820 is pivotally supported via the second roller arm 821. Thus, as illustrated in FIG. 39, when the tape unit 800 returns to the home position, the second tape-holding roller 820 pivots so as to separate from the front side wall 105 even if the second tape-holding roller 820 contacts the front side wall 105. That is, the second tape-holding roller 820 moves from a position indicated by a broken line to a position indicated by a solid line. Thus, the home position of the tape unit 800 can be set closer to the side wall 105, so that the apparatus can be downsized.

[Flow from Bending Operation for Second Flap to Tape Sticking Operation]

Figure 43:
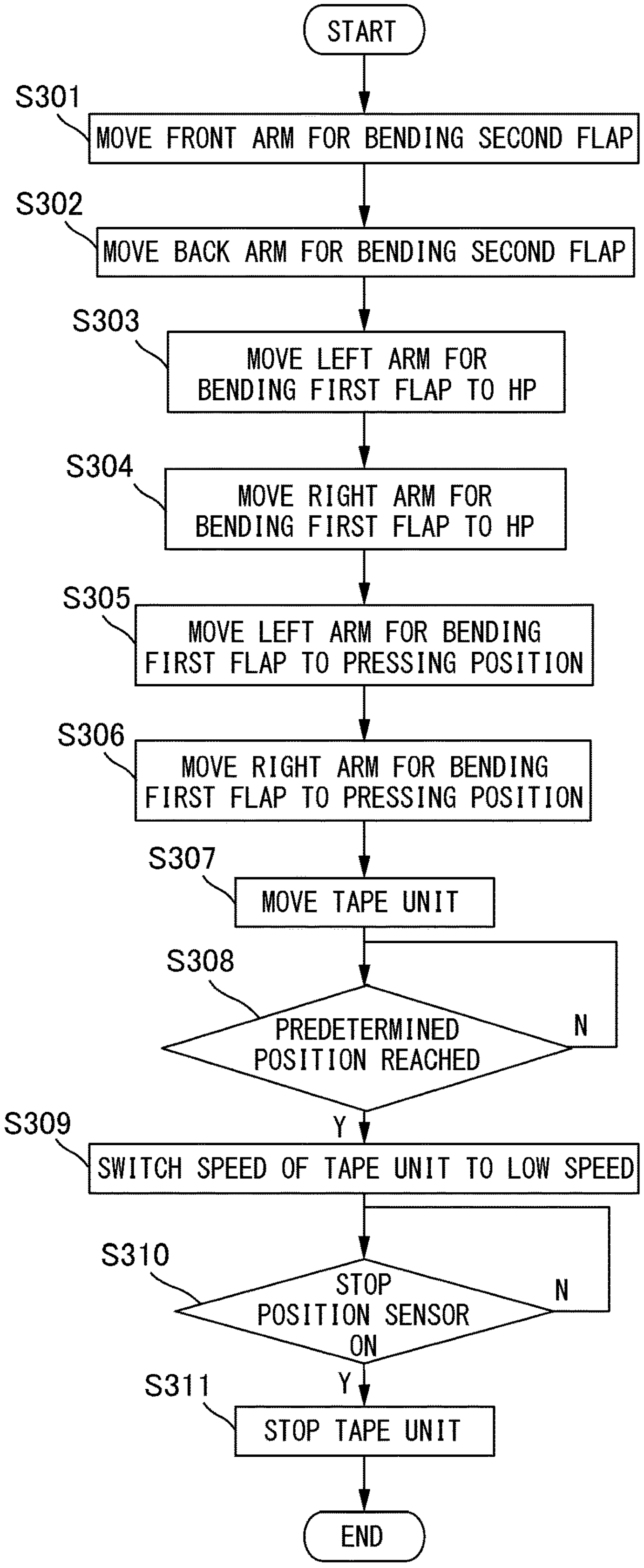
FIG. 43 is a flowchart of the embodiment illustrating the control performed in a period of time from when the second flaps are bent, until when the tape sticking operation has been completed.

Next, a flow from the bending operation performed by the second flap-bending mechanism 700 on the second flaps F2 to the tape sticking operation performed by the tape unit 800 will be described with reference to FIG. 43. If the first flaps F1 are bent in the flow of FIG. 42, the second bending arm 720 on the left side (i.e., a front arm for bending a second flap) is pivoted (S301). Then, the second bending arm 710 on the right side (i.e., a back arm for bending a second flap) is pivoted (S302). In this manner, the second flaps F2 on both of the right and left sides are bent. Note that which of the second flaps F2 may be bent earlier, and both of the second flaps F2 may be bent simultaneously.

Then, the first pressing portion 420 on the back side and the first bending arm (i.e., a left arm for bending a first flap) 520 are moved to the home position (i.e., the back end of the first-pressing-portion guide rail 430) (S303). The first bending arm 520 located at the home position is detected by the home position sensor (i.e., a left HP sensor for the first flap-bending arm and the pressing arm) 520*a* (see FIG. 40). With this process, the first bending arm 520 is pulled out of the space between the first flaps F1 and the second flaps F2. Then, the first pressing portion 410 on the front side and the first bending arm (i.e., a right arm for bending a first flap) 510 are moved to the home position (i.e., the front end of the first-pressing-portion guide rail 430) (S304). The first bending arm 510 located at the home position is detected by the home position sensor (i.e., a right HP sensor for the first flap-bending arm and the pressing arm) 510*a* (see FIG. 40). With this process, the first bending arm 510 is pulled out of the space between the first flaps F1 and the second flaps F2. Note that which of the first bending arms may be pulled out earlier, and both of the first bending arms may be pulled out simultaneously.

Then, the first pressing portion 420 on the back side and the first bending arm (i.e., the left arm for bending a first flap) 520 are moved toward the cardboard again, and the bottom face of the second flaps F2 is pressed by the first bending arm 520 (S305). Then, the first pressing portion 410 on the front side and the first bending arm (i.e., the right arm for bending a first flap) 510 are moved toward the cardboard again, and the bottom face of the second flaps F2 is pressed by the first bending arm 510 (S306). With these processes, the first bending arms 510 and 520, together with the second bending arms 710 and 720, support the bottom face of the cardboard. Note that which of the first bending arms 510 and 520 may press the second flaps F2 earlier, and both of the first bending arms 510 and 520 may press the second flaps F2 simultaneously.

The tape unit 800 is moved in this state, and sticks the tape on the front face of the cardboard, which extends upward, the bottom face, and the back face, which extends upward (S307). If the tape unit 800 reaches a predetermined position (S308), the moving speed of the tape unit 800 is switched to a low speed (S309). For example, the predetermined position is a position at which the second tape-holding roller 820 reaches the back-side corner portion of the cardboard. Since the moving speed of the tape unit 800 is switched to a low speed when the tape unit 800 reaches the predetermined position, the tape can be reliably stuck on the back side face of the cardboard by the second tape-holding roller 820.

If the tape unit 800 is detected by the stop position sensor 885 (S310), the tape unit 800 is stopped from moving (S311). With this operation, the tape sticking operation for the cardboard is completed.

[Flow of Preparation for Taking Out Cardboard]

Figure 44:
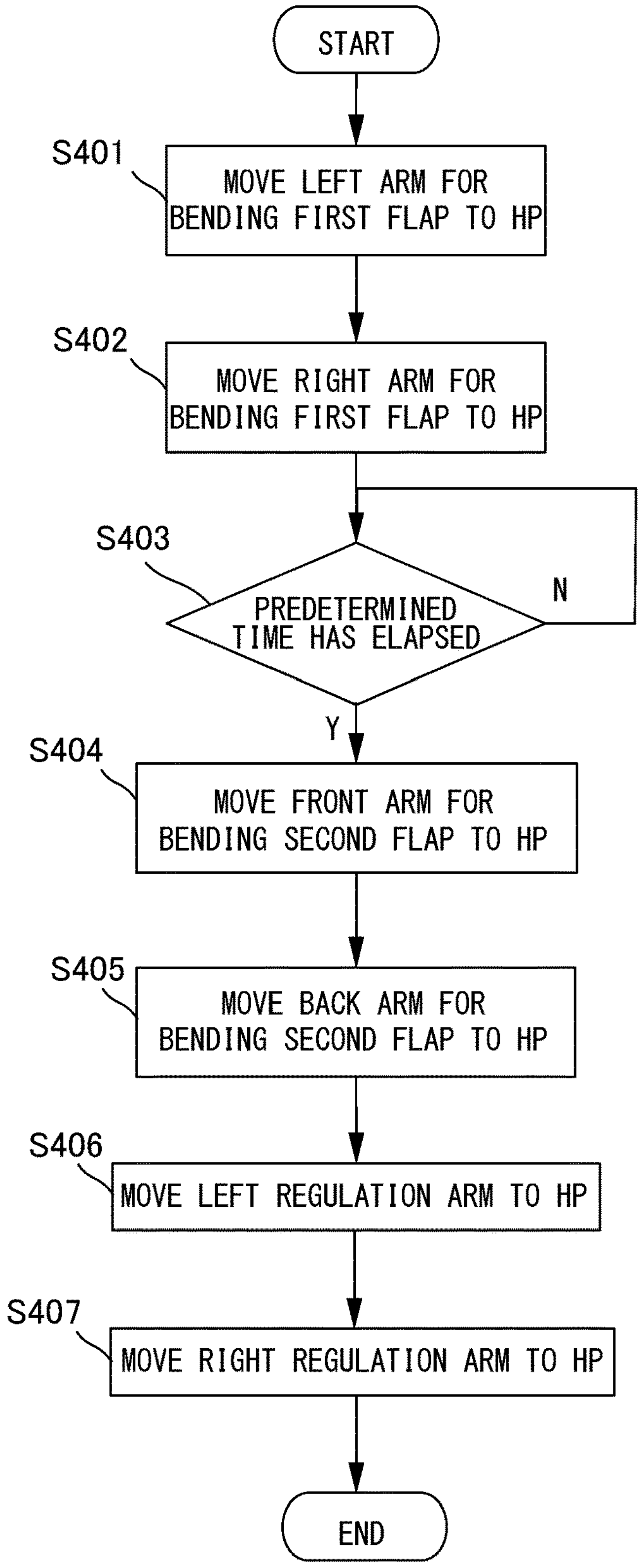
FIG. 44 is a flowchart of the embodiment illustrating the control performed for the preparation for taking out a cardboard.

Next, a flow of preparation for taking out the cardboard, on which the tape has been stuck, will be described with reference to FIG. 44. If the tape sticking operation is completed in the flow of FIG. 43, the first pressing portion 420 on the back side and the first bending arm (i.e., a left arm for bending a first flap) 520 are moved to the home position (i.e., the back end of the first-pressing-portion guide rail 430) (S401). Then, the first pressing portion 410 on the front side and the first bending arm (i.e., a right arm for bending a first flap) 510 are moved to the home position (i.e., the front end of the first-pressing-portion guide rail 430) (S402). With these processes, the bottom face of the cardboard is released from the support by the first bending arms 510 and 520. Note that which of the first bending arms may be moved earlier, and both of the first bending arms may be moved simultaneously.

If a predetermined time has elapsed since the bottom face of the cardboard was released from the support by the first bending arms 510 and 520 (S403), the second bending arm 720 on the left side (i.e., a front arm for bending a second flap) is moved to the home position (S404). Then, the second bending arm 710 on the right side (i.e., a back arm for bending a second flap) is moved to the home position (S405). With these processes, the bottom face of the cardboard is released from the support by the second bending arms 710 and 720. Note that which of the second bending arms may be moved earlier, and both of the second bending arms may be moved simultaneously.

Furthermore, the regulation arm 620 on the back side (i.e., a left regulation arm) is moved to the home position (S406), and then the regulation arm 610 on the front side (i.e., a right regulation arm) is moved to the home position (S407). That is, the regulation arms 610 and 620 are separated from the side faces of the cardboard. Note that which of the regulation arms may be moved earlier, and both of the regulation arms may be moved simultaneously. With this operation, the preparation for taking out the cardboard is completed.

[Configuration of Control]

Next, a configuration for controlling the box forming apparatus 100 of the present embodiment will be described with reference to FIG. 40. The box forming apparatus 100 is controlled by a microprocessor 1001 of a control portion 1000. The microprocessor 1001 is connected with various motors and sensors via drivers. The microprocessor 1001 executes the above-described flows of FIGS. 41 to 44 and the above-described various operations by controlling various motors, depending on a program and signals from various sensors. The control portion 1000 is supplied with electric power from a power supply 1002.

The box forming apparatus 100 has various indication LEDs for indicating the operation state of the apparatus, for example. In the present embodiment, the box forming apparatus 100 has indication LEDs 1011 to 1013 of green (G), white (W), and yellow (Y), and an indication LED 1010 for indicating an emergency stop switch. The lighting of the LEDs is controlled by the microprocessor 1001. For example, if the assembly of the cardboard is completed, the microprocessor 1001 notifies an operator of the completion of the assembly by lighting any of the indication LEDs 1011 to 1013. Note that the names of the various motors and sensors illustrated in FIG. 40 are not equal to the names of the above-described components. However, if a symbol of a component illustrated in FIG. 40 is identical to a symbol of a component described above, the component illustrated in FIG. 40 is identical to the component described above.

In the present embodiment, the insertion of the cardboard sheet and the taking out of the assembled cardboard can be performed on the front side of the apparatus. Thus, the present embodiment is suitable to the work for an operator to assemble a cardboard, one by one. In addition, in the present embodiment, the apparatus can be downsized by devising the arrangement of components, as described above. Thus, the box forming apparatus 100 of the present embodiment can efficiently assemble a small number of cardboards in a small space.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

INDUSTRIAL APPLICABILITY

The box forming apparatus of the present invention is suitable as a box forming apparatus that opens a cardboard sheet folded like a plate, into a cardboard box.

What is claimed is:

1. A box forming apparatus configured to form a cardboard sheet into a box with a substantially rectangular shape when viewed from above, the cardboard sheet including four continuous faces and a plurality of flaps, the plurality of flaps including a first flap, a second flap, a third flap, and a fourth flap each extending from an upper end of a corresponding one of the four faces and the plurality of flaps including a fifth flap, a sixth flap, a seventh flap, and an eighth flap each extending from a lower end of a corresponding one of the four faces, the cardboard sheet being formed into a box by opening the four faces of the cardboard sheet and by folding the fifth to eighth flaps of the cardboard sheet, the box forming apparatus comprising:

a first pressing unit configured to press the first flap through a first gap between the second flap and the third flap, the second flap being adjacent to the third flap;

a second pressing unit configured to press the third flap through a second gap between the first flap and the fourth flap, the fourth flap being adjacent to the first flap;

a moving unit configured to move the first pressing unit and the second pressing unit relative to each other and open the four continuous faces of the cardboard sheet; and a folding unit configured to fold the fifth to eighth flaps of the cardboard sheet relative to the four continuous faces of the cardboard sheet.

2. The box forming apparatus according to claim 1, further comprising:

a first conveyance roller configured to convey the cardboard sheet;

a second conveyance roller disposed above the first conveyance roller in the vertical direction, and configured to convey the cardboard sheet together with the first conveyance roller; and a roller moving unit configured to move the first conveyance roller to a conveyance position where the first conveyance roller conveys the cardboard sheet and a retracted position where the first conveyance roller is retracted from the conveyance position, wherein the roller moving unit is configured to move the first conveyance roller to the retracted position when the moving unit moves the first pressing unit and the second pressing unit relative to each other.

3. The box forming apparatus according to claim 2, further comprising:

an exterior cover in which an insertion opening for inserting the cardboard sheet is formed; and a detecting unit configured to detect when the cardboard sheet is inserted into the insertion opening, wherein the roller moving unit is configured to move the first conveyance roller to the conveyance position from the retracted position when the detecting unit detects the cardboard sheet.

4. The box forming apparatus according to claim 2, further comprising a driving motor configured to drive and rotate the first conveyance roller, wherein the second conveyance roller is a driven roller, wherein the driving motor configured to rotate the first conveyance roller positioned at the retracted position, and wherein the roller moving unit is configured to move the first conveyance roller to the conveyance position from the retracted position when the first conveyance roller is rotated by the driving motor.

5. The box forming apparatus according to claim 2, further comprising a third conveyance roller disposed above the first conveyance roller in the vertical direction and downstream with respect to the second conveyance roller in a conveyance direction of the first conveyance roller, and wherein the first conveyance roller is disposed between the second conveyance roller and the third conveyance roller in the conveyance direction.

6. The box forming apparatus according to claim 1, wherein the folding unit includes a pair of first arms folding the fifth flap and the sixth flap, and a pair of second arms folding the seventh flap adjacent to the fifth flap and the eighth flap, the sixth flap facing the fifth flap and the eighth flap facing the seventh flap, and wherein the folding unit is configured to move the pair of first arms in a direction in which the pair of first arms is separated from each other after the seventh flap and the eighth flap is folded by the pair of second arms and move the pair of first arms to a supporting position where the pair of first arms supports a bottom face of the cardboard sheet which has the seventh flap and the eighth flap folded by the pair of second folding arms.

7. The box forming apparatus according to claim 6, further comprising a sticking portion sticking a tape on a bottom face of the cardboard sheet which has the fifth to eighth flaps folded by the folding unit.

8. An opening apparatus configured to open a cardboard sheet into a box with a substantially rectangular shape when viewed from above, the cardboard sheet including four continuous faces and a plurality of flaps, the plurality of flaps including a first flap, a second flap, a third flap, and a fourth flap each extending from an upper end of a corresponding one of the four faces and the plurality of flaps including a fifth flap, a sixth flap, a seventh flap, and an eighth flap each extending from a lower end of a corresponding one of the four faces, the cardboard sheet being formed into a box by opening the four faces of the cardboard sheet and by folding the fifth to eighth flaps of the cardboard sheet, the opening apparatus comprising:

a first pressing unit configured to press the first flap through a gap between the second flap and the third flap, the second flap being adjacent to the third flap;

a second pressing unit configured to press the third flap through a gap between the first flap and the fourth flap, the fourth flap being adjacent to the first flap; and an opening unit configured to move the first pressing unit and the second pressing unit relative to each other and open the four continuous faces of the cardboard sheet.

* * * * *